United States Patent
Kubo et al.

(10) Patent No.: US 6,330,047 B1
(45) Date of Patent: Dec. 11, 2001

(54) LIQUID CRYSTAL DISPLAY DEVICE AND METHOD FOR FABRICATING THE SAME

(75) Inventors: Masumi Kubo, Ikoma; Yozo Narutaki, Yamatokoriyama; Atsushi Ban, Soraku-gun; Takayuki Shimada, Yamatokoriyama; Yoji Yoshimura, Nara; Mikio Katayama, Ikoma; Yutaka Ishii, Nara; Hirohiko Nishiki, Funabashi; Akihiro Yamamoto, Kishiwaka; Yoshinori Shimada, Taki-gun, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/523,658

(22) Filed: Mar. 10, 2000

Related U.S. Application Data

(63) Continuation-in-part of application No. 09/122,756, filed on Jul. 27, 1998, now Pat. No. 6,195,140.

(30) Foreign Application Priority Data

| Jul. 28, 1997 | (JP) | 9-201176 |
| Oct. 7, 1997 | (JP) | 9-274327 |
| Jan. 29, 1998 | (JP) | 10-016299 |
| Jan. 30, 1998 | (JP) | 10-018781 |
| Mar. 24, 1998 | (JP) | 10-75317 |
| Apr. 28, 1998 | (JP) | 10-117954 |

(51) Int. Cl.[7] .................. G02F 1/1343; G02F 1/1333
(52) U.S. Cl. .................. 349/147; 349/143; 349/138; 349/110
(58) Field of Search .................. 349/42, 44, 143, 349/147, 95, 111, 110, 138

(56) References Cited

U.S. PATENT DOCUMENTS

| 3,748,018 | 7/1973 | Borden, Jr. .......... 327/154 |
| 4,218,281 | 8/1980 | Doriguzzi et al. .......... 156/281 |
| 5,003,356 | 3/1991 | Wakai et al. .......... 257/390 |
| 5,146,355 | 9/1992 | Prince et al. .......... 359/50 |

(List continued on next page.)

FOREIGN PATENT DOCUMENTS

| 62-27228 | 11/1987 | (JP) . |
| 4-116531 | 2/1989 | (JP) . |
| 64-32201 | 2/1989 | (JP) . |
| 64-52130 | 2/1989 | (JP) . |
| 3-134623 | 6/1991 | (JP) . |
| 7-333598 A | 12/1995 | (JP) . |

OTHER PUBLICATIONS

Abstract (English Translation of JP 3–134623), Jun. 7, 1991, Hirosada, Seiko Epson Corp., Liquid Crystal Electrooptical Element.

Abstract (English Translation of JP 103–33201), Feb. 2, 1989, Kiyoshi, Asahi Optical Co., Ltd., Laminated Structure of Thin Dielectric Film.

"Latest Liquid Crystal Technologies", Kogyo Chosakai Publishing Co., Tokyo, 1983, pp. 186–189 and 194–197.

*Primary Examiner*—William L. Sikes
*Assistant Examiner*—Tarifur R. Chowdhury
(74) *Attorney, Agent, or Firm*—Nixon & Vanderhye PC

(57) ABSTRACT

A liquid crystal display device includes a first substrate, a second substrate, and a liquid crystal layer interposed between the first and second substrates, a plurality of pixel regions being defined by respective pairs of electrodes for applying a voltage to the liquid crystal layer, wherein each of the plurality of pixel regions includes a reflection region and a transmission region, and the first substrate includes, a transmission electrode through which light from a light source passes within the transmission region, and a reflection electrode by which ambient light is reflected within the reflection region, wherein the transmission electrode and the reflection electrode are electrically connected to each other in an interface area between the transmission region and the reflection region.

32 Claims, 67 Drawing Sheets

U.S. PATENT DOCUMENTS

| | | | |
|---|---|---|---|
| 5,530,571 | 6/1996 | Chen | 349/112 |
| 5,585,951 | 12/1996 | Noda et al. | 349/122 |
| 5,680,186 | 10/1997 | Watanabe et al. | 349/95 |
| 5,753,937 | 5/1998 | Shimomaki et al. | 257/59 |
| 5,771,083 | 6/1998 | Fujihara et al. | 349/147 |
| 5,808,711 | 9/1998 | Suppelsa et al. | 349/74 |
| 5,822,027 | 10/1998 | Shimada et al. | 349/39 |
| 5,841,494 | 11/1998 | Hall | 349/98 |
| 5,847,781 | 12/1998 | Ono et al. | 349/44 |
| 5,847,789 | 12/1998 | Nakamura et al. | 349/99 |
| 5,907,379 | 5/1999 | Kim et al. | 349/141 |
| 5,920,082 | 7/1999 | Kitazawa et al. | 257/59 |
| 5,926,702 | 7/1999 | Kwon et al. | 438/158 |
| 5,978,056 | 11/1999 | Shintani et al. | 349/137 |
| 6,052,165 * | 4/2000 | Janssen | 349/84 |
| 6,104,459 * | 8/2000 | Oike et al. | 349/105 |
| 6,181,396 * | 1/2001 | Kanoh et al. | 349/113 |
| 6,181,397 * | 1/2001 | Ichimura | 349/113 |
| 6,215,538 * | 4/2001 | Narutaki et al. | 349/106 |

\* cited by examiner

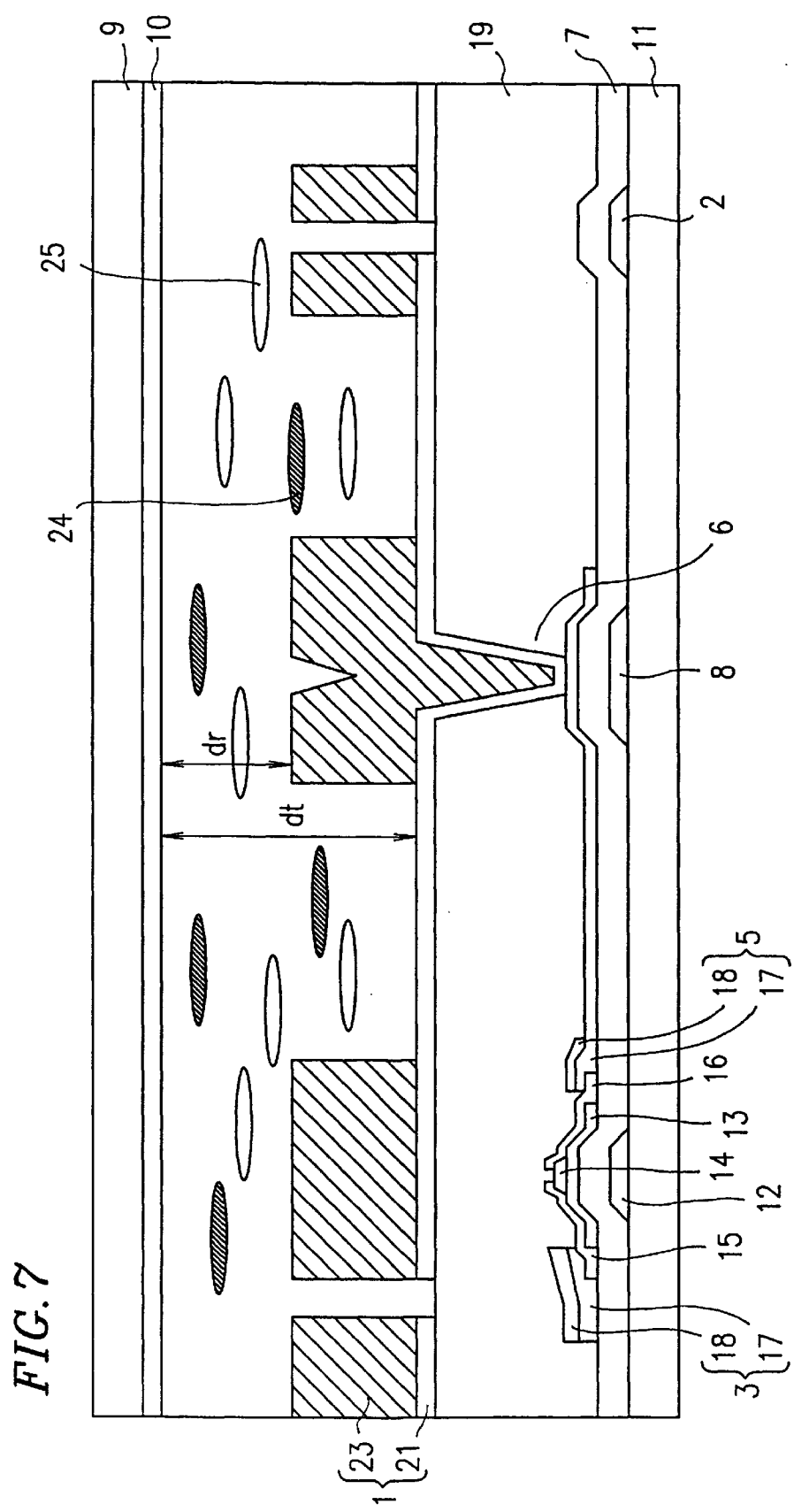

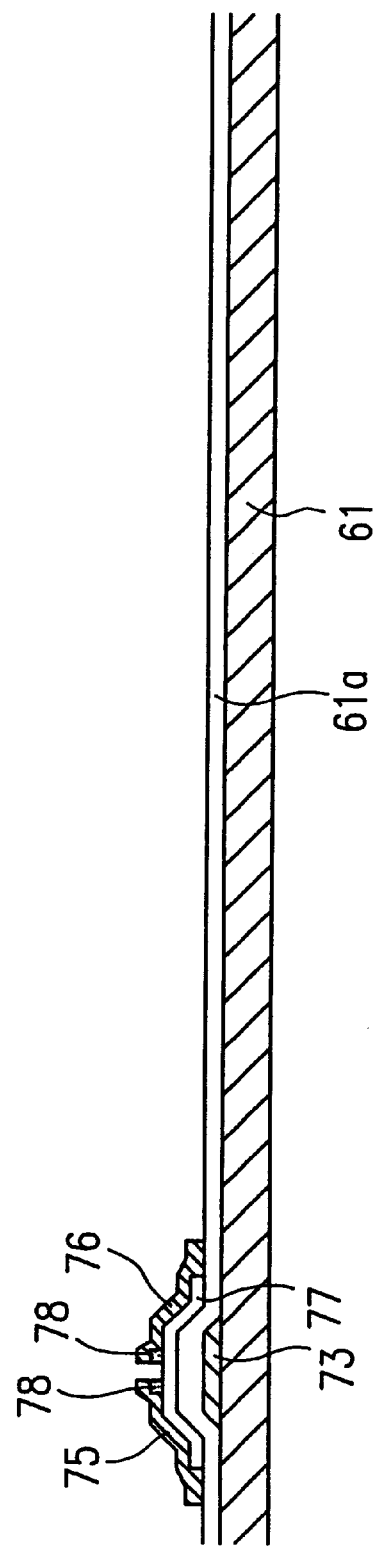
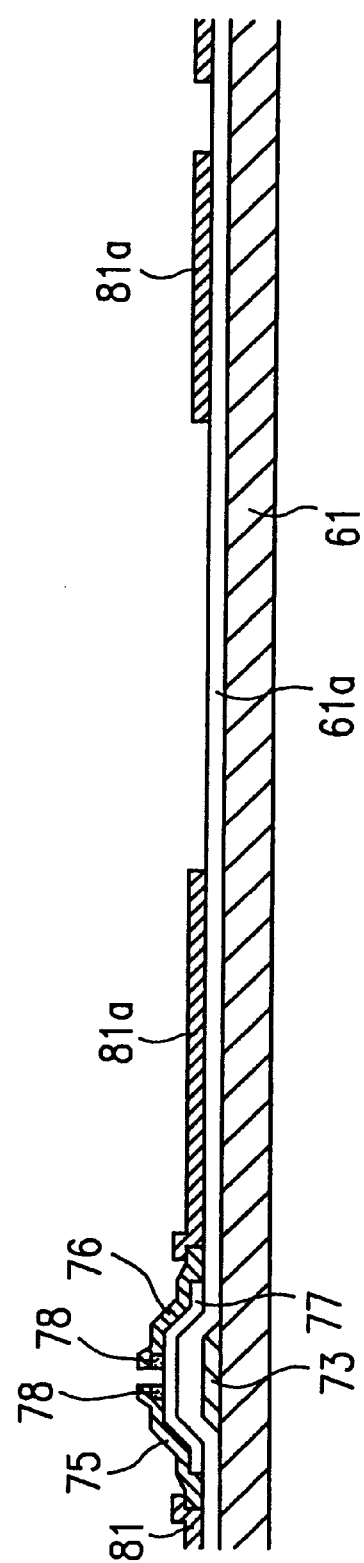

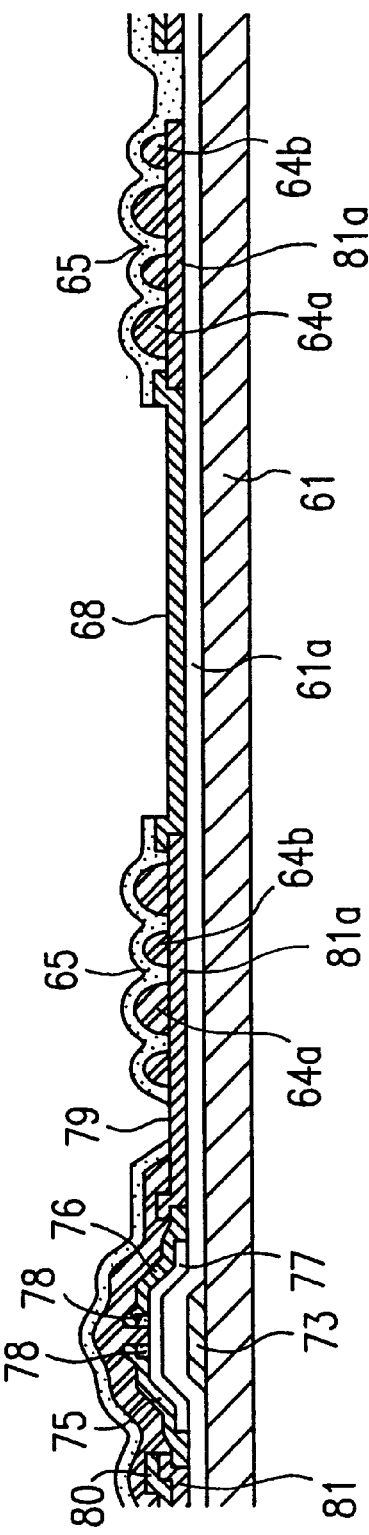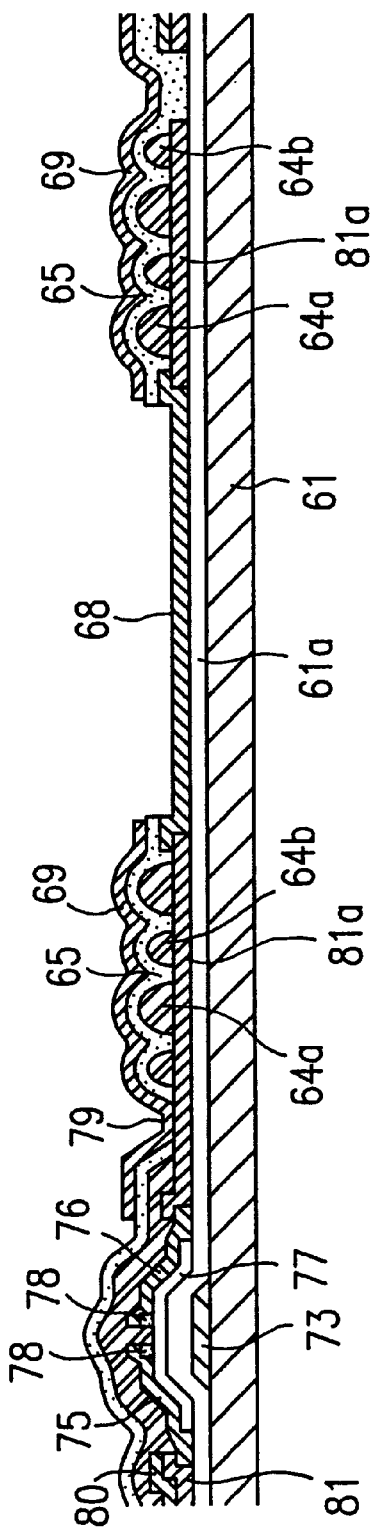

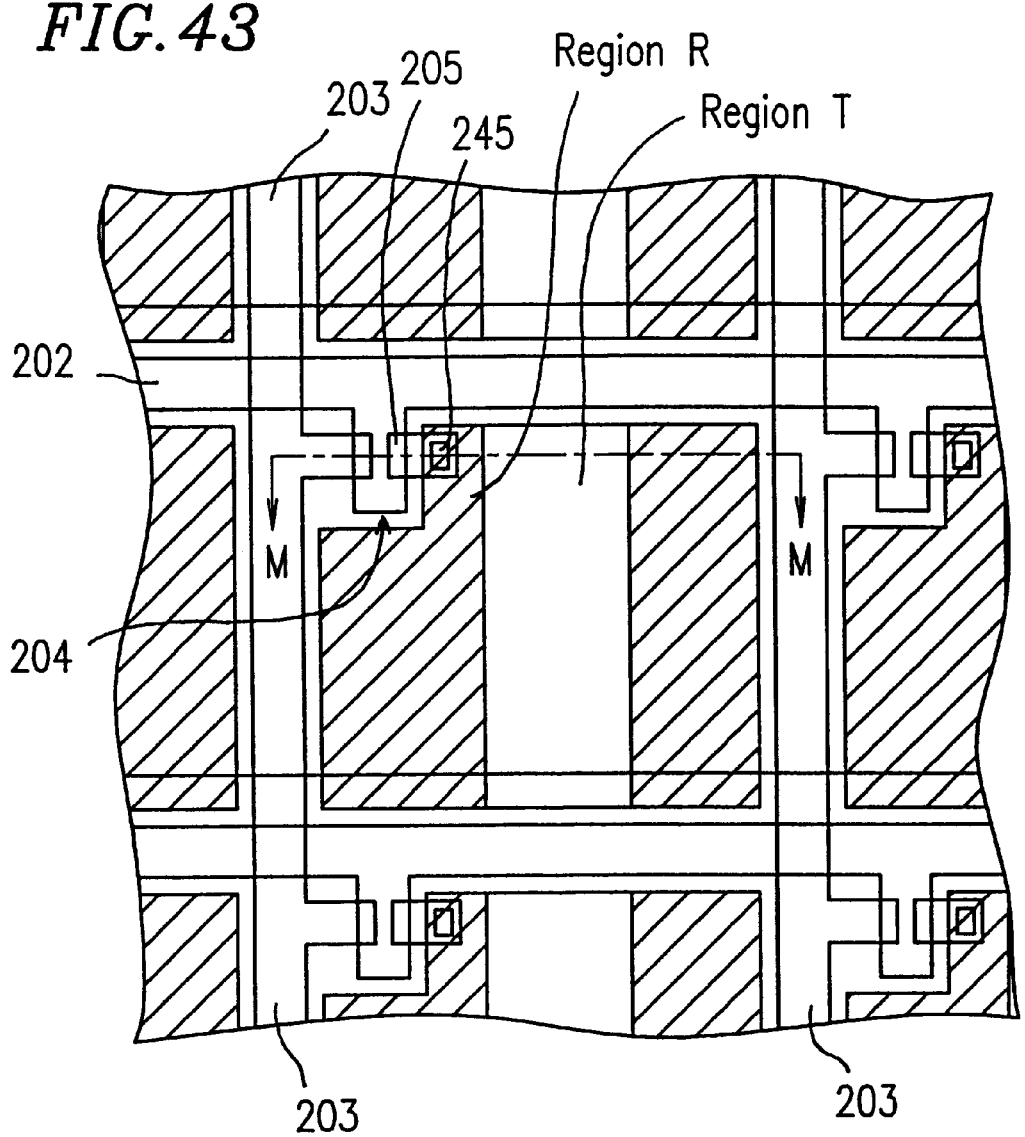

Reflection region

Transmission electrode

Transmission electrode

Reflection plate

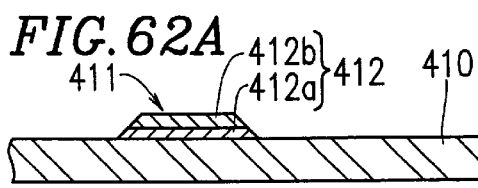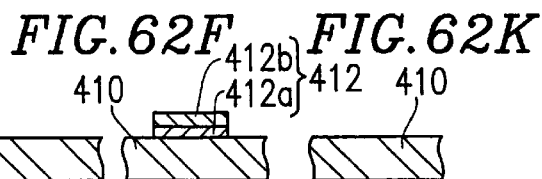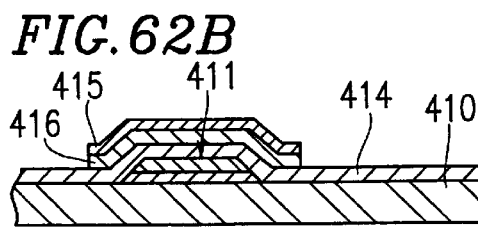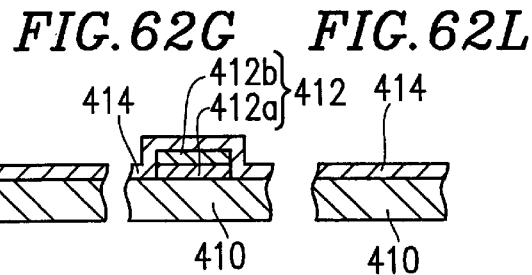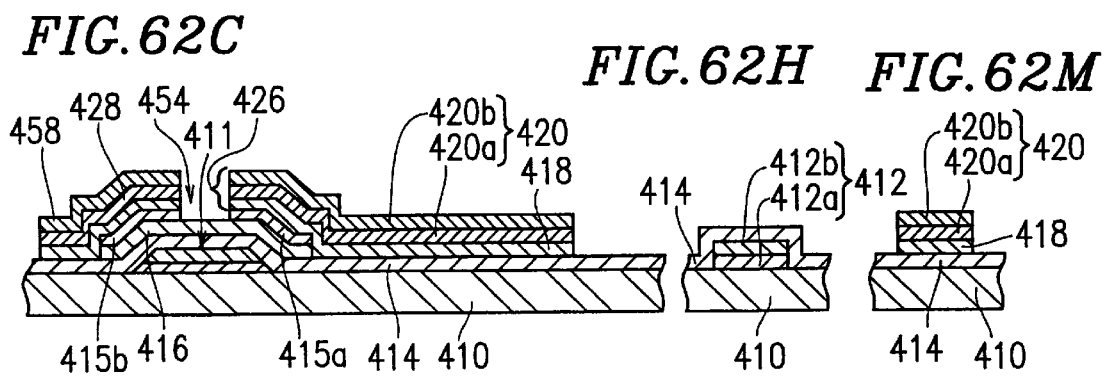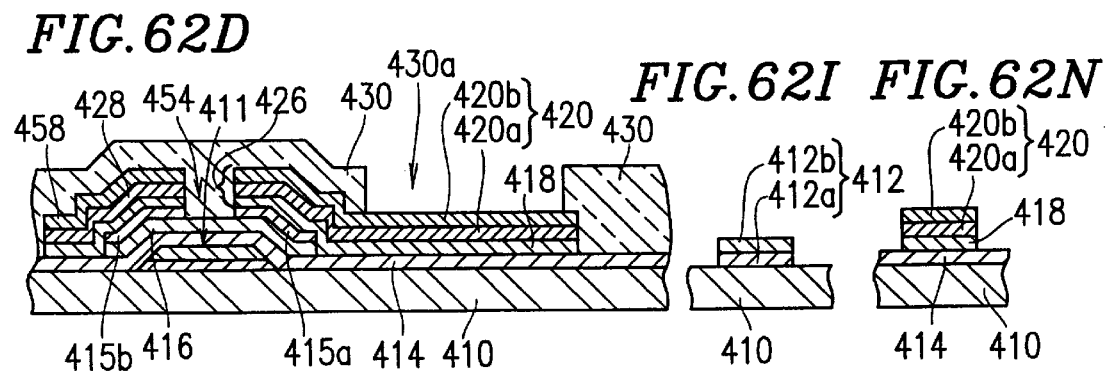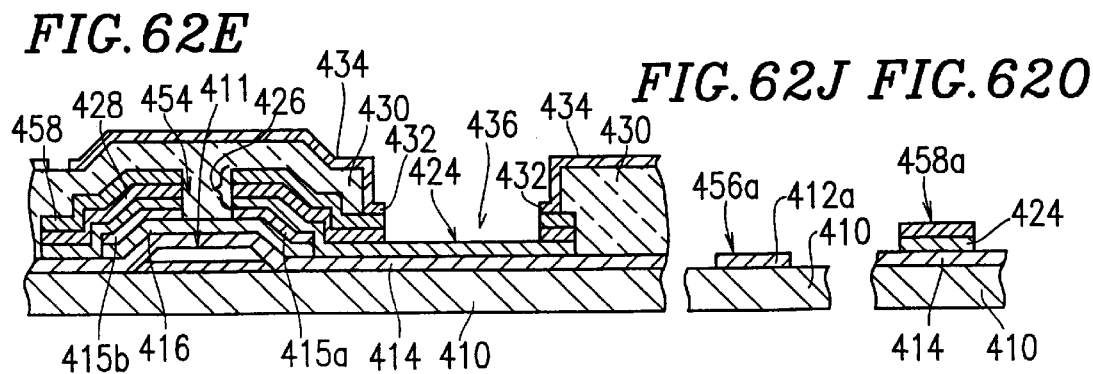

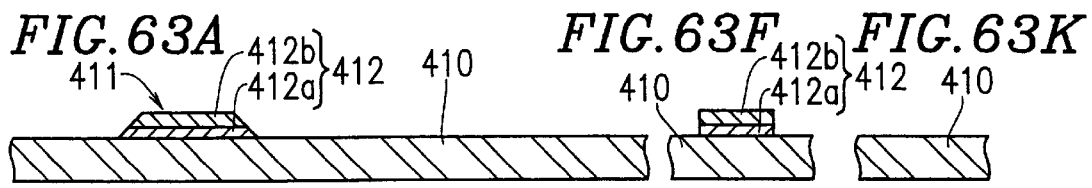
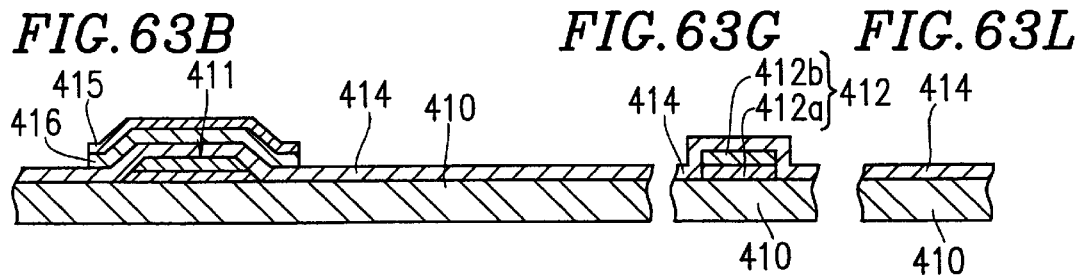
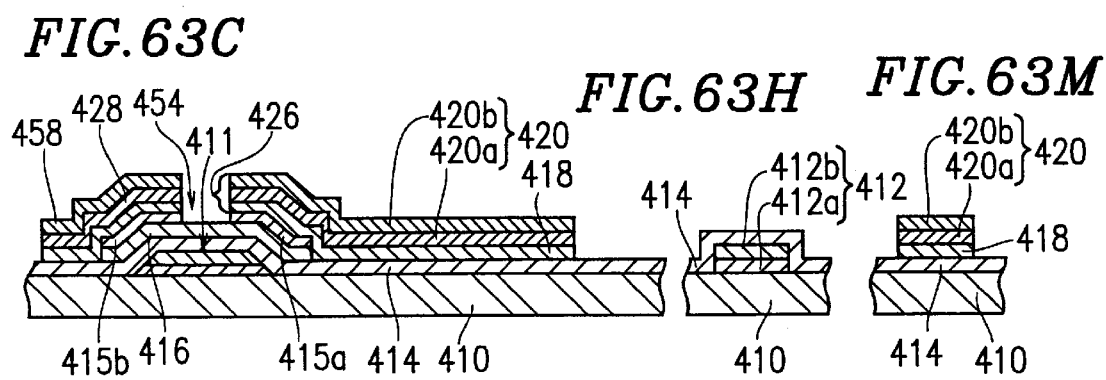
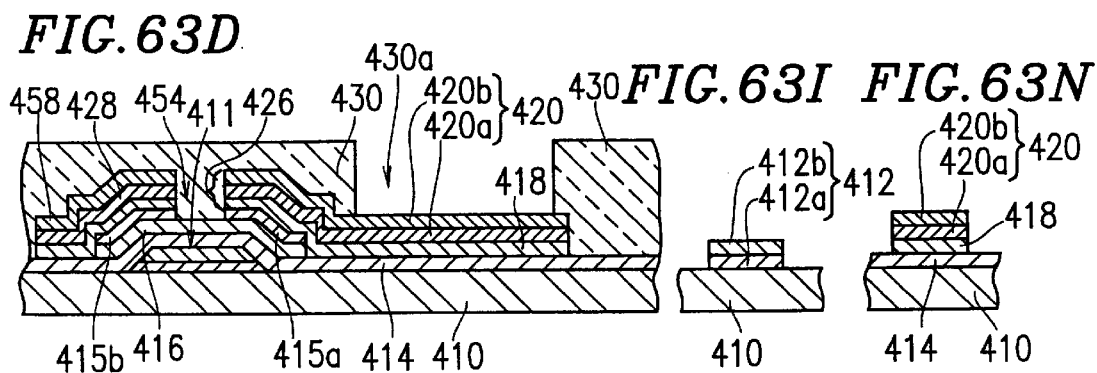
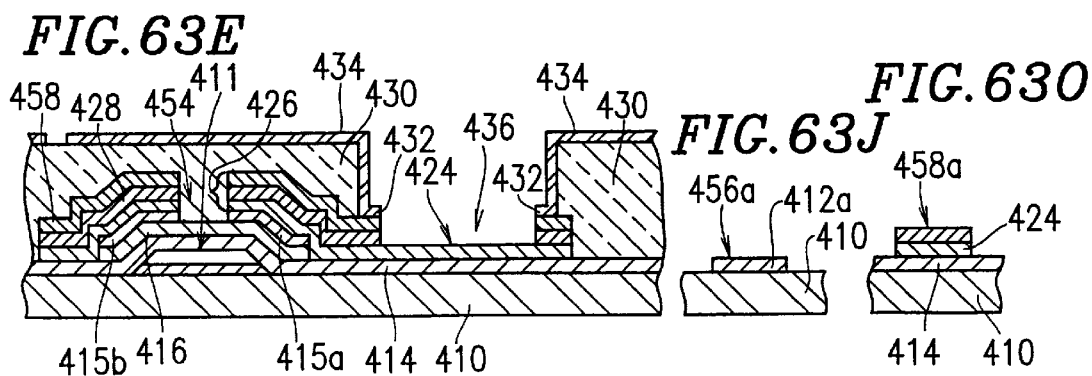

LIQUID CRYSTAL DISPLAY DEVICE AND METHOD FOR FABRICATING THE SAME

CROSS-REFERENCE TO RELATED APPLICATION

This application is a continuation-in-part of application Ser. No. 09/122,756, filed Jul. 28, 1998, now U.S. Pat. No. 6,195,140 the entire content of which is hereby incorporated by reference in this application.

BACKGROUND OF THE INVENTION

1. Field of the Invention

The present invention relates to a liquid crystal display device and a method for fabricating the liquid crystal display device. More particularly, the present invention relates to a liquid crystal display device having a transmission display region and a reflection display region in each pixel, and a method for fabricating such a liquid crystal display device.

2. Description of the Related Art

Due to the features of being thin and consuming low power, liquid crystal display devices have been used in a broad range of fields including office automation (OA) apparatuses such as wordprocessors and personal computers, portable information apparatuses such as portable electronic schedulers, and a camera-incorporated VCR provided with a liquid crystal monitor.

Such liquid crystal display devices include a liquid crystal display panel which does not emit light itself, unlike a CRT display and an electroluminescence (EL) display. Therefore, a so-called transmission type is often used as the liquid crystal display device, which includes an illuminator called a backlight disposed at the rear or one side thereof, so that the amount of the light from the backlight which passes through the liquid crystal panel is controlled by the liquid crystal panel in order to realize image display.

In such a transmission type liquid crystal display device, however, the backlight consumes 50% or more of the total power consumed by the liquid crystal display device. Providing the backlight therefore increases the power consumption.

In order to overcome the above problem, a reflection type liquid crystal display device has been used for portable information apparatuses which are often used outdoors or carried with the users. Such a reflection type liquid crystal display device is provided with a reflector formed on one of a pair of substrates in place of the backlight so that ambient light is reflected from the surface of the reflector.

Such a reflection type liquid crystal display device is operated in a display mode using a polarizing plate, such as a twisted nematic (TN) mode and a super twisted nematic (STN) mode which have been broadly used in the transmission type liquid crystal display devices. In recent years, there has been vigorous development of a phase change type guest-host mode which does not use a polarizing plate and thus realizes a brighter display.

The reflection type liquid crystal display device using the reflection of ambient light is disadvantageous in that the visibility of the display is extremely lower when the surrounding environment is dark. Conversely, the transmission type liquid crystal display device is disadvantageous when the environment is bright. That is, the color reproducibility is lower and the display is not sufficiently recognizable because the display light is less bright than the ambient light. In order to improve the display quality under a bright environment, the intensity of the light from the backlight needs to be increased. This increases the power consumption of the backlight and thus the resultant liquid crystal display device. Moreover, when the liquid crystal display device needs to be viewed at a position exposed to direct sunlight or direct illumination light, the display quality is inevitably lower due to the ambient light. For example, when a liquid crystal display screen fixed in a car or a display screen of a personal computer used at a fixed position receives direct sunlight or illumination light, surrounding images are mirrored, making it difficult to observe the display itself.

In order to overcome the above problems, a construction which realizes both a transmission mode display and a reflection mode display in one liquid crystal display device has been disclosed in, for example, Japanese Laid-Open Publication No. 7-333598. Such a liquid crystal display device uses a semi-transmissive reflection film which transmits part of light and reflects part of light.

FIG. 52 shows such a liquid crystal display device using a semi-transmissive reflection film. The liquid crystal display device includes polarizing plates 30a and 30b, aphase plate 31, a transparent substrate 32, black masks 33, a counter electrode 34, alignment films 35, a liquid crystal layer 36, metal-insulator-metal (MIM) elements 37, pixel electrodes 38, a light source 39, and a reflection film 40.

The pixel electrodes 38, which are the semi-transmissive reflection films, are extremely thin layers made of metal particles or layers having sporadical minute hole defects or concave defects therein formed over respective pixels. Pixel electrodes with this construction transmit light from the light source 39 and at the same time reflect light from outside such as natural light and indoor illumination light, so that both the transmission display function and the reflection display function are simultaneously realized.

The conventional liquid crystal display device shown in FIG. 52 has following problems. First, when an extremely thin layer of deposited metal particles is used as the semi-transmissive reflection film of each pixel, since the metal particles have a large absorption coefficient, the internal absorption of incident light is large and some of the light is absorbed without being used for display, thereby lowering the light utilization efficiency.

When a film having sporadical minute hole defects or concave defects therein is used as the pixel electrode 38 of each pixel, the structure of the film is too complicated to be easily controlled, requiring precise design conditions. Thus, it is difficult to fabricate the film having uniform characteristics. In other words, the reproducibility of the electrical or optical characteristics is so poor that control of the display quality in the above liquid crystal display device is extremely difficult.

For example, if thin film transistors (TFTS), which in recent years have been generally used as the switching elements of liquid crystal display devices, are attempted to be used for the above liquid crystal display device shown in FIG. 52, an electrode for the formation of a storage capacitor in each pixel needs to be formed by an electrode/interconnect material other than that for the pixel electrode. In this case, the pixel electrode made of the semi-transmissive reflection film, as in this conventional device, is not suitable for the formation of a storage capacitor. Moreover, even when the semi-transmissive reflection film as the pixel electrode is formed over part of the interconnects and elements via an insulating layer, the pixel electrode which includes a transmissive component hardly contributes to an increase in the numerical aperture. Also, if light is incident on a semiconductor layer of the switching element such as a MIM and a TFT, an optically pumped current is generated. The formation of the semi-transmissive reflection film as the light-shading layer is insufficient for the protection of the switching element from light. To ensure light-shading, another light-shading film is required to be disposed on the counter substrate.

SUMMARY OF THE INVENTION

According to one aspect of the present invention, a liquid crystal display device includes a first substrate, a second substrate, and a liquid crystal layer interposed between the first and second substrates, a plurality of pixel regions being defined by respective pairs of electrodes for applying a voltage to the liquid crystal layer, wherein each of the plurality of pixel regions includes a reflection region and a transmission region, and the first substrate includes, a transmission electrode through which light from a light source passes within the transmission region, and a reflection electrode by which ambient light is reflected within the reflection region, wherein the transmission electrode and the reflection electrode are electrically connected to each other in an interface area between the transmission region and the reflection region.

In one embodiment of the present invention, the liquid crystal display device further includes an interlayer insulating film.

In another embodiment of the present invention, the interlayer insulating film is located under both the transmission electrode and the reflection electrode.

In still another embodiment of the present invention, wherein the reflection electrode is not flat.

In still another embodiment of the present invention, the interlayer insulating film is not flat.

In still another embodiment of the present invention, the reflection electrode is formed on tilted or concave and convex portions of the interlayer insulating film.

In still another embodiment of the present invention, the interlayer insulating film is provided to at least a portion between the transmission electrode and the reflection electrode.

In still another embodiment of the present invention, the interlayer insulating film is not present over a portion of the transmission region.

In still another embodiment of the present invention, the reflection electrode is formed in a position between the interlayer insulating film and an area through which the ambient light comes into the liquid crystal display device.

In still another embodiment of the present invention, the thickness of the liquid crystal layer in the reflection region is smaller than that of the liquid crystal layer in the transmission region.

In still another embodiment of the present invention, the thickness of the liquid crystal layer in the reflection region is about a ½ of that of the liquid crystal layer in the transmission region.

In still another embodiment of the present invention, the reflection electrode has concave and convex portions in a surface thereof.

In still another embodiment of the present invention, the interlayer insulating film has concave and convex portions in a surface thereof.

In still another embodiment of the present invention, the transmission electrode and the reflection electrode are electrically connected to each other in a region in which the interlayer insulating film is not formed.

In still another embodiment of the present invention, the liquid crystal display device further includes a contact hole in which the transmission electrode and the reflection electrode are electrically connected to each other in addition to the electrical connection of the transmission electrode and the reflection electrode in the interface area between the transmission region and the reflection region.

In still another embodiment of the present invention, the transmission electrode and the reflection electrode are electrically connected to each other only in the interface area between the transmission region and the reflection region.

In still another embodiment of the present invention, the interlayer insulating film is made of a photosensitive resin.

In still another embodiment of the present invention, the interlayer insulating film is made of an organic resin film containing a light-shielding substance.

In still another embodiment of the present invention, the light-shielding substance contains a graphite.

In still another embodiment of the present invention, the interlayer insulating film is made of an organic resin film.

In still another embodiment of the present invention, the interlayer insulating film contains silicon nitride.

In still another embodiment of the present invention, the liquid crystal display device is an active matrix including a switching element.

In still another embodiment of the present invention, a thin film transistor is used as the switching element.

In still another embodiment of the present invention, a portion of a drain electrode of the thin film transistor and the transmission electrode are made of a same material.

In still another embodiment of the present invention, the same material is ITO.

In still another embodiment of the present invention, the liquid crystal display device further includes a interlayer insulating film, wherein the interlayer insulating film is located over at least a portion of a gate signal line of the thin film transistor, a source signal line of the thin film transistor, the thin film transistor, and a drain electrode of the thin film transistor.

In still another embodiment of the present invention, the reflection electrode is formed such that the reflection electrode entirely covers the thin film transistor through the interlayer insulating film interposed therebetween.

In still another embodiment of the present invention, the pixel region is enclosed by a gate signal line and the source signal line of the thin film transistor, and a peripheral portion of the reflection electrode overlaps the gate signal line and the source signal line enclosing the pixel region.

In still another embodiment of the present invention, the gate signal line and the source signal line have a light-shielding property.

In still another embodiment of the present invention, the transmission electrode is made of Indium Tin Oxide (ITO).

In still another embodiment of the present invention, the reflection electrode contains aluminum.

In still another embodiment of the present invention, a metallic layered film of aluminum and molybdenum is used as the reflection electrode.

According to another aspect of the present invention, a method for fabricating a liquid crystal display device including a first substrate, a second substrate, and a liquid crystal layer interposed between the first and second substrates, a plurality of pixel regions being defined by respective pairs of electrodes for applying a voltage to the liquid crystal layer, wherein each of the plurality of pixel regions includes a reflection region and a transmission region, includes steps of: forming a transmission electrode on the first substrate and patterning the transmission electrode; forming an interlayer insulating film on the transmission electrode, and patterning the interlayer insulating film so that the interlayer insulating film over the transmission region is removed; and forming a reflection electrode on the interlayer insulating film, and patterning the reflection electrode so that the reflection electrode over the transmission region is removed, and so that the reflection electrode and the transmission electrode are electrically connected to each other in an interface area between the transmission region and the reflection region in each pixel.

In one embodiment of the present invention, the method for fabricating a liquid crystal display device further includes a step of forming a thin film transistor and a signal line connected to the thin film transistor.

In another embodiment of the present invention, the method for fabricating a liquid crystal display device further includes a step of forming an interlayer film between the thin film transistor and the interlayer insulating film.

In still another embodiment of the present invention, the step of forming the transmission electrode includes a step of forming a portion of an electrode of the thin film transistor.

In still another embodiment of the present invention, the step of forming the transmission electrode includes a step of forming a portion of a drain electrode of the thin film transistor.

In still another embodiment of the present invention, the step of removing the interlayer insulating film over the transmission region includes a step of forming a contact hole in which the reflection electrode and the transmission electrode are electrically connected to each other in addition to the electrical connection of the reflection electrode and the transmission electrode in the interface area between the reflection region and the transmission region.

In still another embodiment of the present invention, the step of patterning the reflection electrode includes steps of: forming a photoresist layer; etching a portion of the reflection electrode; and removing the photoresist layer.

In still another embodiment of the present invention, the reflection electrode is made of aluminum and molybdenum; and the etching step includes a step of etching with an etchant containing nitric acid, acetic acid, and phosphoric acid, and water.

In still another embodiment of the present invention, the step of removing the photoresist layer includes steps of: immersing the first substrate in a removing solution; immersing the first substrate in two or more reservoirs; and thereafter immersing the first substrate in a water washing reservoir.

In still another embodiment of the present invention, the removing solution is monoethanolamine.

In still another embodiment of the present invention, the concentration of monoethanolamine in the removing solution is about 60 wt %.

In still another embodiment of the present invention, the removing reservoirs contain dimethylsulfoxide.

In still another embodiment of the present invention, the step of patterning the interlayer insulating film includes a step of performing a photolithography to the interlayer insulating film; and a step of patterning the reflection electrode includes of performing another photolithography to the reflection electrode.

In still another embodiment of the present invention, the step of forming the thin film transistor and the signal line connected to the thin film transistor includes steps of: forming a first metal film on the first substrate; performing a first photolithography to the first metal film, thereby forming a gate signal line and a gate electrode of the thin film transistor connected to the gate signal line; sequentially forming an insulating film and a semiconductor film on a face of the first substrate to which the first photolithography is performed; performing a second photolithography to the semiconductor film, thereby forming a semiconductor region; sequentially forming the transmission electrode and a second metal film are formed on a face of the first substrate on which the semiconductor region is formed; and performing a third photolithography to a portion of the second metal film, the transmission electrode, and the semiconductor region, thereby forming the source signal line, a source electrode of the thin film transistor connected to the source signal line, and a drain electrode of the thin film transistor.

In still another embodiment of the present invention, the step of forming a portion of the drain electrode of the thin film transistor includes a step of performing a photolithography to the drain electrode of the thin film transistor and the transmission electrode.

In still another embodiment of the present invention, the step of forming the interlayer insulating film on the transmission electrode includes a step of applying a photosensitive film as the interlayer insulating film; the step of patterning the interlayer insulating film includes a step of performing a photo-process to the interlayer insulating film; and the step of patterning the reflection electrode includes a step of performing a photolithography to the reflection electrode.

In still another embodiment of the present invention, the semiconductor film includes a high-resistive semiconductor film and a low-resistive semiconductor film, and the third photolithography is performed to the low-resistive semiconductor film.

In still another embodiment of the present invention, the method for fabricating a liquid crystal display device further includes steps of: in the first photolithography, forming a control signal input section through which a control signal is input to the gate signal line; in the third photolithography, forming a data signal input section through which a data signal is input to the source signal line; and removing the interlayer insulating film over the control signal input section and the data signal input section and the insulating film over the control signal input section by another photolithography.

In still another embodiment of the present invention, the method for fabricating a liquid crystal display device further includes steps of: in the first photolithography, forming a control signal input section through which a control signal is input to the gate signal line; in the third photolithography, forming a data signal input section through which a data signal is input to the source signal line; applying a photosensitive film as an interlayer insulating film; and removing the interlayer insulating film over the control signal input section and the data signal input section by a photo-process.

In still another embodiment of the present invention, in the photo-process, concave and convex portions are formed on a surface of the photosensitive film.

In still another embodiment of the present invention, the step of removing the interlayer insulating film over the transmission electrode includes a step of removing the interlayer insulating film in a region in which the transmission electrode is formed.

In still another embodiment of the present invention, the first metal film is formed from a first lower metal film and a first upper metal film superposed thereon, the first lower metal film is made of titanium; and the first upper metal film is made of aluminum or an aluminum alloy.

In still another embodiment of the present invention, the step of forming an interlayer insulating film on the transmission electrode includes a step of forming the interlayer insulating film on a face of the first substrate to which the third photolithography has been performed; the step of patterning the interlayer insulating film so that the interlayer insulating film over the transmission region is removed includes a step of performing a fourth photolithography to the interlayer insulating film, thereby removing the interlayer insulating film over the transmission region; the step of forming a reflection electrode on the interlayer insulating film includes a step of forming a third metal film to be the reflection electrode on a face of the first substrate to which the fourth photolithography has been performed; and the step of patterning the reflection electrode includes a step of forming the reflection electrode on the second metal film and the third metal film by a fifth photolithography, and removing the second metal film and the third metal film in the transmission region.

In still another embodiment of the present invention, the second metal film is formed from a second lower metal film and a second upper metal film superposed thereon, the second lower metal film is made of molybdenum; and the second upper metal film is made of aluminum or an aluminum alloy.

In still another embodiment of the present invention, the third metal film is made of aluminum.

According to still another aspect of the present invention, a method for fabricating a liquid crystal display device including a first substrate, a second substrate, and a liquid crystal layer interposed between the first and second substrates, a plurality of pixel regions being defined by respective pairs of electrodes for applying a voltage to the liquid crystal layer, wherein each of the plurality of pixel regions includes a reflection region and a transmission region, includes steps of: forming a first metal film on the first substrate; performing a first photolithography to the first metal film, thereby forming a gate signal line and a gate electrode of the thin film transistor connected to the gate signal line; sequentially forming an insulating film and a semiconductor film on a face of the first substrate to which the first photolithography has been performed; performing a second photolithography to the semiconductor film, thereby forming a semiconductor region; sequentially forming the transmission electrode and a second metal film on a face of the first substrate on which the semiconductor region has been formed; and performing a third photolithography to a portion of the second metal film, the transmission electrode film, and the semiconductor region, thereby forming the source signal line, a source electrode of the thin film transistor connected to the source signal line, a drain electrode of the thin film transistor, and the transmission electrode connected to the drain electrode; forming an interlayer insulating film on a face of the first substrate to which the third photolithography has been performed; performing a fourth photolithography to the interlayer insulating film, thereby removing an interlayer insulating film over the transmission electrode; forming a third metal film on a face of the first substrate to which the fourth photolithography has been performed; and performing a fifth photolithography to the third metal film and the second metal film, thereby forming a reflection electrode from the third metal film and removing the reflection electrode over the transmission electrode.

According to still another aspect of the present invention, a method for fabricating a liquid crystal display device including a first substrate, a second substrate, and a liquid crystal layer interposed between the first and second substrates, a plurality of pixel regions being defined by respective pairs of electrodes for applying a voltage to the liquid crystal layer, wherein each of the plurality of pixel regions includes a reflection region and a transmission region, the method includes steps of: forming a first metal film on the first substrate; performing a first photolithography to the first metal film, thereby forming a gate signal line and a gate electrode of the thin film transistor connected to the gate signal line; sequentially forming an insulating film and a semiconductor film on a face of the first substrate to which the first photolithography has been performed; performing a second photolithography to the semiconductor film, thereby forming a semiconductor region; sequentially forming the transmission electrode and a second metal film are formed on a face of the first substrate on which the semiconductor region has been formed; performing a third photolithography to a portion of the second metal film, the transmission electrode film, and the semiconductor region, thereby forming the source signal line, a source electrode of the thin film transistor connected to the source signal line, a drain electrode of the thin film transistor, and the transmission electrode connected to the drain electrode; applying a photosensitive film to be an interlayer insulating film on a face of the first substrate to which the third photolithography has been performed; performing a photo-process to the interlayer insulating film, thereby removing the interlayer insulating film over the transmission electrode; forming a third metal film on a face of the first substrate to which the photo-process has been performed; and performing a fifth photolithography to the third metal film and the second metal film, thereby forming a reflection electrode from the third metal film, and removing the third metal film and the second metal film over the transmission electrode, thereby forming the reflection electrode over the transmission electrode.

In one embodiment of the present invention, the semiconductor film includes a high-resistive semiconductor film and a low-resistive semiconductor film, and the third photolithography is performed to the low-resistive semiconductor film.

In another embodiment of the present invention, the method for fabricating a liquid crystal display device further includes steps of: in the first photolithography, forming a control signal input section through which a control signal is input to the gate signal line; in the third photolithography, forming a data signal input section through which a data signal is input to the source signal line; in the fourth photolithography, removing the interlayer insulating film over the control signal input section and the data signal input section and the insulating film over the control signal input section.

In still another embodiment of the present invention, the method for fabricating a liquid crystal display device further includes steps of: in the first photolithography, forming a control signal input section through which a control signal is input to the gate signal line; in the third photolithography, forming a data signal input section through which a data signal is input to the source signal line; in the photo-process, removing the insulating film over the control signal input section and the data signal input section.

In still another embodiment of the present invention, concave and convex portions are formed in a surface of the photosensitive film during the photo-process.

In still another embodiment of the present invention, the step of removing the interlayer insulating film over the transmission electrode includes a step of removing the interlayer insulating film in a region in which the transmission electrode is formed.

In still another embodiment of the present invention, in the step of forming the third metal film, the third metal film is electrically connected to the transmission electrode.

In still another embodiment of the present invention, the first metal film is formed from a first lower metal film and a first upper metal film superposed thereon, the first lower metal film is made of titanium; and the first upper metal film is made of aluminum or an aluminum alloy.

In still another embodiment of the present invention, the second metal film is formed from a second lower metal film and a second upper metal film superposed thereon, the second lower metal film is made of molybdenum; and the second upper metal film is made of aluminum or an aluminum alloy.

In still another embodiment of the present invention, the third metal film is made of aluminum.

Thus, the invention described herein makes possible the advantages of (1) providing a liquid crystal display device of a type realizing both a transmission mode display and a reflection mode display simultaneously where the light utilization efficiencies of ambient light and light from a backlight are improved compared with the conventional liquid crystal display device of the same type and an excellent display quality is obtained, and (2) providing a method for fabricating such a liquid crystal display device. In particular, in the liquid crystal display device according to the present invention, the display quality obtained when the environment is bright significantly improves.

These and other advantages of the present invention will become apparent to those skilled in the art upon reading and understanding the following detailed description with reference to the accompanying figures.

BRIEF DESCRIPTION OF THE DRAWINGS

FIG. 7 is a sectional view of a liquid crystal display device according to Example 3 of the present invention;

FIGS. 19A to 19F are sectional views taken along line F—F of FIG. 18, illustrating the process of fabricating the reflection/transmission type liquid crystal display device of Example 8;

FIG. 43 is a plan view of an active matrix substrate of a liquid crystal display device according to Example 16 of the present invention;

FIGS. 62A to 62E are cross-sectional views taken along line A—A in FIG. 60 showing fabrication steps of the TFT array substrate according to example 22.

FIGS. 62F to 62J and FIGS. 62K to 62O are cross-sectional views showing fabrication steps of the gate signal input portion and the source signal input portion according to example 22.

FIGS. 63A to 63E are cross-sectional views taken along line A—A in FIG. 60 showing fabrication steps of the TFT array substrate according to example 23.

FIGS. 63F to 63J and FIGS. 63K to 63O are cross-sectional views showing fabrication steps of the gate signal input portion and the source signal input portion according to example 23.

DESCRIPTION OF THE PREFERRED EMBODIMENTS

EXAMPLE 1

A liquid crystal display device of Example 1 according to the present invention includes an active matrix substrate and a transparent counter substrate (e.g., a glass substrate), which has a counter electrode facing pixel electrodes. A liquid crystal layer is interposed between the active matrix substrate and the counter substrate. A plurality of pixel regions are defined by respective pairs of the pixel electrodes and the counter electrode for applying a voltage to the liquid crystal layer. The pixel region includes a pair of electrodes and the liquid crystal layer between the pair of electrodes. This definition is also applicable to a simple matrix type liquid crystal display device, which has a plurality of scanning electrodes and a plurality of signal electrodes.

The liquid crystal display device according to the present invention has at least one transmission electrode region and at least one reflection region in each pixel. The transmission and reflection regions include the liquid crystal layer and the pair of the electrodes interposing the liquid crystal layer. A region of an electrode which defines the transmission region is referred to as a transmission electrode region and a region of an electrode which defines the reflection region is referred to as a reflection electrode region.

Figure 1:
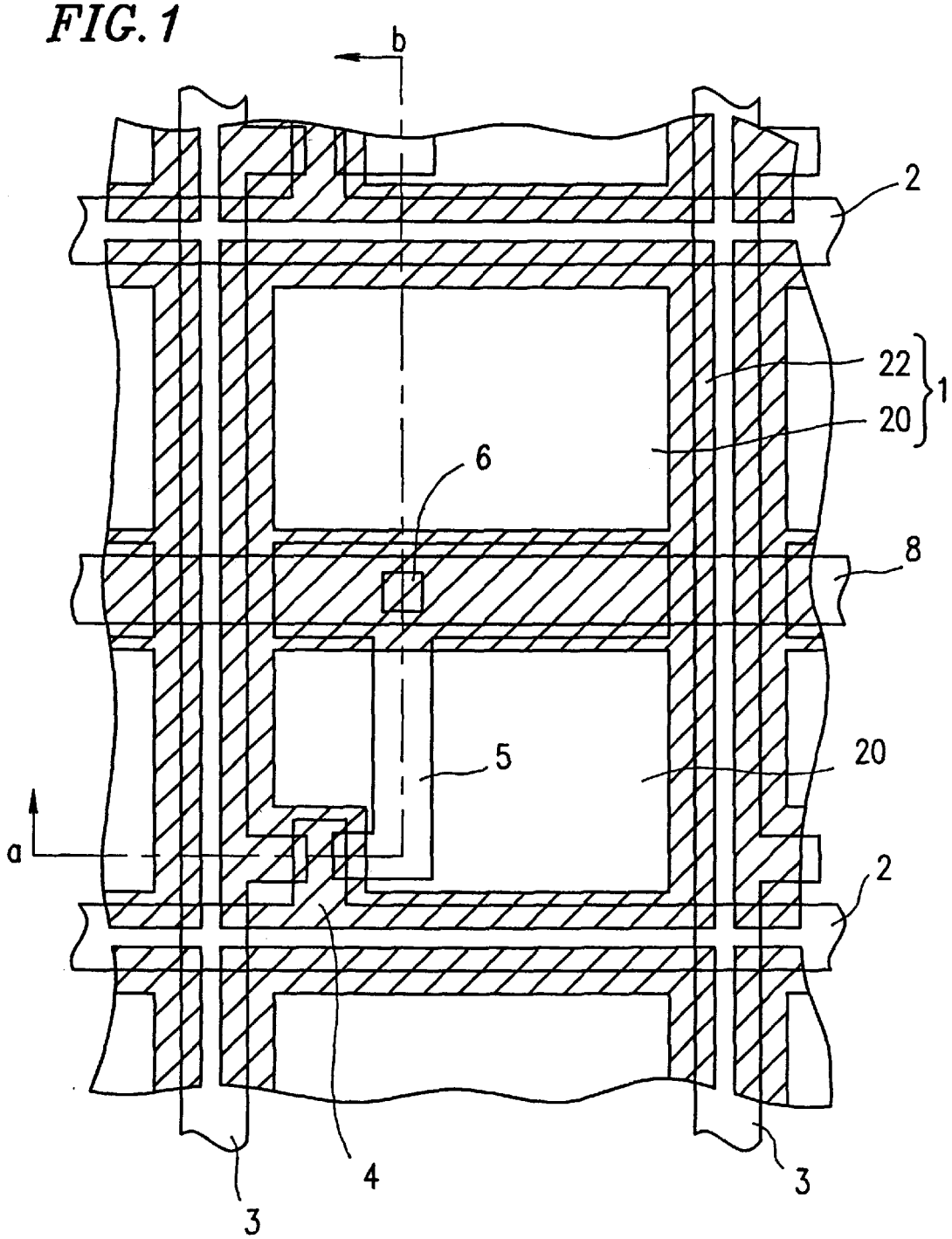
FIG. 1 is a plan view of an active matrix substrate of a liquid crystal display device according to Example 1 of the present invention.
Figure 2:
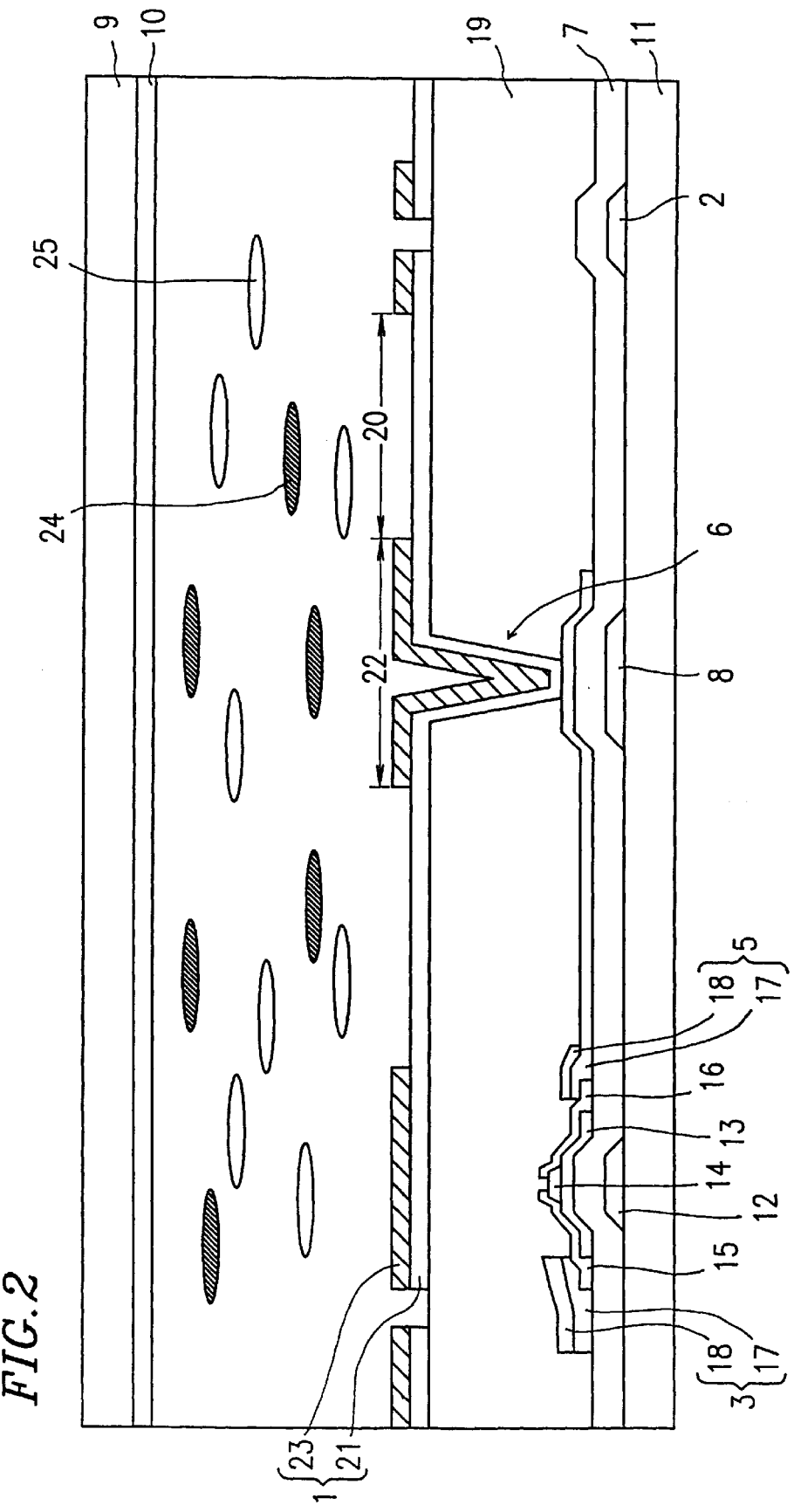
FIG. 2 is a sectional view taken along line a–b of FIG. 1.

FIG. 1 is a plan view of one pixel portion of an active matrix substrate of the liquid crystal display device of Example 1. FIG. 2 is a sectional view taken along line a–b of FIG. 1.

Referring to FIGS. 1 and 2, the active matrix substrate includes pixel electrodes 1 arranged in a matrix. Gate lines 2 for supplying scanning signals and source lines 3 for supplying display signals are disposed along the peripheries of the pixel electrodes 1 so as to cross each other at right angles.

The gate lines 2 and the source lines 3 are overlapped by peripheral portions of the corresponding pixel electrodes 1 via an interlayer insulating film 19. The gate lines 2 and the source lines 3 are composed of metal films.

Thin film transistors (TFTs) 4 are formed in the vicinity of the respective crossings of the gate lines 2 and the source lines 3. A gate electrode 12 of each of the TFTs 4 is connected to the corresponding gate line 2, to drive the TFT 4 with a signal input into the gate electrode 12 via the gate line 2. A source electrode 15 of the TFT 4 is connected to the corresponding source line 3, to receive a data signal from the source line 3. A drain electrode 16 of the TFT 4 is connected to a connecting electrode 5 which is in turn electrically connected to the corresponding pixel electrode 1 via a contact hole 6.

The connecting electrode 5 forms a storage capacitor with a storage capacitor electrode 8 via a gate insulating film 7. The storage capacitor electrode 8 is composed of a metal film and connected to a counter electrode 10 formed on a counter substrate 9 via an interconnect (not shown). The storage capacitor electrodes 8 may be formed together with the gate lines 2 during the same step.

Each of the pixel electrodes 1 includes a reflection electrode region 22 including a metal film and at least one transmission electrode region 20 composed of an ITO film. The reflection electrode region 22 is formed to overlie the gate line 2, the source line 3, the TFT 4, and the storage capacitor electrode 8, while the transmission electrode region 20 is surrounded by the reflection electrode region 22.

The active matrix substrate of Example 1 with the above construction is fabricated in the following manner.

First, the gate electrodes 12, the gate lines 2, the storage capacitor electrodes 8, the gate insulating film 7, semiconductor layers 13, channel protection layers 14, the source electrodes 15, and the drain electrodes 16 are sequentially formed on a transparent insulating substrate 11 made of glass or the like.

Then, a transparent conductive film 17 and a metal film 18 are sequentially deposited by sputtering and patterned into a predetermined shape to form the source lines 3 and the connecting electrodes 5.

Thus, the source lines 3 have a double-layer structure composed of the transparent conductive film 17 made of ITO and the metal film 18. With this structure, even if a defect such as a disconnection is generated in the metal film 18, the electrical connection is maintained via the transparent conductive film 17. This reduces the generation of disconnections in the source lines 3.

Thereafter, a photosensitive acrylic resin is applied to the resultant substrate by a spin application method to form the interlayer insulating film 19 with a thickness of 3 µm. The acrylic resin is then exposed to light according to a desired pattern and developed with an alkaline solution. Only the light-exposed portions of the film are etched with the alkaline solution to form the contact holes 6 through the interlayer insulating film 19. By employing this alkaline development, well-tapered contact holes 6 are obtained.

Using a photosensitive acrylic resin for the interlayer insulating film 19 is advantageous in the aspect of productivity in view of the following points. Since the spin application method can be employed for the thin film formation, a film as thin as several micrometers can be easily formed. Also, no photoresist application step is required at the patterning of the interlayer insulating film 19.

In this example, the acrylic resin is colored and can be made transparent by exposing the entire surface to light after patterning. The acrylic resin may also be made transparent by chemical processing.

Thereafter, a transparent conductive film 21 is formed by sputtering and patterned, thereby forming transparent conductive films 21. The transparent conductive films 21 are made of ITO.

Thus, the transparent conductive films 21 are electrically connected to the respective connecting electrodes 5 via the contact holes 6.

A metal film 23 is then formed on the transparent conductive films 21 and patterned so as to overlie the gate lines 2, the source lines 3, the TFTs 4, and the storage capacitor electrodes 8, to be used as the reflection electrode regions 22 of the pixel electrodes 1. The portions of the transparent conductive films 21 which are not covered with the metal films 23 constitute the transmission electrode regions 20. The transparent conductive films 21 and the metal films 23 are electrically connected with each other. Any adjacent pixel electrodes are separated by the portions located above the gate lines 2 and the source lines 3 so as not to be electrically connected with each other.

The metal films 23 are made of Al. They may also be made of any conductive material having a high reflectance such as Ta.

In this example, as shown in FIG. 2, a liquid crystal layer includes dichromatic pigment molecules 24 mixed in liquid crystal. The absorption coefficient of such a dichromatic pigment varies depending on the orientation direction of molecules thereof. The orientation direction of the dichromatic pigment molecules 24 changes when the orientation direction of the liquid crystal molecules 25 is changed by controlling the electric field between the counter electrode 10 and the pixel electrodes 1. The resultant change in the absorption coefficient of the dichromatic pigment molecules 24 is used to generate an image display.

By using the liquid crystal display panel of Example 1 with the above construction, the display can effectively use light which has been emitted from a backlight and passed through the transmission electrode regions 20 when the ambient light is low and light reflected by the reflection electrode regions 22 when the ambient light is high. Also, both the transmission electrode regions 20 and the reflection electrode regions 22 can be used to generate a display. Moreover, a liquid crystal display device providing a bright display can be realized.

In this example, the metal films 23 of the reflection electrode regions 22 of the pixel electrodes 1 overlie the TFTs 4, the gate lines 2, and the source lines 3. This eliminates the necessity of providing light-shading films for preventing light from entering the TFTs 4 and light-shading portions of the pixel electrodes located above the gate lines, the source lines, and the storage capacitor electrodes. In such portions, light leakage tends to be generated in the form of domains, disclination lines, and the like in certain display regions. As a result, regions which are conventionally unusable as display regions because they are blocked by the light-shading films can be used as display regions. This allows for effective use of the display regions.

When the gate lines and the source lines are made of metal, they serve as light-shading regions in a transmission type display device, and thus are unusable as display regions. In the liquid crystal display device of this example, however, such regions which are used as light-shading regions in the conventional transmission type display device are usable as reflection electrode regions of the pixel electrodes. Thus, a brighter display can be obtained.

In this example, the metal film 23 is formed on the transparent conductive film 21. This allows the metal film 23 to have an uneven surface in compliance with an uneven surface of the transparent conductive film 21. The uneven surface of the metal film 23 is advantageous over a flat surface since an uneven surface receives ambient light at various incident angles. The resultant liquid crystal display device provides a brighter display.

Figure 3:
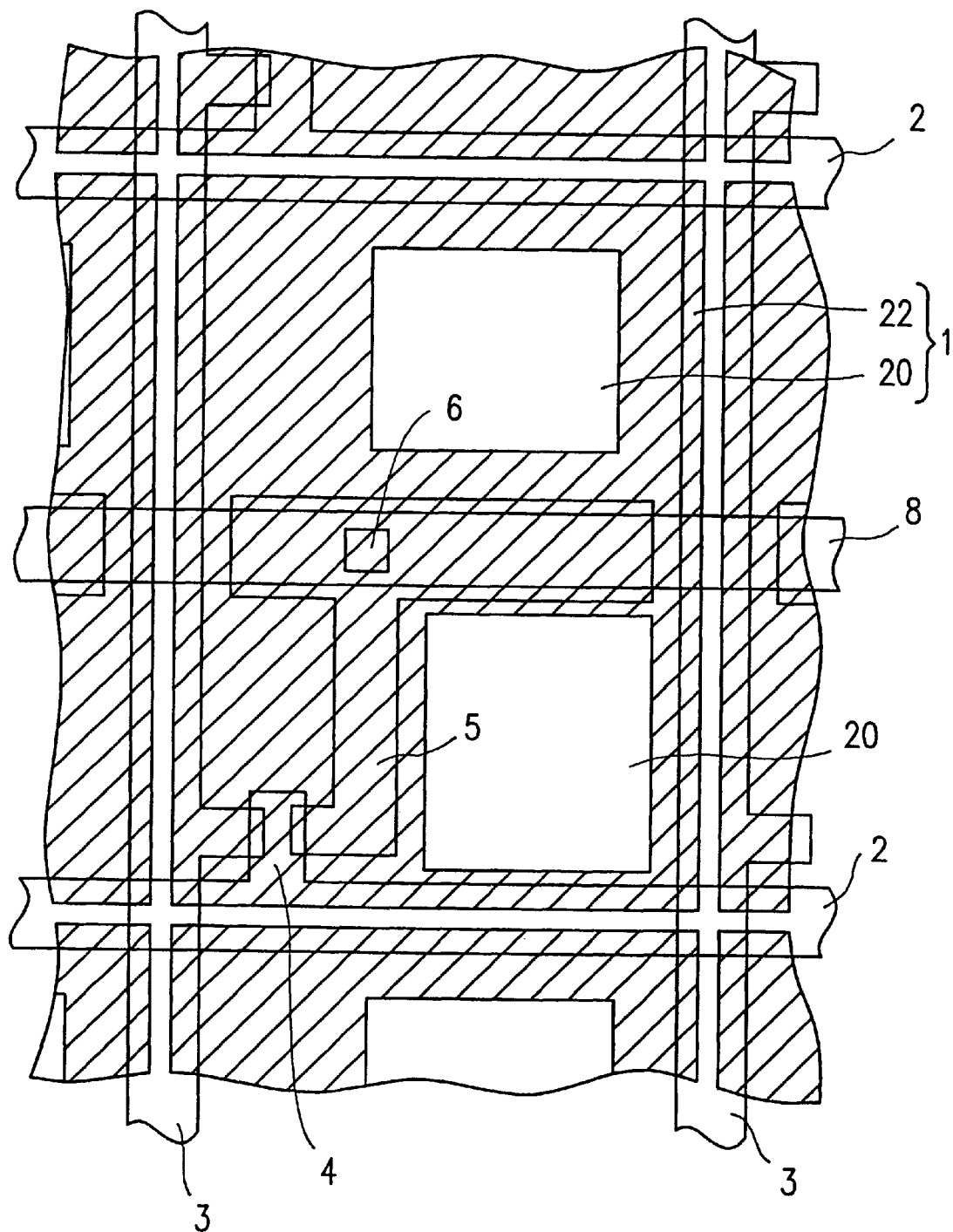
FIG. 3 is a plan view of another embodiment of the active matrix substrate according to Example 1 of the present invention.
Figure 4:
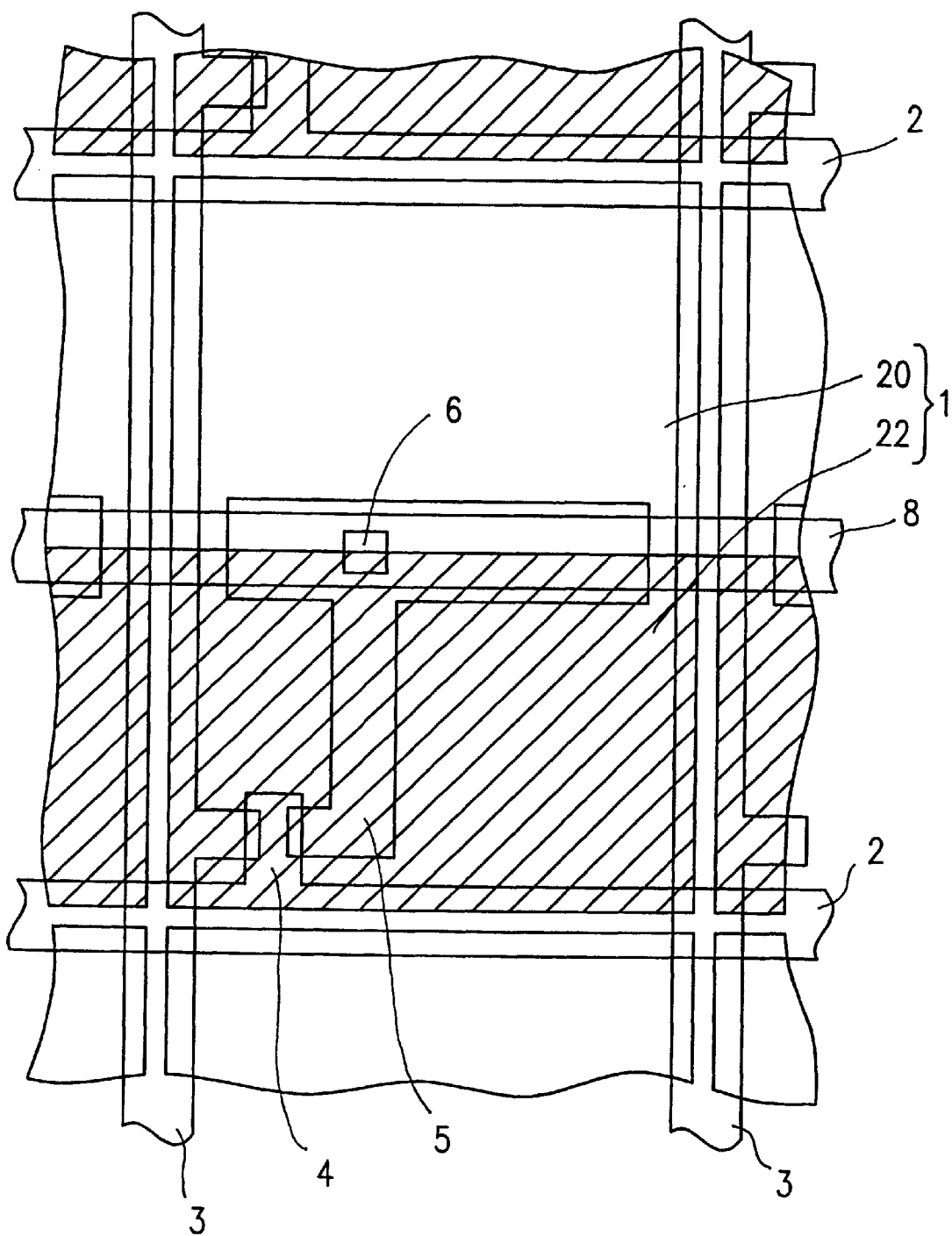
FIG. 4 is a plan view of a still another embodiment of the active matrix substrate according to Example 1 of the present invention.

FIGS. 3 and 4 are plan views of alternative embodiment of the liquid crystal display devices of Example 1 according to the present invention. In these alternative examples, the ratio of the areas of the transmission electrode region 20 to the reflection electrode region 22 of each pixel electrode 1 is changed from that shown in FIG. 1. In this way, a liquid crystal display device having a desired reflectance and transmittance is obtained.

In the alternative examples shown in FIGS. 3 and 4, the connecting electrode 5 is located in the reflection electrode region 22. This suppresses a decrease in the brightness of light which has passed through the transmission electrode region 20.

Figure 6:
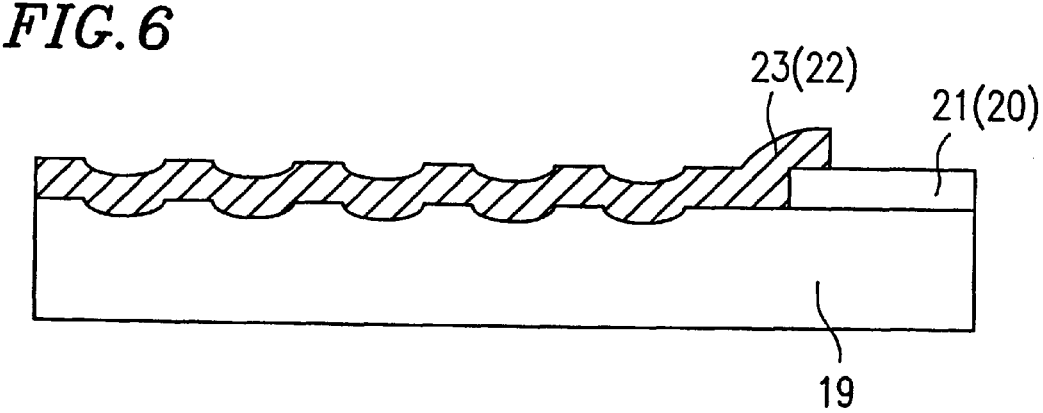
FIG. 6 is a sectional view taken along line c–d of FIG. 5.

In Example 1, the metal film 23 of the reflection electrode region 22 of the pixel electrode 1 is formed on the transparent conductive film 21. Alternatively, as shown in FIG. 6, the metal film 23 may be formed so as to overlap the transparent conductive film 21 only partially in order to be electrically connected with each other.

EXAMPLE 2

In Example 2, a method for forming the uneven surface of the metal film 23 will be described.

Figure 5:
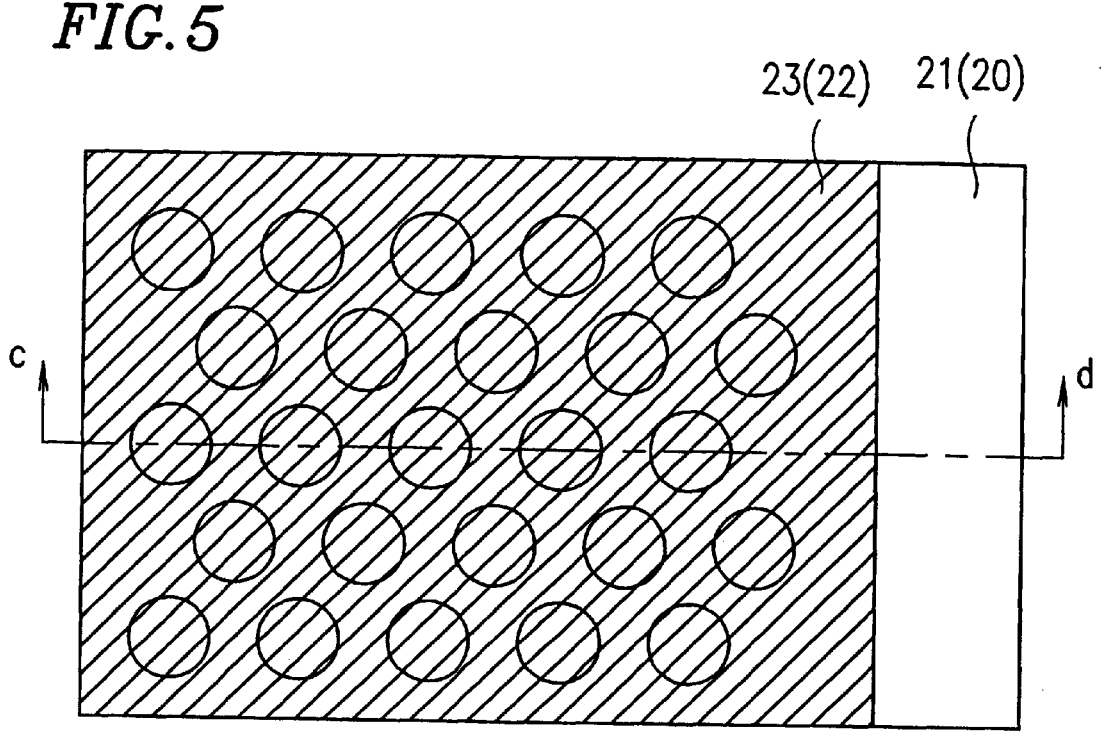
FIG. 5 is a plan view partially illustrating an interlayer insulating film and a metal film of a liquid crystal display device according to Example 2 of the present invention.

FIG. 5 is a plan view partially illustrating the metal film 23 formed on the interlayer insulating film 19 (not shown). FIG. 6 is a sectional view taken along line c–d of FIG. 5.

The surface of the interlayer insulating film 19 is made uneven by etching or the like, and the metal film 23 is formed on the uneven surface.

Thus, by forming the metal film 23 on the interlayer insulating film 19 which may be first formed flat by the spin application method or the like, but then have the surface thereof made uneven as described above, the metal film 23 having an uneven surface is obtained.

In a reflection type liquid crystal display device, the uneven surface of the metal film 23 is advantageous over a flat surface since an uneven surface receives ambient light at various incident angles. Thus, by forming the metal films 23 of the pixel electrodes 1 on the interlayer insulating film 19 so as to have an uneven surface obtained by etching or the like as shown in FIG. 6, the resultant reflective liquid crystal display device provides a brighter display.

The uneven surface of the metal film 23 is not limited to the shape shown in FIG. 5, i.e., the surface having concave portions of a circular shape in plan. Alternatively, the surface of the metal film 23 and thus the surface of the underlying interlayer insulating film 19 may have concave portions of a polygonal or elliptic shape in plan. The section of the concave portions may be of a polygonal shape, in place of the semi-circular shape as shown in FIG. 6.

EXAMPLE 3

In Example 3, a liquid crystal display device which employs a guest-host display method will be described.

FIG. 7 is a sectional view of a liquid crystal display device of this example according to the present invention. The same components as those of Example 1 are denoted by the same reference numerals as those in FIG. 2.

When the guest-host display method is employed using a mixture of a guest-host liquid crystal material, ZLI 2327 (manufactured by Merck & Co., Inc.) containing black pigments therein and 0.5% of an optically active substance, S-811 (manufactured by Merck & Co., Inc.), the following problem arises. That is, if the optical path length dt of transmitted light from the blacklight in the transmission region using the backlight is significantly different from the optical path length 2dr of reflected light from ambient light in the reflection region, the brightness and the contrast of the resultant display are significantly different between the case where light from the backlight is used and the case where ambient light is used even when the same voltage is applied to the liquid crystal layer.

Accordingly, the thickness dt of the portions of the liquid crystal layer located on the transparent conductive films 21 of the transmission regions and the thickness dr of the portions of the liquid crystal layer located on the metal films 23 of the reflection regions should be set to satisfy the relationship of dt=2dr. In this example, therefore, the thickness of the metal films 23 is changed to satisfy this relationship.

Thus, by equalizing the optical path length dt of transmitted light from the backlight in the transmission regions and the optical path length 2dr of reflected light from ambient light in the reflection region, with each other, substantially the same brightness and contrast can be obtained irrespective of which type of light is used (light from backlight or light from ambient light) so long as the same voltage is applied to the liquid crystal layer. In this way, a liquid crystal display device having better display characteristics is obtained.

The brightness and the contrast can be made uniform to some extent by approximating, not necessarily equalizing, the optical path length dt of transmitted light from the backlight in the transmission region and the optical path length 2dr of reflected light from ambient light in the reflection region.

The contrast can also be made uniform irrespective of which type of light is used (light from backlight or light from ambient light) by changing the driving voltage applied to the liquid crystal layer, even when the optical path length dt of transmitted light in the transmission region is significantly different from the optical path length 2dr of reflected light in the reflection region.

Thus, in the liquid crystal display devices in Examples 1 to 3 above, where the transmission mode display and the reflection mode display are realized using a single substrate, the regions which are conventionally blocked from light by the use of a black mask can be used as reflection electrode regions of the respective pixel electrodes. This allows for effective use of the display regions of the pixel electrodes of the liquid crystal panel, and thus increases the brightness of the liquid crystal display device.

In Examples 1 to 3, the storage capacitor electrode is provided for forming a storage capacitor with each pixel electrode via the insulating film, and the reflection electrode region of the pixel electrode overlies the storage capacitor electrode. Accordingly, the region where the storage capacitor electrode is formed can be utilized for display as a reflection electrode region of the pixel electrode.

The metal film of the reflection electrode region of each pixel electrode is formed on the transparent conductive film. By using a transparent conductive film having an uneven surface, the resultant reflection electrode region of the pixel electrode has an uneven surface, which makes it possible to utilize ambient light having various incident angles as display light.

The metal film of the reflection region of each pixel electrode may be formed on an interlayer insulating film having an uneven surface. The resultant reflection electrode region of the pixel electrode has an uneven surface, which makes it possible to utilize ambient light having various incident angles as display light.

The metal film of the reflection electrode region of each pixel electrode is made thicker than the transparent conductive film located in the transmission region of the pixel electrode. This make it possible to approximate the optical path length of ambient light which passes and returns through the portion of the liquid crystal layer located in the reflection electrode region of the pixel electrode and the optical path length of light from the backlight which passes through the portion of the liquid crystal layer located on the transmission electrode region of the pixel electrode and compare the path length to each other. By knowing the approximate optical path lengths, changes in the characteristics of light passing through the liquid crystal layer in the reflection region and the transmission region can be made uniform.

The thickness of the portion of the liquid crystal layer located on the reflection electrode region of each pixel electrode is made one half of the thickness of the portion of the liquid crystal layer located on the transmission electrode region thereof. This makes it possible to approximate the optical path length of ambient light which passes and returns through the portion of the liquid crystal layer located on the reflection electrode region of the pixel electrode and the optical path length of light from the backlight which passes through the portion of the liquid crystal layer located on the transmission electrode region of the pixel electrode and compare the path length to each other. By knowing the approximate optical path lengths, changes in the characteristics of light passing through the liquid crystal layer in the reflection region and the transmission region can be made uniform.

EXAMPLE 4

Figure 8A:
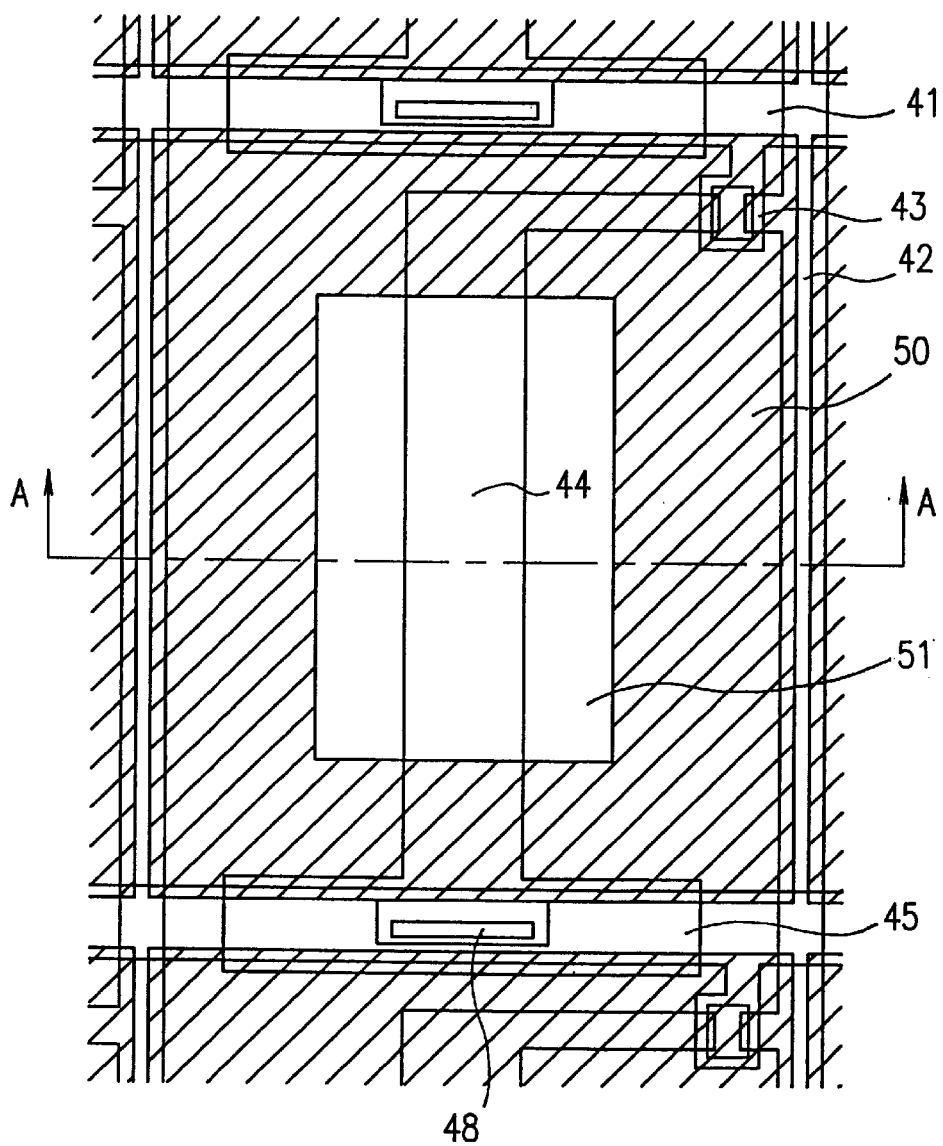
FIG. 8A is a plan view of an active matrix substrate of a liquid crystal display device according to Example 4 of the present invention.
Figure 8B:
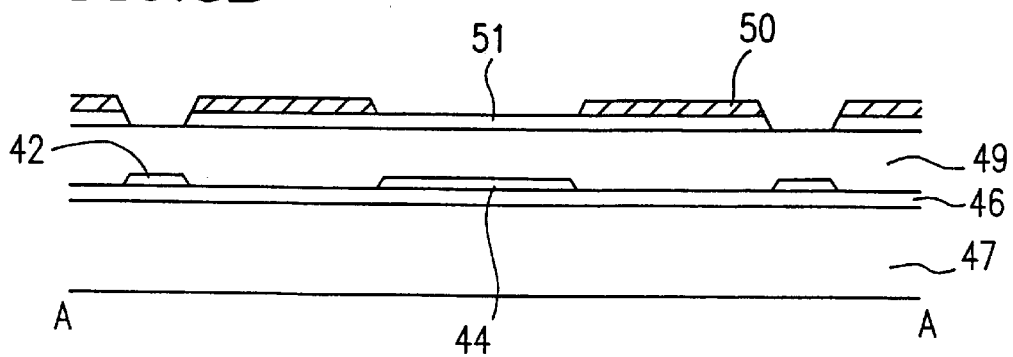
FIG. 8B is a sectional view taken along line A—A of FIG. 8A.

FIG. 8A is a plan view of one pixel portion of an active matrix substrate of a liquid crystal display device of Example 4 according to the present invention. FIG. 8B is a sectional view taken along line A—A of FIG. 8A.

The active matrix substrate of this example includes gate lines 41, data lines 42, driving elements 43, drain electrodes 44, storage capacitor electrodes 45, a gate insulating film 46, an insulating substrate 47, contact holes 48, an interlayer insulating film 49, reflection pixel electrodes 50, and transmission pixel electrodes 51.

Each of the storage capacitor electrodes 45 is electrically connected to the corresponding drain electrode 44 and overlaps the corresponding gate line 41 via the gate insulating film 46. The contact holes 48 are formed through the interlayer insulating film 49 to connect the transmission pixel electrodes 51 and the storage capacitor electrodes 45.

Each pixel of the active matrix substrate with the above construction includes a reflection pixel electrode 50 and a transmission pixel electrode 51. Thus, as shown in FIG. 8B, each pixel is composed of the reflection electrode region, including the reflection pixel electrode 50, which reflects light from outside, and the transmission electrode region, including the transmission pixel electrode 51, which transmits light from a backlight.

Figure 9:
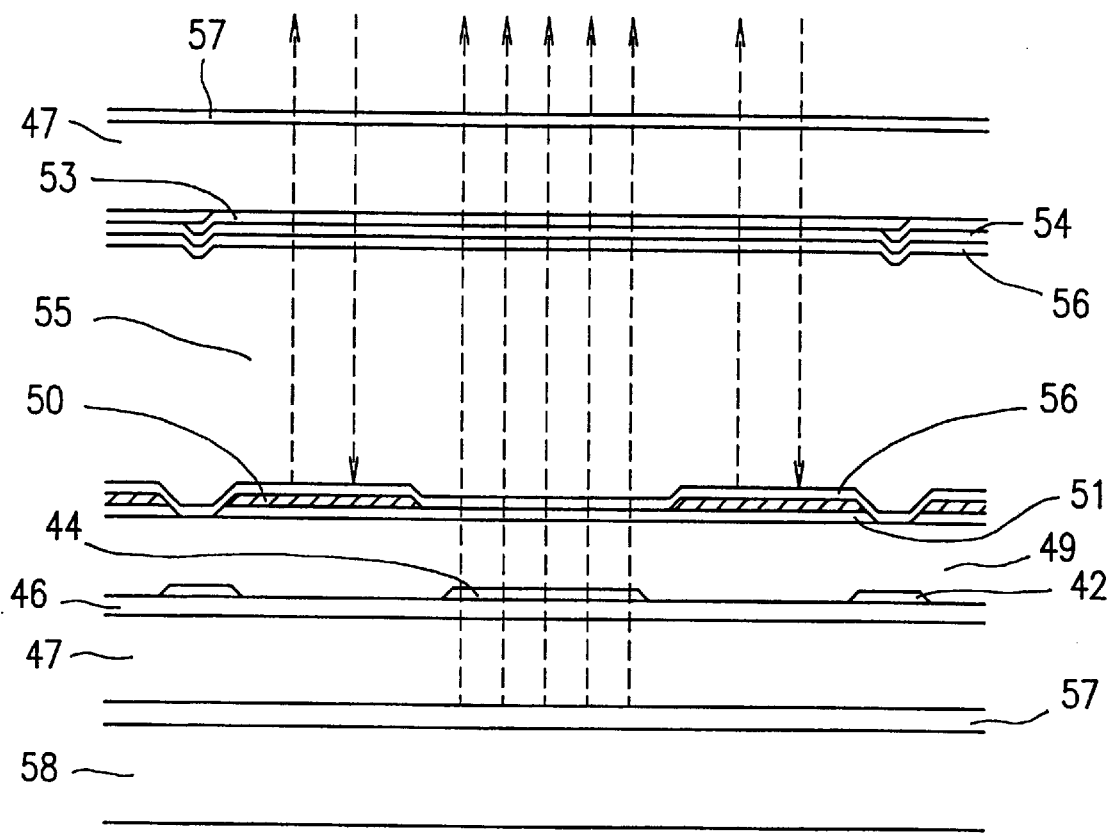
FIG. 9 is a sectional view of the liquid crystal display device according to Example 4 of the present invention.

FIG. 9 is a sectional view of a liquid crystal display device of this example including the active matrix substrate shown in FIGS. 8A and 8B. The liquid crystal display device also includes a color filter layer 53, a counter electrode 54, a liquid crystal layer 55, alignment films 56, a polarizing plate 57, and a backlight 58.

The regions of the transmission pixel electrodes 51 (transmission electrode region) which transmit light from the backlight 58 do not contribute to the brightness of the panel when the backlight 58 is off. Conversely, the regions of the reflection pixel electrodes 50 (reflection electrode region) which reflect light from outside contribute to the brightness of the panel regardless of the ON/OFF state of the backlight 58. In each pixel, therefore, the area of the reflection electrode region is desirably larger than the area of the transmission electrode region.

In this example, the reflection pixel electrode 50 is formed on the corresponding transmission pixel electrode 51 so as to be electrically connected to each other so that the same signals are input into the reflection pixel electrode 50 and the transmission pixel electrode 51. Alternatively, the reflection pixel electrode 50 and the transmission pixel electrode 51 may not be electrically connected to each other so as to receive different signals for different displays.

Figure 10:
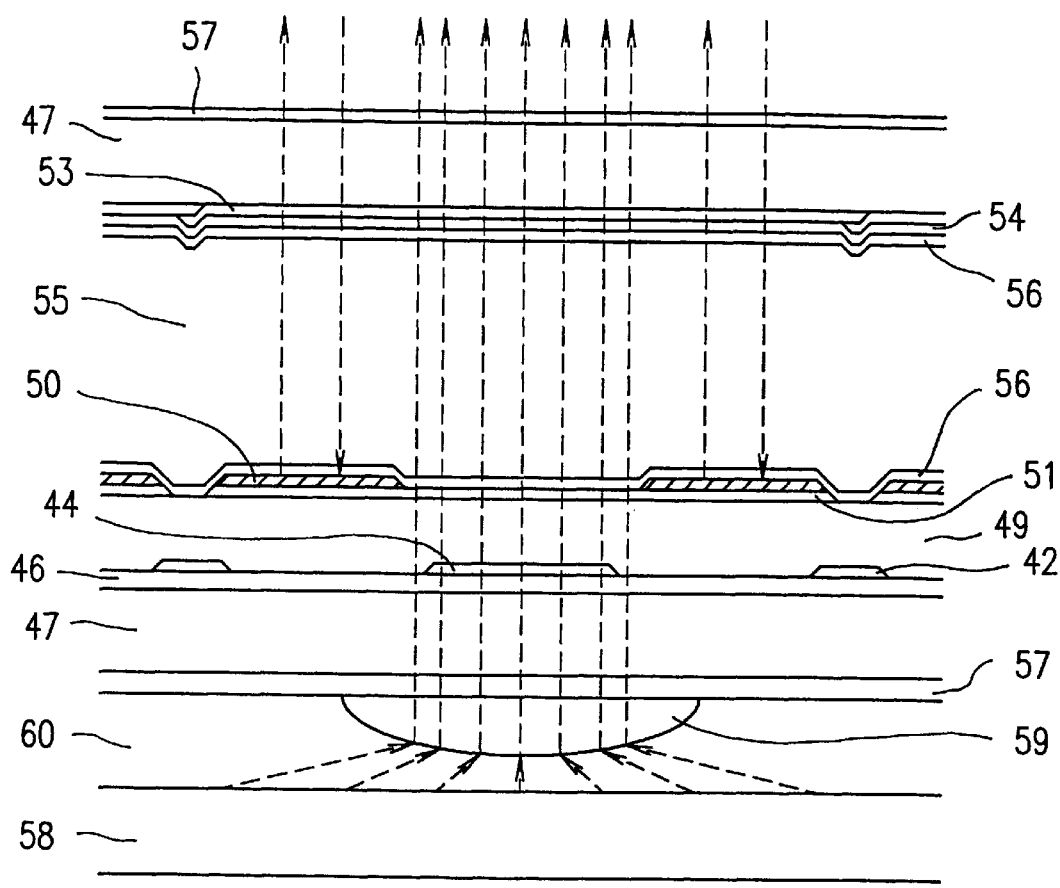
FIG. 10 is a sectional view of an alternative embodiment of the liquid crystal display device according to Example 4 of the present invention, provided with microlenses.

In the liquid crystal display device shown in FIG. 9, part of the light from the backlight 58 incident on the reflection pixel electrode 50 is not usable as display light. In order to overcome this problem, a modified liquid crystal display device shown in FIG. 10 includes a microlens 59 and a microlens protection layer 60 for each pixel. With this construction, light from the backlight 58 is converged on the transmission electrode region on which the reflection pixel electrode 50 is not formed, via the microlens 59, to increase the amount of light which passes through transmission region and thus to improve the brightness of display.

Figure 11A:
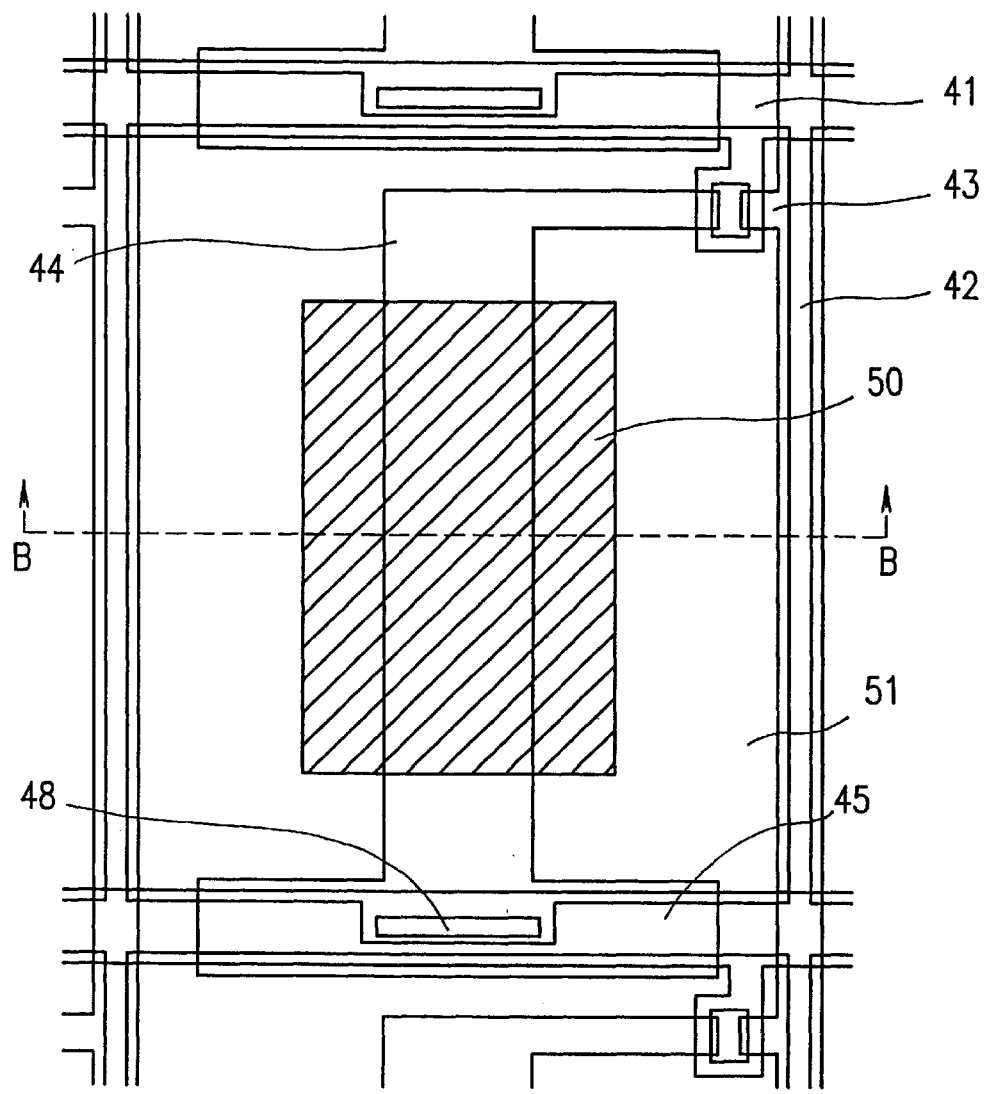
FIG. 11A is a plan view of an alternative embodiment of the active matrix substrate of the liquid crystal display device according to Example 4 of the present invention.
Figure 11B:
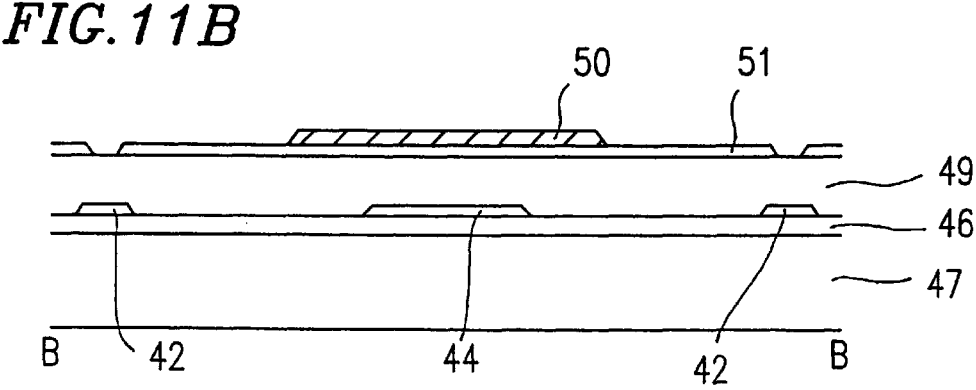
FIG. 11B is a sectional view taken along line B—B of FIG. 11A.

FIG. 11A is a plan view of one pixel portion of an alternative active matrix substrate of the liquid crystal display device of Example 4 according to the present invention. FIG. 11B is a sectional view taken along line B—B of FIG. 11A.

In the active matrix substrate shown in FIGS. 11A and 11B, the region of the transmission pixel electrode 51 and the region of the reflection pixel electrode 50 of each pixel are reversed from those of the active matrix substrate shown in FIGS. 8A and 8B. The ratio of the areas of the region of the reflection pixel electrode 50 and the region of the transmission pixel electrode 51 may be changed appropriately.

When the active matrix substrate shown in FIGS. 8A and 8B and that shown in FIGS. 11A and 11B are compared, the active matrix substrate shown in FIGS. 8A and 8B is advantageous in the points that light from outside is prevented from entering the driving element 43 since the reflection pixel electrode 50 is formed over the driving element 43 and that the formation of the microlens 59 for converging light is easier since the region of the transmission pixel electrode 51 is located in the center of each pixel.

In this example, since the light reflection region and the light transmission region are formed in one pixel, the aperture ratio of the pixel is as large as possible. To satisfy this, a high aperture structure is adopted in this example where the interlayer insulating film 49, composed of an organic insulating film, is interposed between the pixel electrodes and the levels of the gate lines 41 and the source lines 43. Other structures may also be adopted.

EXAMPLE 5

Figure 12A:
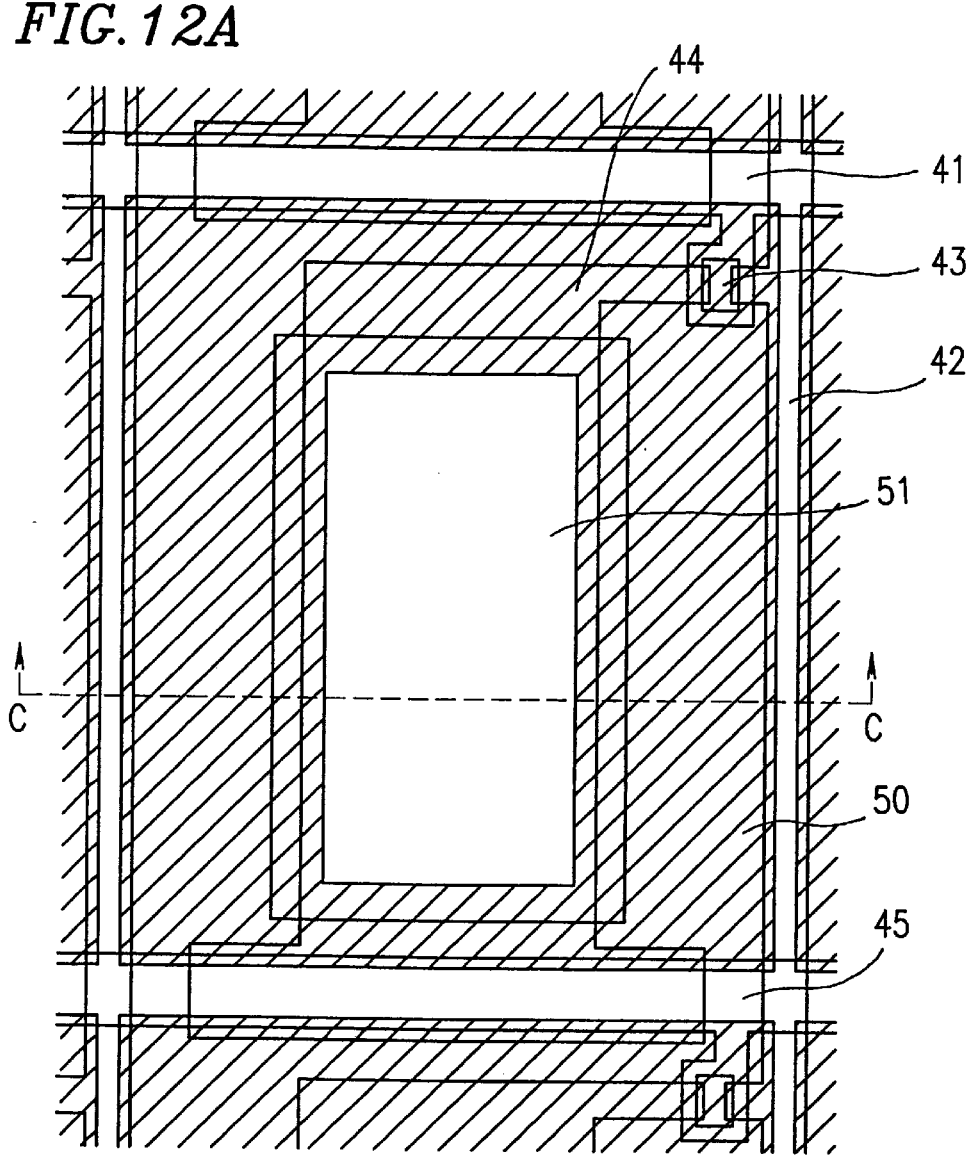
FIG. 12A is a plan view of an active matrix substrate of a liquid crystal display device according to Example 5 of the present invention.
Figure 12B:
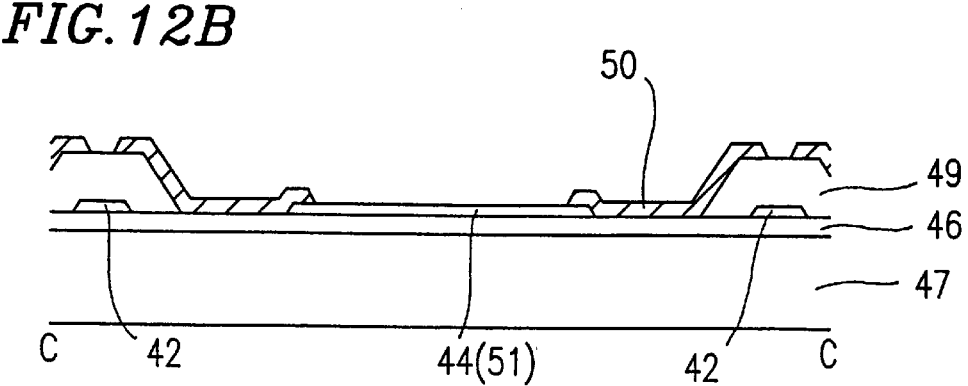
FIG. 12B is a sectional view taken along line C—C of FIG. 12A.

FIG. 12A is a plan view of one pixel portion of an active matrix substrate of a liquid crystal display device of Example 5 according to the present invention. FIG. 12B is a sectional view taken along line C—C of FIG. 12A.

In the active matrix liquid crystal display device of Example 5, reflection pixel electrodes 50 are formed on tilted or concave and convex portions of an interlayer insulating film 49. Light from outside is therefore reflected from the reflection pixel electrodes 50 in a wider range of directions, so that the angle of visibility becomes wider.

The interlayer insulating film 49 in this example is formed so as to be thickest at portions located above gate lines 41 and source lines 42 and be completely etched away at portions located above drain electrodes 44, forming the tilted or concave and convex portions. This eliminates the necessity of forming contact holes for electrically connecting the drain electrodes 44 and the reflection pixel electrodes 50, and thus prevents a disturbance in the orientation of liquid crystal molecules from occurring due to sharp steps at contact holes. This contributes to an increase in the aperture ratio.

In this example, the drain electrodes 44, which are transparent electrodes made of ITO, serve as the transmission pixel electrodes 51.

The tilt angle of the tilted portions or the pitch of the concave and convex portions of the interlayer insulating film 49 should be sufficiently small so that an alignment film can be formed on the resultant substrate and rubbed. Thus, optimal conditions should be determined depending on the respective rubbing conditions and the types of liquid crystal molecules.

In this example, as in Example 4, microlenses may be provided below the drain electrodes 44 as the transmission pixel electrodes 51, to improve the brightness of the display when the backlight is on.

EXAMPLE 6

Figure 13A:
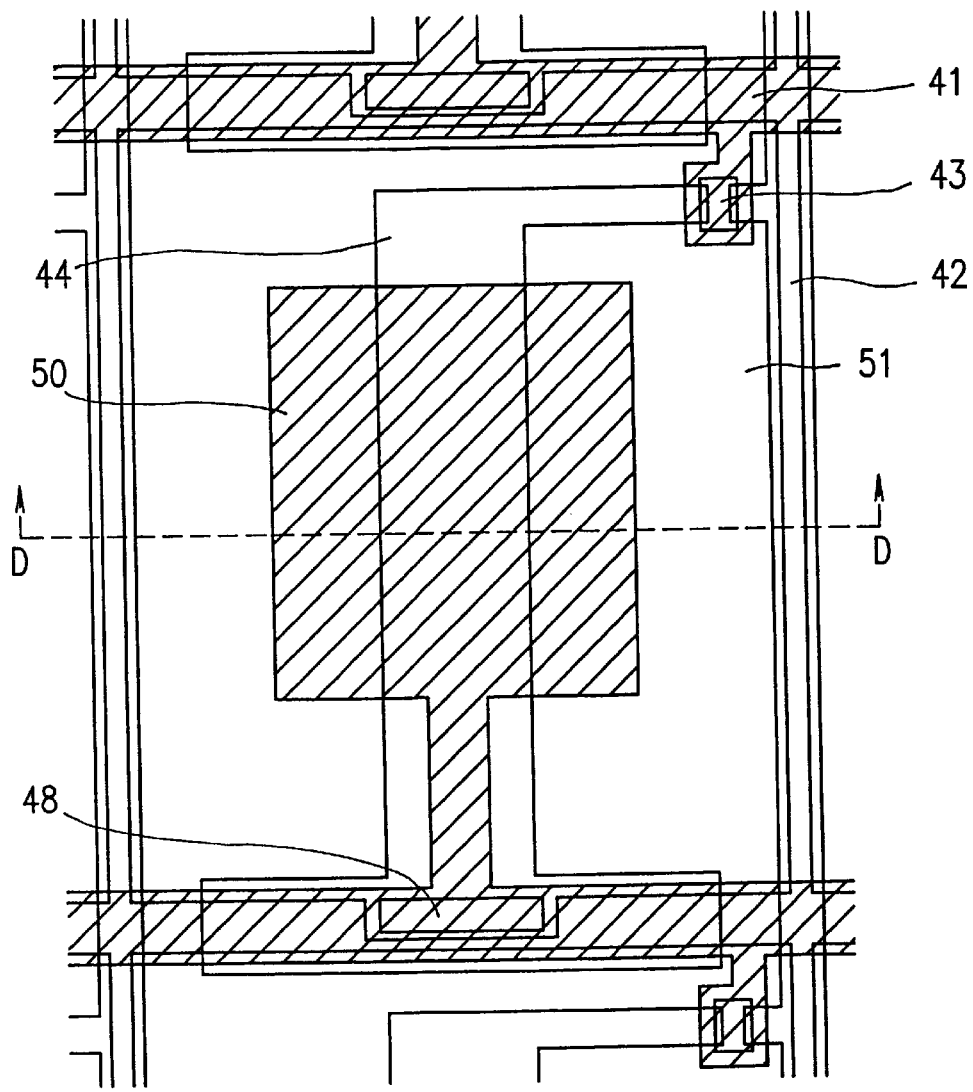
FIG. 13A is a plan view of an active matrix substrate of a liquid crystal display device according to Example 6 of the present invention.
Figure 13B:
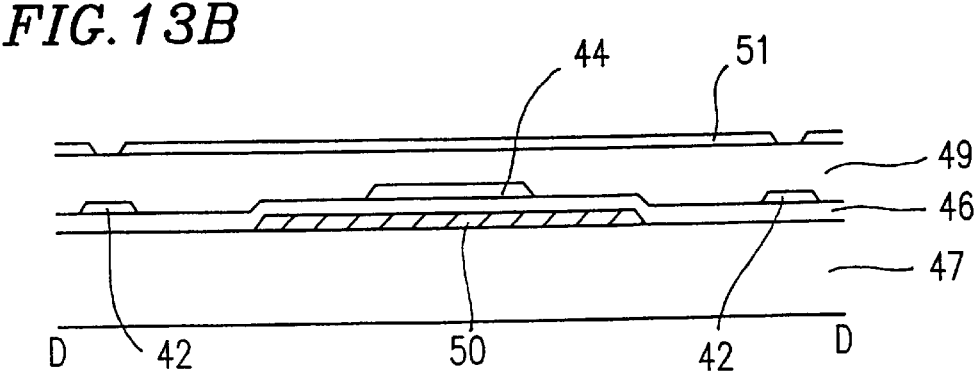
FIG. 13B is a sectional view taken along line D—D of FIG. 13A.

FIG. 13A is a plan view of one pixel portion of an active matrix substrate of a liquid crystal display device of Example 6 according to the present invention. FIG. 13B is a sectional view taken along line D—D of FIG. 13A.

In this example, reflection pixel electrodes 50 are formed at the same level as gate lines 41 at and during the same step. With this configuration, since a separate step for forming the reflection pixel electrodes 50 is not required, the number of steps and the production cost do not increase.

In this example, the reflection pixel electrodes 50 are not connected to drain electrodes 44 constituting driving elements 43, but are used only for the reflection of light from outside. Only the transmission pixel electrodes 51 serve as the electrodes for driving the liquid crystal. In other words, the transmittance of light reflected by the reflection pixel electrodes 50 is controlled by controlling the liquid crystal layer with a voltage at the transmission pixel electrodes 51.

If no signal is input into each of the reflection pixel electrodes 50, a floating capacitance is generated between the reflection pixel electrode 50 and the corresponding drain electrode 44 or transmission pixel electrode 51. To avoid this problem, the reflection pixel electrodes 50 should desirably be provided with such a signal that does not adversely affect the display. By connecting each of the reflection pixel electrodes 50 with an adjacent gate line 41, the generation of a floating capacitance is prevented, and a storage capacitor can be formed between a reflection pixel electrode 50 and a corresponding drain electrode 44.

In this example, as in Example 4, microlenses may be provided to converge light on the transmission pixel electrodes, to improve the brightness of display when the backlight is on.

In this example, also, since the light reflection region and the light transmission region are formed in one pixel, the aperture ratio of the pixel is as large as possible. To satisfy this, a high aperture structure is adopted where an organic insulating film is used as the interlayer insulating film. Other structures may also be adopted.

EXAMPLE 7

Figure 14A:
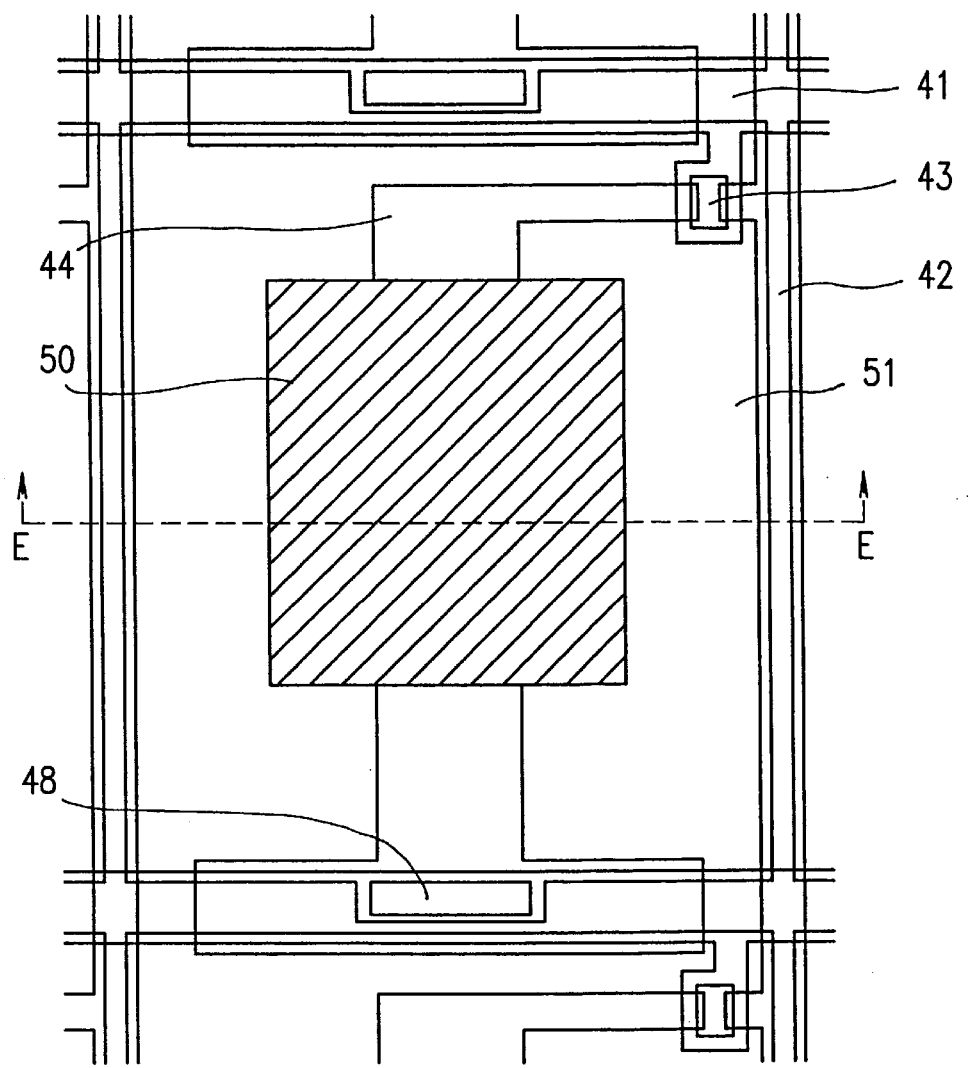
FIG. 14A is a plan view of an active matrix substrate of a liquid crystal display device according to Example 7 of the present invention.
Figure 14B:
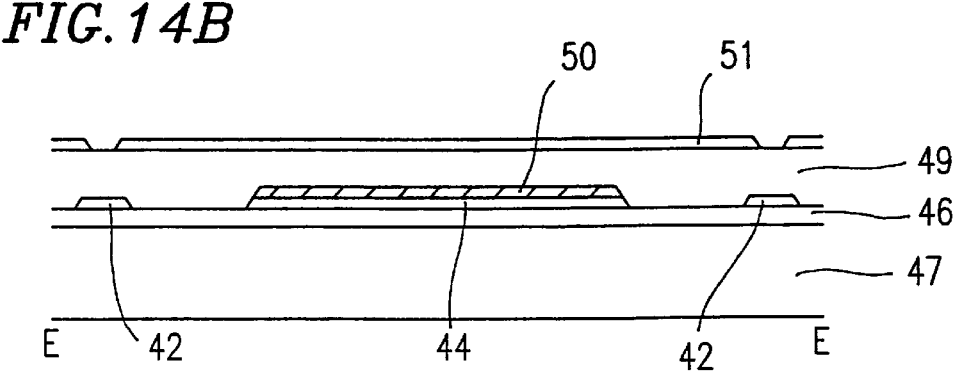
FIG. 14B is a sectional view taken along line E—E of FIG. 14A.

FIG. 14A is a plan view of one pixel portion of an active matrix substrate of a liquid crystal display device of Example 7 according to the present invention. FIG. 14B is a sectional view taken along line E—E of FIG. 14A.

In this example, reflection pixel electrodes 50 are formed at the same level as source lines 42. With this configuration, since the reflection pixel electrodes 50 can be formed at the formation of the source lines 42, the number of steps and the production cost do not increase.

In this example, since a high aperture structure via an interlayer insulating film 49 is adopted, the reflection pixel electrodes 50 are used only for the reflection of light from outside. Only transmission pixel electrodes 51 serve as the electrodes for driving the liquid crystal.

This example is different from Example 6 in that in this example the reflection pixel electrode 50 in each pixel is electrically connected to the corresponding drain electrode 44. In an alternative case where the interlayer insulating film 49 is not formed at the region above the drain electrode 44 and the drain electrode 44 is used as the transmission pixel electrode, the reflection pixel electrode 50 also contributes to the driving of the liquid crystal molecules.

In this example, as in Example 4, microlenses may be provided to converge light on the transmission pixel electrodes 51, to improve the brightness of display when the backlight is on.

In this example, also, since the light reflection region and the light transmission region are formed in one pixel, the aperture ratio of the pixel is as large as possible. To satisfy this, a high aperture structure is adopted where an organic insulating film is used as the interlayer insulating film. Other structures may also be adopted.

Thus, in Examples 4 to 7 above according to the present invention, the active matrix liquid crystal display device capable of switching between the reflection type and the transmission type is realized.

Such a liquid crystal display device can provide a sufficient brightness irrespective of the conditions of use, while realizing a reduced power consumption and a prolonged use duration, by the user's switching the mode between the transmission type and the reflection type depending on the use conditions.

Also realized is a transmission/reflection switchable active matrix liquid crystal display device which can be used as a reflection type liquid crystal display device when the environment is bright and as a transmission type liquid crystal display device when the environment is dark.

Since the reflection pixel electrodes and the transmission pixel electrodes are electrically connected with each other, no interconnect is required to supply the driving signals independently. This simplifies the construction of the active matrix substrate.

When the reflection pixel electrodes are formed above the driving elements, light from outside is prevented from entering the driving elements.

The transmission pixel electrodes do not contribute to the brightness of the panel when the backlight is off, while the reflection pixel electrode s contribute to the brightness of the panel regardless of the ON/OFF state of the backlight. Accordingly, by increasing the area of the reflection pixel electrodes, the brightness of display can be stabilized even when the backlight is off or emits less light.

Light from the backlight which is blocked by the reflection pixel electrodes, the gate lines, and the like can be converged on the transmission pixel electrodes. This makes it possible to increase the brightness of the display device without increasing the brightness of the backlight itself.

The reflection pixel electrodes can be made to reflect light from outside in a wide range of directions. This allows for a wider angle of visibility.

The reflection pixel electrodes may be formed without an additional step for this formation. This prevents the number of steps and the production cost from increasing.

The reflection pixel electrodes may be electrically connected to the gate lines. This prevents the generation of a floating capacitance and allows for the formation of a storage capacitor with the drain electrodes.

The reflection pixel electrodes may be provided with the same signals as those applied to the counter electrode. This prevents the generation of a floating capacitance. Also, the reflection pixel electrodes may be used for the formation of a storage capacitor for the voltage applied to the pixel electrodes.

EXAMPLE 8

In Example 8, a reflection/transmission type liquid crystal display device according to the present invention will be described.

First, the principle of the generation of an interference color in the liquid crystal display device of Example 8 will be described.

Figure 23:
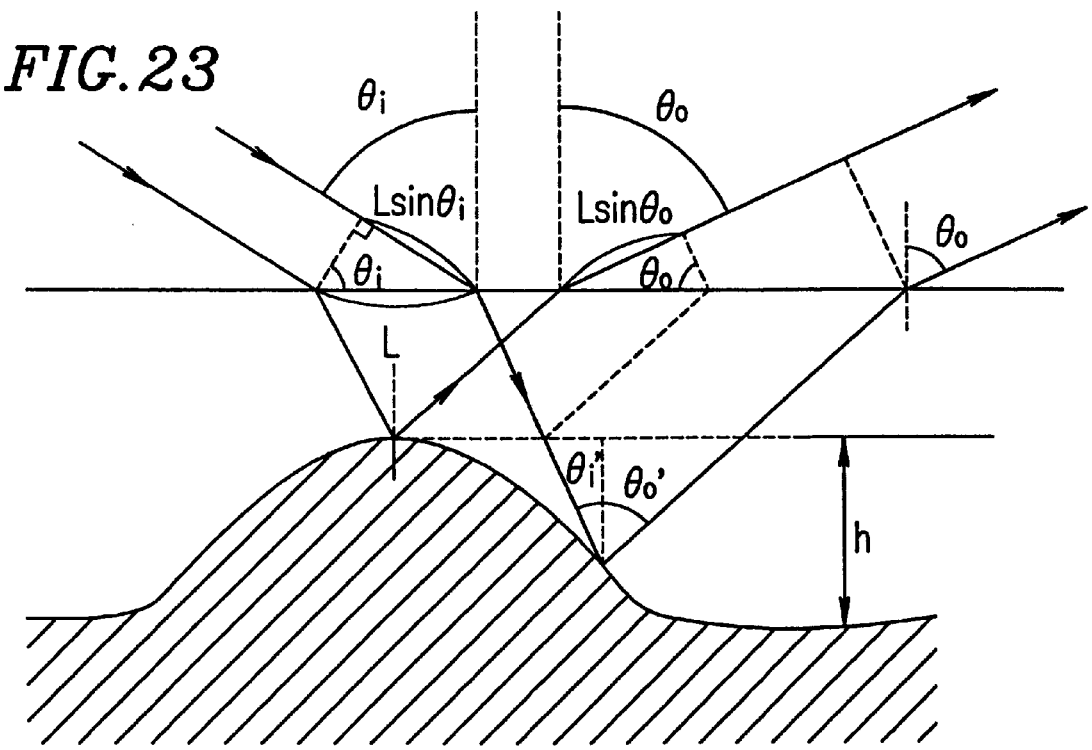
FIG. 23 is a conceptual view illustrating the generation of interference light.

FIG. 23 is a conceptual view illustrating the generation of an interference color. Light is incident on a glass substrate and the incident light is reflected by a reflection film to be output from the glass substrate.

In the above case, an interference color is considered to be generated when light incident at an incident angle $\theta i$ is reflected from a convex portion and a concave portion of the reflection film and output at an output angle $\theta o$. The optical path difference $\delta$ between the two reflected light beams is represented by expression (1) below:

$$\delta = L\sin\theta i + h(1/\cos\theta i' + 1/\cos\theta o') \cdot n - \qquad (1)$$

$$\{L\sin\theta o + h(\tan\theta i' + \tan\theta o')\sin\theta o\}$$

-continued $$= L(\sin\theta i - \sin\theta o) + h\{(1/\cos\theta i' + 1/\cos\theta o') \cdot n -$$

$$(\tan\theta i' + \tan\theta o')\sin\theta o\}$$

wherein $\theta i'$ is the incident angle at the concave portion of the reflection film, $\theta o'$ is the output angle at the concave portion of the reflection film, L is the distance between the incident points of the two light beams on the glass substrate, h is the height of the point on the convex portion of the reflection film from which one of the light beams is reflected, with respect to the point on the concave portion thereof from which the other light beam is reflected, and n is the refractive index of the glass substrate.

Since the calculation of expression (1) is possible only when $\theta i=\theta o$ and $\theta i'=\theta o'$, the optical path difference $\delta$ is simplified into expression (2) below when $\theta i=\theta o=\theta$ and $\theta i'=\theta o'=\theta'$.

$$\delta = h\{2n/\cos\theta' - 2\tan\theta' \cdot \sin\theta\} \qquad (2)$$

When arbitrary wavelengths $\lambda 1$ and $\lambda 2$ are taken into consideration, the output light beams reflected from the convex portion and the concave portion are weakened by each other when $\delta/\lambda 1 = m \pm \frac{1}{2}$ (m is an integer) and intensified by each other when $\delta/\lambda 2 = m$. Thus, expression (3) below is established.

$$\delta = (1/\lambda 1 - 1/\lambda 2) = \frac{1}{2} \qquad (3)$$

Expression (3) above is also represented by expression (4) below:

$$\delta = (\lambda 1 \cdot \lambda 2)/2 \cdot (\lambda 2 - \lambda 1) \qquad (4)$$

Accordingly, from expressions (2) and (4) above, the height h can be represented by expression (5) below:

$$h = \frac{1}{2} \cdot \{(\lambda 1 \cdot \lambda 2)/(\lambda 2 - \lambda 1)\} \cdot \{\cos\theta'/(2n - 2\sin\theta' \cdot \sin\theta)\} \qquad (5)$$

From the above, it has been found that, in order to eliminate the generation of an interference color, the reflection surface of the reflection film should have a continuous wave shape.

In this example, in order to form such a reflection film, at least two types of convex portions with different heights are formed on a base plate, a polymer resin film is formed on the base plate covering the convex portions, and a reflection thin film made of a material having a high light reflection efficiency is formed on the polymer resin film.

The thus-fabricated reflection thin film can be used for the reflection portions of the reflection/transmission type liquid crystal display device. Since such reflection portions have a reflection surface of a continuous wave shape, light reflected from the reflection portions is prevented from generating an interference. When the convex portions are optically formed by use of a photomask, they can be formed with good reproducibility by setting the same light irradiation conditions.

In the reflection/transmission type liquid crystal display device of this example, the convex portions are preferably not formed in the transmission portions made of a material having a high light transmission efficiency in order to improve the transmission efficiency. However, the display by use of transmitted light is possible even if the convex portions are formed in the transmission portions.

Figure 15:
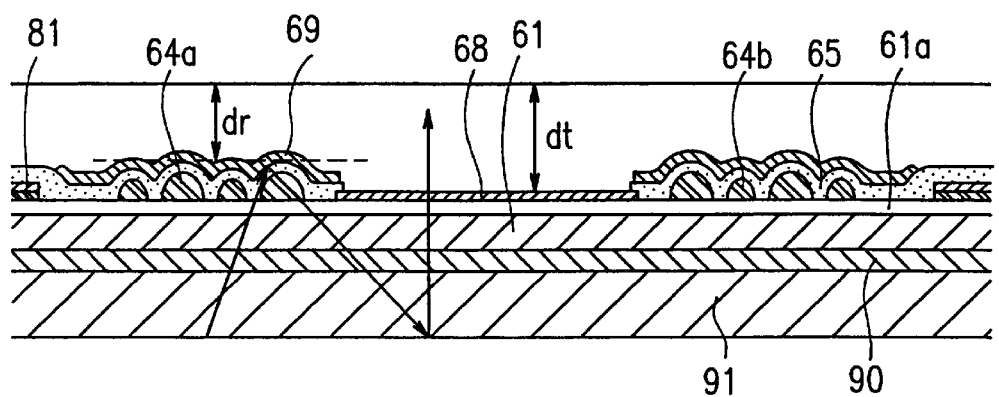
FIG. 15 is a sectional view for explaining a reflection/transmission type liquid crystal display device according to Example 8 of the present invention.

FIG. 15 is a sectional view of a reflection/transmission type liquid crystal display device of this example according to the present invention.

Referring to FIG. 15, a gate insulating film 61a is formed on a glass substrate 61. High convex portions 64a and low convex portions 64b are formed randomly on the portions of the glass substrate 61 located below reflection electrodes 69 having a light reflection function. The high convex portions 64a and the low convex portions 64b are covered with a polymer resin film 65.

Since the high convex portions 64a and the low convex portions 64b are formed on the glass substrate 61 via the gate insulating film 61a, the upper surfaces of the portions of the polymer resin film 65 formed on the high convex portions 64a and the low convex portions 64b are of a continuous wave shape. The polymer resin film 65 is formed almost all over the glass substrate 61, not only in the regions below the reflection electrodes 69.

The reflection electrodes 69, which are made of a material having a light reflection function, are formed on the portions of the polymer resin film 65 having the continuous wave shape which are formed on the high convex portions 64a and the low convex portions 64b.

Transmission electrodes 68 are also formed on the glass substrate 61 via the gate insulting film 61a, separately from the reflection electrodes 69. The transmission electrodes 68 are made of a material having a light transmission function, such as indium tin oxide (ITO).

A polarizing plate 90 is attached to the back surface of the thus-fabricated active matrix substrate when it is mounted as a module. A backlight 91 is then disposed on the polarizing plate 90.

Part of light emitted form the backlight 91 and directed to the transmission electrodes 68 passes through the transmission electrodes 68 and thus the active matrix substrate. However, part of light directed to the reflection electrodes 69 is reflected from the back surfaces of the reflection electrodes 69 to return to the backlight 91. Since the back surfaces of the reflection electrodes 69 are of a continuous wave shape, light reflected from the reflection electrodes 69 is scattered as shown by the arrows in FIG. 15. Such scattered light is again reflected from the backlight 91 toward the active matrix substrate. Part of such light passes through the transmission electrodes 68 and thus the active matrix substrate.

Thus, in the active matrix substrate including the reflection electrodes 69 of the above-described shape, the light from the backlight reflected by the reflection electrodes 69 can be used for display. This allows for more effective use of light than that expected from an actual aperture ratio, unlike the conventional transmission type liquid crystal display device. Specifically, if the reflection electrodes are of a flat shape, regular reflection is mainly generated, which is difficult to be reflected again to pass through the transmission electrodes 68. In this example, however, the reflection electrodes 69 of a continuous wave shape serve to return the reflected light toward the portions of the backlight located below the transmission electrodes 68, allowing for further effective use of light.

Figure 16:
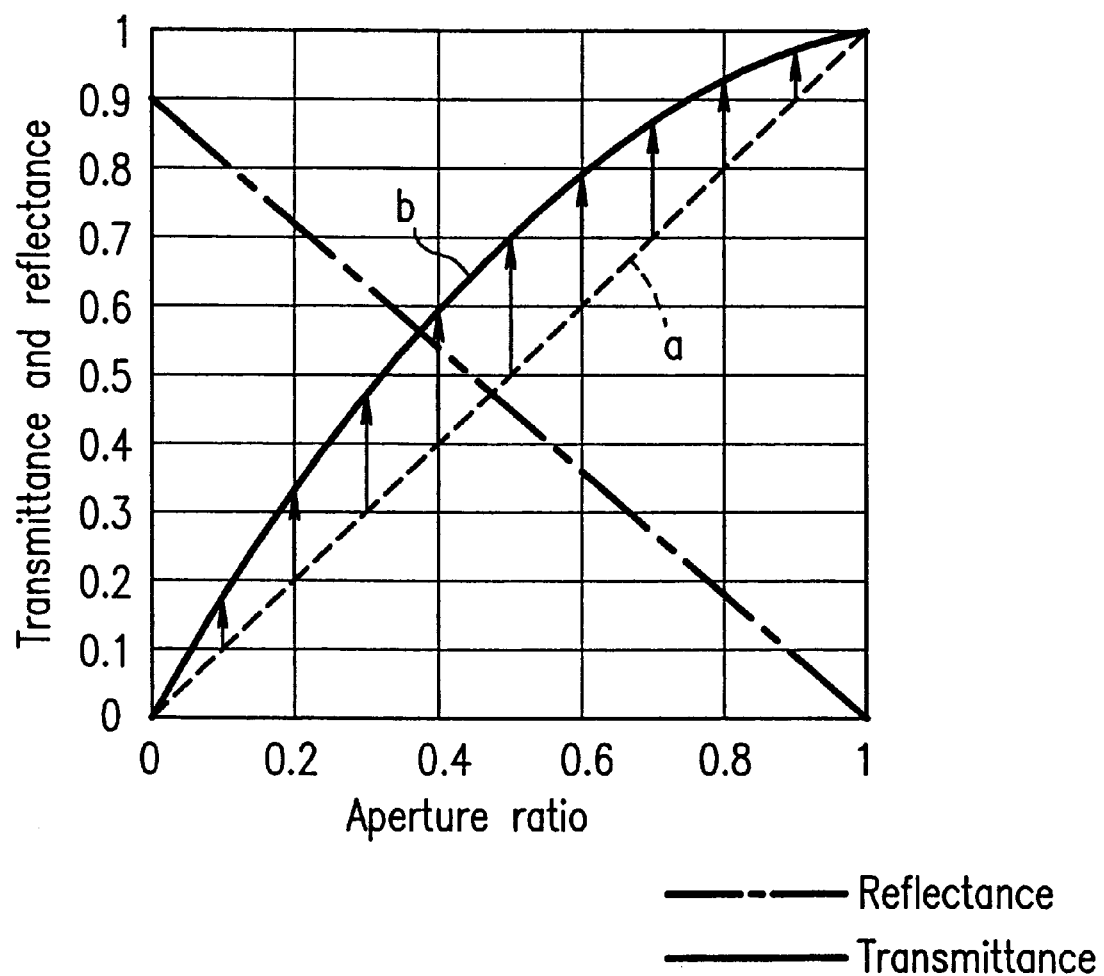
FIG. 16 is a graph showing the relationship of the aperture ratio with the transmittance and reflectance of the reflection/transmission type liquid crystal display device of Example 8.

FIG. 16 is a graph showing the relationship of the aperture ratio to the transmittance and reflectance observed when the reflectances of the reflection electrodes 69 and the backlight 91 as compared with the standard white plate are about 90%, and the transmittance of the polarizing plate 90 is about 40%. Note that this relationship was calculated on the assumption that pixel electrodes cover the entire display surface, not considering the existence of bus lines and active elements.

As is observed from FIG. 16, the reflectance of the reflection electrode 69 for light incident from outside on the side of a counter substrate is obtained by multiplying the reflectance of the reflection electrode 69 by the ratio of the area of the reflection electrode 69 to the area of the entire pixel electrode. The transmittance of the transmission electrode 68 for light from the backlight 91 is equal to, not just the aperture ratio a (i.e., the ratio of the area of the transparent electrode 68 to the area of the entire pixel electrode), but a value b, including a component of light from the backlight reflected by the reflection electrode 69, which can be utilized for display added to the aperture ratio a.

Thus, since the light from the backlight 91 reflected by the reflection electrodes 69 is also utilized, more effective use of light than that expected from the actual aperture ratio is possible, unlike the conventional transmission type liquid crystal display device.

Figure 17:
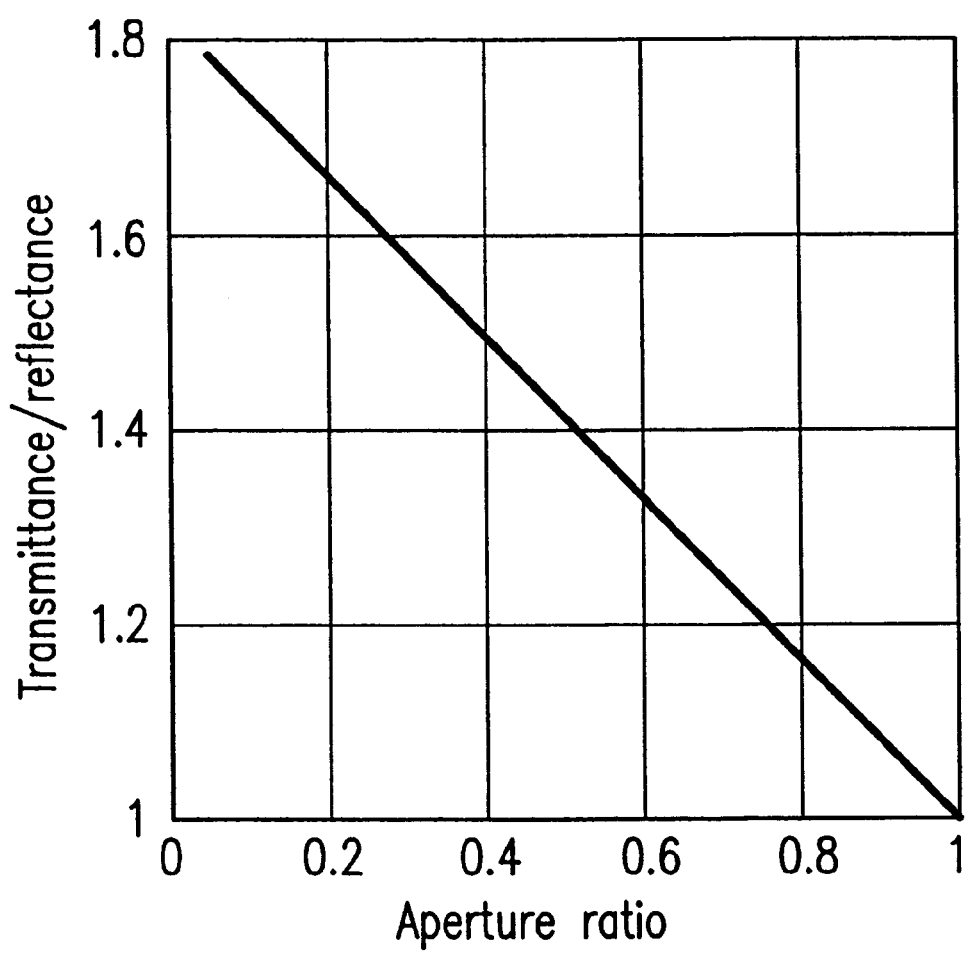
FIG. 17 is a graph showing the relationship between the aperture ratio and the light transmission efficiency of the reflection/transmission type liquid crystal display device of Example 8.

FIG. 17 is a graph showing the relationship between the aperture ratio and the light transmission efficiency (transmittance/aperture ratio). As is observed from FIG. 17, it has been found from such a calculation that, when the aperture ratio is 40%, the light from the backlight 91 reflected by the reflection electrode 69 can be utilized up to about 50% of the intensity of the light which has directly passed through the transmission electrode 68 from the backlight 91. From the calculation results shown in FIG. 17, it has also been found that the greater the ratio of the area of the reflection electrode 69 to the area of the entire pixel electrode is, the higher the use efficiency of the light reflected by the reflection electrode 69 becomes.

Hereinbelow, a specific example of the reflection/transmission type liquid crystal display device of Example 8 will be described.

Figure 18:
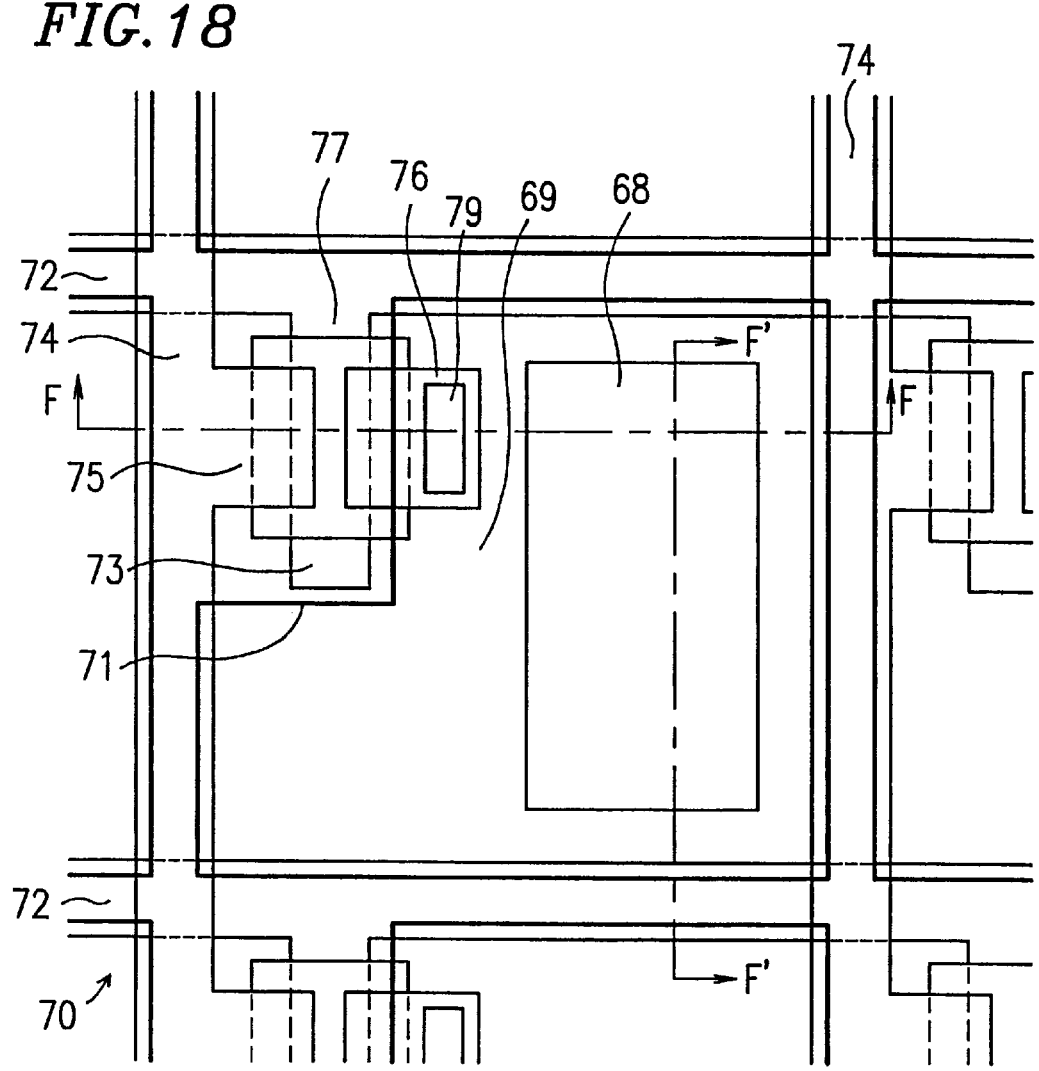
FIG. 18 is a plan view of a reflection/transmission type liquid crystal display device according to Example 8 of the present invention.

FIG. 18 is a plan view of the reflection/transmission type liquid crystal display device of Example 8 according to the present invention. FIGS. 19A to 19F are sectional views taken along line F—F of FIG. 18, illustrating the process of fabricating the liquid crystal display device of this example.

Referring to FIGS. 18 and 19F, an active matrix substrate 70 of the reflection/transmission type liquid crystal display device includes a plurality of gate bus lines 72, as scanning lines, and a plurality of source bus lines 74, as signal lines, which are formed to cross with each other. In each of the rectangular regions surrounded by the adjacent gate bus lines 72 and the adjacent source bus lines 74, a transmission electrode 68 made of a material having a high light transmission efficiency and a reflection electrode 69 made of a material having a high reflection efficiency are disposed. The transmission electrode 68 and the reflection electrode 69 constitute one pixel electrode.

A gate electrode 73 extends from the gate bus line 72 toward the pixel electrode at a corner portion of each of the region where the pixel electrode is formed. A thin film transistor (TFT) 71 is formed as a switching element at the end portion of the gate electrode 73. The gate electrode 73 itself constitutes part of the TFT 71.

The TFT 71 is located above the gate electrode 73 formed on a glass substrate 61 as shown in FIG. 19F. The gate electrode 73 is covered with a gate insulating film 61a, and a semiconductor layer 77 is formed on the gate insulating film 61a so as to cover the gate electrode 73 via the gate insulating film 61a. A pair of contact layers 78 are formed on the side portions of the semiconductor layer 77.

A source electrode 75 is formed on one of the contact layers 78 and electrically connected to the corresponding source bus line 74. The side portion of the source electrode 75 overlaps the gate electrode 73 in an insulating manner, constituting part of the TFT 71. A drain electrode 76, which also constitutes part of the TFT 71, is formed on the other contact layer 78 so as to be away from the source electrode 75 and overlaps the gate electrode 73 in an insulating manner. The drain electrode 76 is electrically connected to the pixel electrode via an underlying electrode 81a.

A storage capacitor is formed by forming the underlying electrode 81a so as to overlap the gate bus line 72 used for the adjacent pixel electrode in the next pixel row via the gate insulating film 61a. The underlying electrode 81a may be formed over substantially the entire region where convex portions are formed as will be described hereinafter, so as to unify the influence of the process of forming this layer.

High convex portions 64a and low convex portions 64b and an overlying polymer resin film 65 are formed under each of the reflection electrodes 69.

The upper surface of the polymer resin film 65 is of a continuous wave shape reflecting the existence of the convex portions 64a and 64b. Such a polymer resin film 65 is formed over substantially the entire glass substrate 61, not only in the regions below the reflection electrodes 69. In this example, OFPR-800 manufactured by Tokyo Ohka Co., Ltd., for example, is used for the polymer resin film 65.

The reflection electrode 69 is formed on the portion of the polymer resin film 65 having the continuous wave shape which is formed on the high convex portions 64a and the low convex portions 64b. The reflection electrode 69 is made of a material having a high reflection efficiency, such as Al. The reflection electrode 69 is electrically connected to the corresponding drain electrode 76 via a contact hole 79.

In each pixel of the reflection/transmission type liquid crystal display device of this example, the transmission electrode 68 is formed separately from the reflection electrode 69. The transmission electrode 68 is made of a material having a high light transmission efficiency such as ITO.

The method for forming the reflection electrodes 69 and the transmission electrodes 68 which are main portions of the reflection/transmission type active matrix substrate 70 will be described with reference to FIGS. 19A to 19F.

First, as shown in FIG. 19A, the plurality of gate bus lines 72 (see FIG. 18) made of Cr, Ta, or the like and the gate electrodes 73 extending from the gate bus lines 72 are formed on the glass substrate 61.

The gate insulating film 61a made of $SiN_x$, $SiO_x$, or like is formed on the entire surface of the glass substrate 61 covering the gate bus lines 72 and the gate electrodes 73. The semiconductor layers 77 made of amorphous silicon (a-Si), polysilicon, CdSe, or the like are formed on the portions of the gate insulating film 61a located above the gate electrodes 73. The pair of contact layers 78 made of a-Si or the like are formed on both side portions of each of the semiconductor layers 77.

The source electrode 75 made of Ti, Mo, Al, or the like is formed on one of the contact layers 78, while the drain electrode 76 made of Ti, Mo, Al, or the like is formed on the other contact layer 78.

In this example, as the material of the glass substrate 61, product number 7059 manufactured by Corning Inc. with a thickness of 1.1 mm was used.

As shown in FIG. 19B, a metal layer 81 which constitutes part of the source bus lines 74 is formed by sputtering. The metal layer 81 is also used to form the underlying electrodes 81a.

Figure 19C:
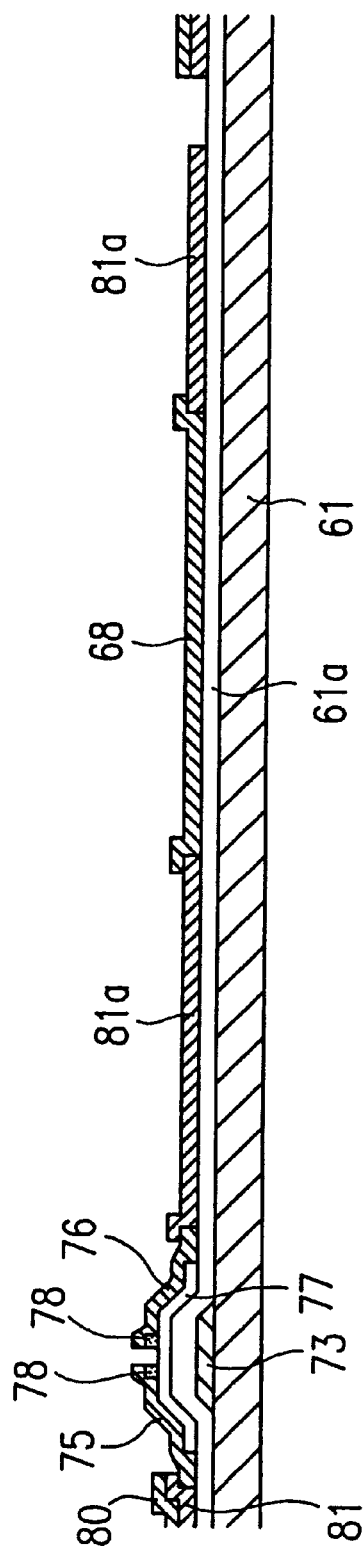

Subsequently, as shown in FIG. 19C, an ITO layer 80 which also constitutes part of the source bus lines 74 is formed by sputtering and patterned.

Thus, in this example, the source bus lines 74 are of a double-layer structure consisting of the metal layer 81 and the ITO layer 80. This double-layer structure is advantageous in that even if the metal film 81 constituting the source bus line 74 is partly defective, the electric connection of the source bus line 74 is maintained by the ITO layer 80. This reduces the occurrence of disconnections in the source bus line 74.

The ITO layer 80 is also used to form the transmission electrodes 68. This makes it possible to form the transmission electrodes 68 simultaneously with the formation of the source bus lines 74, preventing an increase in the number of layers.

Figure 19D:
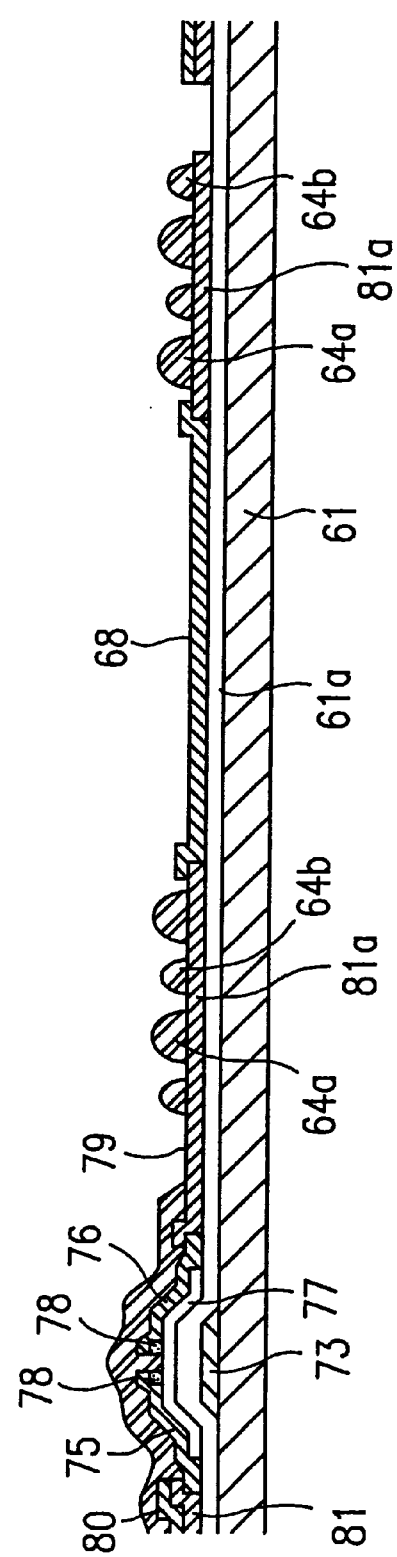

Then, as shown in FIG. 19D, rounded convex portions 64a and 64b, having substantially circular cross-sections are formed of a resist film of a photosensitive resin over the regions on which the reflection electrodes 69 are to be formed. Preferably, the convex portions 64a and 64b are not formed on the transmission electrodes 68 so that a voltage is efficiently applied to the liquid crystal layer. Optically, however, not so large influence is observed when the convex portions 64a and 64b are formed on the transmission electrodes 68.

Hereinbelow, the process of forming the convex portions 64a and 64b in the reflection electrode regions will be briefly described with reference to FIGS. 20A to 20D.

Figure 20A:
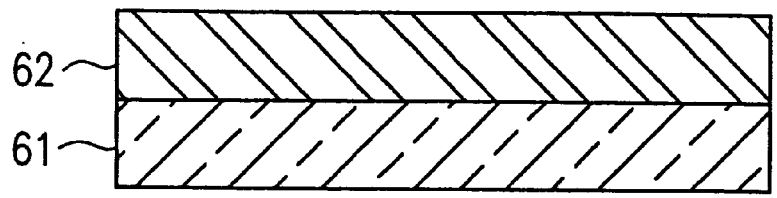
FIGS. 20A to 20D are sectional views illustrating the steps of forming convex portions in the reflection regions of the reflection/transmission type liquid crystal display device of Example 8.

First, as shown in FIG. 20A, a resist film 62 made of a photosensitive resin is formed on the glass substrate 61 (actually, with the metal layer 81 and the underlying electrode 81a formed thereon as shown in FIG. 19D) by a spin coat method. The resist film 62 is formed of the same photosensitive resin as that used for the polymer resin film 65 to be described hereinafter, i.e., OFPR-800, by spin coating at a speed preferably in the range of about 500 to about 3000 rpm, in this example at 1500 rpm, for 30 seconds, so as to obtain a thickness of 2.5 μm.

Then, the resultant glass substrate 61 with the resist film 62 formed thereon is prebaked at 90° C. for 30 minutes, for example.

Figure 20B:
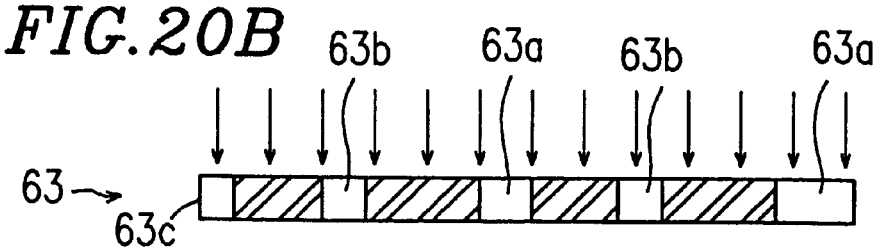
Figure 21:
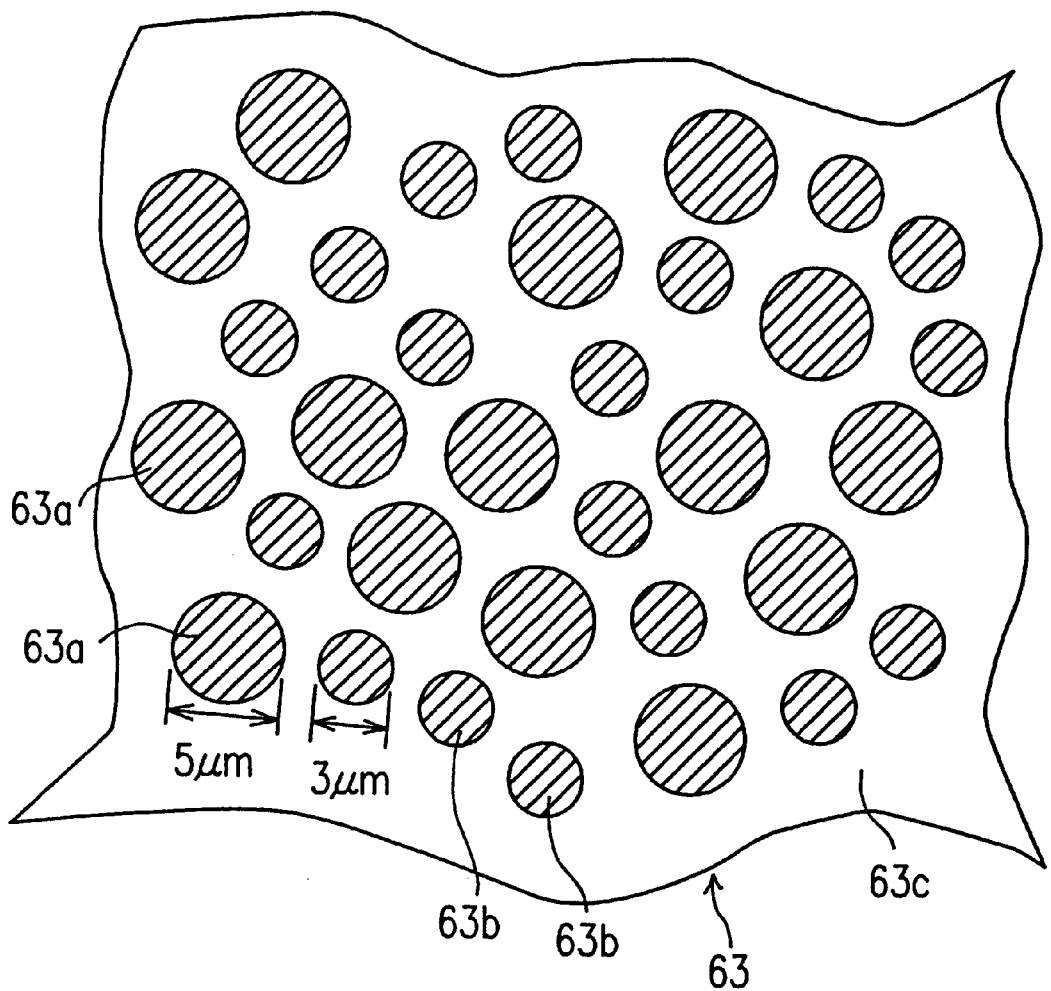
FIG. 21 is a plan view of a photomask used in the step shown in FIG. 20B.

Subsequently, as shown in FIG. 20B, a photomask 63 is disposed above the resist film 62. The photomask 63 has a shape as shown in FIG. 21, for example, which includes two types of circular pattern holes 63a and 63b formed through a plate 63c. The photomask 63 is then irradiated with light from above as shown by the arrows in FIG. 20B.

The photomask 63 in this example has the circular pattern holes 63a with a diameter of 5 μm and the circular pattern holes 63b with a diameter of 3 μm arranged at random. The space between any adjacent pattern holes should be at least about 2 μm. If the space is too large, however, the polymer resin film 65 to be formed thereon at a later step will hardly succeed in obtaining a continuous wave shape.

Figure 20C:
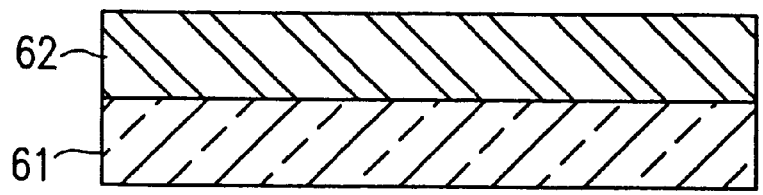

The resultant substrate is developed with a developer with a concentration of 2.38%, e.g., NMD-3 manufactured by Tokyo Ohka Co., Ltd. As a result, as shown in FIG. 20C, a number of minute convex portions 64a' and 64b' with different heights are formed on the reflection electrode regions of the glass substrate 61. The top edges of the convex portions 64a' and 64b' are squared. The convex portions 64a' with a height of 2.48 μm and the convex portions 64b' with a height of 1.64 μm are formed from the pattern holes 63a with a diameter of 5 μm and the pattern holes 63b with a diameter of 3 μm, respectively.

The heights of the convex portions 64a' and 64b' can be changed by changing the sizes of the pattern holes 63a and 63b, the light exposure time, and the developing time. The size of the pattern holes 63a and 63b are not limited to those described above.

Figure 20D:
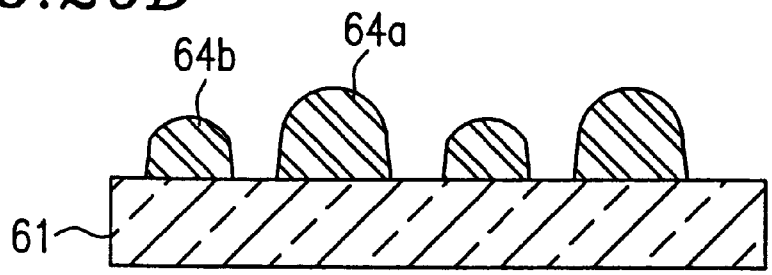

Thereafter, as shown in FIG. 20D, the glass substrate 61 with the convex portions 64a' and 64b' formed thereon is heated at about 200° C. for one hour. This softens the square top edges of the convex portions 64a' and 64b', to form the rounded convex portions 64a and 64b having substantially circular cross-sections.

Then, as shown in FIG. 19E, a polymer resin is applied on the resultant glass substrate 61 by spin coating and patterned to form the polymer resin film 65. The material OFPR-800 mentioned above is used as the polymer resin and applied by spin coating at a speed preferably in the range of about 1000 to about 3000 rpm. In this example, the spin coating was conducted at a speed of 2000 rpm.

In this way, the polymer resin film 65 having an upper surface of a continuous wave shape is obtained on the glass substrate 61, which is flat having no convex portions.

As shown in FIG. 19F, the reflection electrodes 69 made of Al are formed on predetermined portions of the polymer resin film 65 by sputtering, for example. Materials suitable for the reflection electrodes 69 include, besides Al and an Al alloy, Ta, Ni, Cr, and Ag having a high light reflection efficiency. The thickness of the reflection electrodes 69 is preferably in the range of about 0.01 to about 1.0 $\mu$m.

A polarizing plate (not shown) is attached to the back surface of the thus-fabricated active matrix substrate of this example. A backlight is then disposed on the outer surface of the polarizing plate.

Electric corrosion is generated if the Al film is formed after the portions of the polymer resin film 65 located on the transmission electrodes 68 are removed. Therefore, the portions of the polymer resin film 65 located on the transmission electrodes 68 should be removed after the formation of the reflection electrodes 69. This removal can be done by ashing, together with the removal of the portions of the polymer resin film 65 located above terminal electrodes for the connection of drivers formed on the peripheries of the active matrix substrate 70. This improves the process efficiency and allows for efficient voltage application to the liquid crystal layer.

If the polymer resin film 65 is not used in the process of forming the convex portions, a layer of Mo or the like may be formed between the transmission electrodes 68 made of ITO and the reflection electrodes 69 made of Al, to prevent the generation of electric corrosion.

The thus-formed reflection electrodes 69, made of a material having a high light reflection efficiency, have an upper surface in a continuous wave shape since the underlying polymer resin film 65 has the continuous wave shape as described above.

In this example, the transmission electrodes 68 are formed simultaneously with the formation of the source bus lines 74. When the source bus lines 74 are of a single-layer structure composed of the metal layer 81, not the double-layer structure composed of the metal layer 81 and the ITO layer 80 as described above, the transmission electrodes 68 may be formed separately from the formation of the source bus lines 74.

Figure 22:
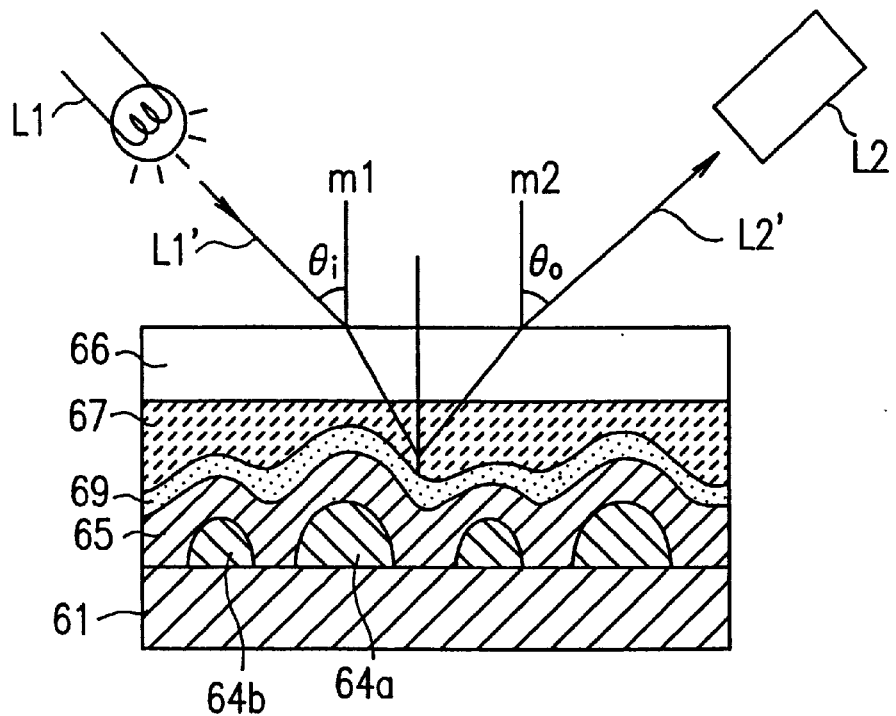
FIG. 22 is a sectional view illustrating a method for measuring the reflection characteristics of pixel electrodes having a high light reflection efficiency of the reflection/transmission type liquid crystal display device of Example 8.

The wavelength dependence of light reflected from the reflection electrodes 69 having a continuous wave shape and made of a material having a high light reflection efficiency was measured in a manner as shown in FIG. 22. An object structure for measurement was formed by simulating conditions for the reflection electrodes 69 equivalent to an actual liquid crystal display device during an actual use. Specifically, a dummy glass 66 having a refractive index of 1.5, which is substantially equal to the refractive index of the actual liquid crystal layer is attached to the active matrix substrate 70, with the reflection electrodes 69 and the transmission electrodes 68 formed thereon with an ultraviolet-setting adhesive 67 having a refractive index of about 1.5.

As the measurement system, a light source L1 is disposed so that an incident light beam L1' is incident at an incident angle $\theta$i with respect to the normal m1 of the dummy glass 66, and a photomultimeter L2 is disposed so as to capture a fixed-angle light beam reflected at an output angle $\theta$o with respect to the normal m2.

With the above construction, the photomultimeter L2 captures the intensity of a scattered light beam L2' which is reflected at the output angle $\theta$o among scattered light beams which are incident on the dummy glass 66 at the incident angle $\theta$i, as the incident light beam L1'.

The above measurement was conducted under the conditions of $\theta$i=30° and $\theta$o=20° in order to avoid the photomultimeter L2 from capturing a regular-reflected light beam which is emitted from the light source L1 and reflected from the surface of the dummy glass 66.

Figure 24:
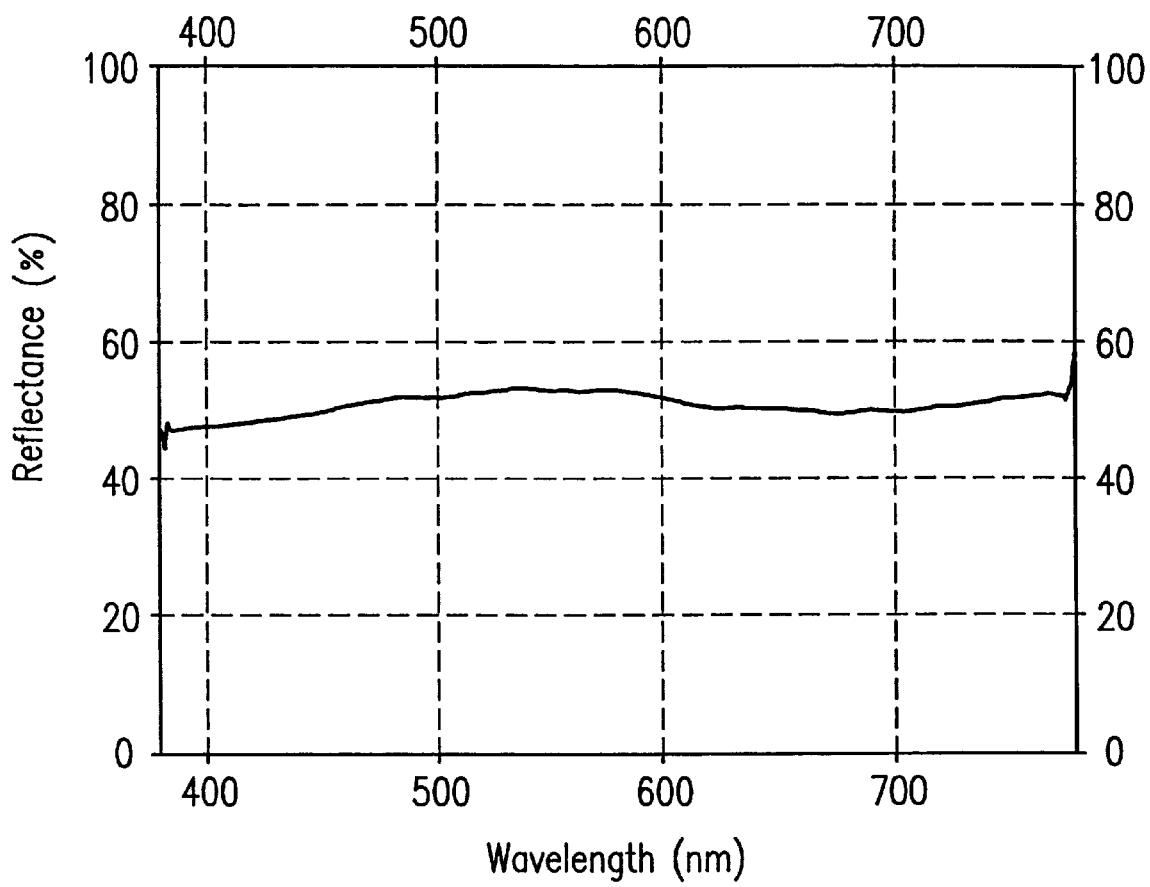
FIG. 24 is a graph showing the wavelength dependence of the pixel electrodes of the reflection/transmission type liquid crystal display device of Example 8.

FIG. 24 is a graph showing the wavelength dependence of reflected light in this example.

As shown in FIG. 24, the wavelength dependence of the reflectance is hardly recognized in this example, which proves that a good white color display is obtained.

In this example, the shape of the pattern holes 63a and 63b of the photomask 63 is a circle. Other shapes such as a rectangle, an ellipse, and a stripe may also be used.

In this example, the convex portions 64a and 64b with two different heights are formed. Alternatively, convex portions with a single height or those with three or more different heights may also be formed to obtain reflection electrodes having good reflection characteristics.

It has been found, however, that reflection electrodes with better wavelength dependence of the reflection characteristics are obtained when convex portions with two or more different heights are formed than when convex portions with a single height are formed.

If it is ensured that the upper surface of a continuous wave shape can be obtained only by the convex portions 64a and 64b, the formation of the polymer resin film 65 is not required. Only the resist film 62 (See FIGS. 20B and 20C) is formed to obtain the upper surface of a continuous wave shape and then the reflection electrodes 69 are formed thereon. In this case, the step of forming the polymer resin film 65 can be omitted.

In this example, OFPR-800 manufactured by Tokyo Ohka Co., Ltd. is used as the photosensitive resin material. Any other photosensitive resin material of the negative or positive type which can be patterned by an exposure process may also be used. Examples of such photosensitive resin materials include: OMR-83, OMR-85, ONNR-20, OFPR-2, OFPR-830, and OFPR-500 manufactured by Tokyo Ohka Co., Ltd.; TF-20, 1300-27, and 1400-27 manufactured by Shipley Co.; Photoneath manufactured by Toray Industries, Inc.; RW-101 manufactured by Sekisui Fine Chemical Co., Ltd.; and R101 and R633 manufactured by Nippon Kayaku K.K.

In this example, the TFTs 71 are used as the switching elements. The present invention is also applicable to active matrix substrates using other switching elements such as metal-insulator-metal (MIM) elements, diodes, and varistors.

Thus, as described above, in the liquid crystal display device and the method for fabricating the liquid crystal display device of Example 8, the reflection electrodes made of a material having a high light reflection efficiency are formed so as to have a continuous wave shape. This reduces the wavelength dependence of the reflection and thus permit realization of a good white color display by reflection without the generation of an interference color.

Since the convex portions are formed on the substrate by an optical technique using a photomask, good reproducibility is ensured. The resultant wave-shaped upper surfaces of the reflection electrodes can also be obtained with good reproducibility.

The transmission electrodes made of a material having a high light transmission efficiency are formed simultaneously with the formation of the source bus lines. This allows for the formation of the transmission electrodes of the reflection/transmission type liquid crystal display device without increasing the number of steps compared with the conventional liquid crystal display device.

By forming a continuous wave shape for the reflection electrodes, more effective use of light than that expected from the actual aperture ratio is possible.

According to the liquid crystal display device of this example, the reflection portion made of a material having a high light reflection efficiency and a transmission portion made of a material having a high light transmission efficiency are formed in one display pixel. With this construction, when the environment is pitch-dark, the device serves as a transmission type liquid crystal display device which displays images utilizing light from the backlight passing through the transmission portion. When the environment is comparatively dark, the device serves as a reflection/transmission type liquid crystal display device which displays images utilizing both light from the backlight passing through the transmission portion and light reflected from the reflection portion composed of a film having a comparatively high reflectance. When the environment is bright, the device serves as a reflection type liquid crystal display device which displays images utilizing light reflected from the reflection portion composed of a film having a comparatively high reflectance.

In other words, according to this example, the pixel electrode of each pixel is composed of the reflection portion made of a material having a high light reflection efficiency and the transmission portion made of a material having a high light transmission efficiency. Thus, a liquid crystal display device having a good light utilization efficiency in any of the above-described cases and an excellent productivity is realized.

In this example, the upper surface of the reflection portion made of a material having a reflection function is of a continuous wave shape. This prevents the occurrence of a mirror phenomenon without providing a light scattering means, which is necessary when the reflection portion is flat, thus realizing a paper-white display.

In this example, a photosensitive polymer resin film having a plurality of convex portions underlies the reflection portion made of a material having a reflection function. With this construction, even if a variation exists in the continuous smooth concave and convex shape, it does not influence the display. Thus, the liquid crystal display device can be fabricated with good productivity.

The transmission portion made of a material having a high light transmission efficiency is formed simultaneously with the formation of the source bus lines. This greatly shortens the fabrication process of the liquid crystal display device.

A protection film is formed between the transmission portion and the reflection portion. This prevents the generation of electric corrosion between the transmission portion and the reflection portion.

The reflection material remaining on the transmission portions and terminal electrodes is simultaneously removed when the patterning of the reflection portions is conducted. This greatly shortens the fabrication process of the liquid crystal display device.

In this example, light emitted from the backlight passes through the transmission portion to leave the substrate, while it is reflected from the back surface of the reflection portion to be returned to the backlight and reflected again toward the substrate. Part of the re-reflected light passes through the transmission portion to leave the substrate.

It is conventionally difficult to direct the re-reflected light to effectively pass through the transmission portion since regular reflection mainly occurs when the reflection portion is flat. In this example, however, since the reflection portion is of a continuous wave shape, the light emitted from the backlight is scattered, allowing the reflected light to effectively return toward the portion of the backlight located below the transmission portion. Thus, more effective use of light than that expected from the actual aperture ratio is possible, unlike the conventional transmission type liquid crystal display device.

EXAMPLE 9

Figure 25:
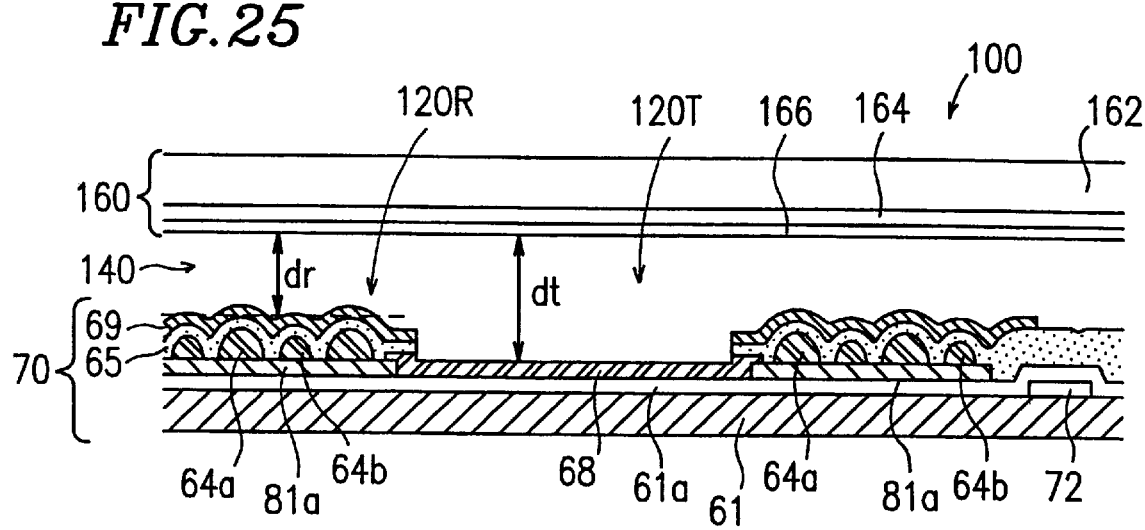
FIG. 25 is a sectional view of a transmission/reflection type liquid crystal display device according to Example 9 of the present invention.

FIG. 25 is a partial sectional view of a transmission/reflection type liquid crystal display device 100 of Example 9 according to the present invention.

Referring to FIG. 25, the liquid crystal display device 100 includes an active matrix substrate 70 shown in FIG. 18 (corresponding to the F'—F' cross section), a counter substrate (color filter substrate) 160, and a liquid crystal layer 140 interposed therebetween. The transmission/reflection type active matrix substrate 70 includes a plurality of gate bus lines 72, as scanning lines, and a plurality of source bus lines 74, as signal lines, formed on an insulating glass substrate 61 so as to cross with each other. In each of the rectangular regions surrounded by the adjacent gate bus lines 72 and the adjacent source bus lines 74, a transmission electrode 68 made of a material al having a high light transmission efficiency and a reflection electrode 69 made of a material having a high light reflection efficiency are disposed. The transmission electrode 68 and the reflection electrode 69 constitute one pixel electrode. The counter substrate (color filter substrate) 160 includes a color filter layer 164 and a transparent electrode 166 made of ITO or the like formed in this order on an insulating glass substrate 162.

Vertical alignment films (not shown) are formed on the surfaces of the substrates 70 and 160 facing the liquid crystal layer 140. In order to define the direction of liquid crystal molecules oriented by the electric field, the vertical alignment films are rubbed in a direction so as to provide a pretilt angle to the liquid crystal molecules. A nematic liquid crystal material having a negative dielectric anisotropy (e.g., MJ manufactured by Merck & Co., Inc.) is used for the liquid crystal layer 140.

Each pixel which is a minimum display unit of the liquid crystal display device 100 includes a reflection region 120R defined by the reflection electrode 69 and the transmission region 120T defined by the transmission electrode 68. The thickness of the liquid crystal layer 140 is dr in the reflection region 120R and dt (dt=2dr) in the transmission region 120T, so that the optical path lengths of light beams contributing to the display (reflected light beams in the reflection region and transmitted light beams in the transmission region) are substantially equal to each other. Although dt=2dr is preferable, dt and dr may be appropriately determined in the relationship with the display characteristics as far as dt>dr. Typically, dt is about 4 to about 6 $\mu$m and dr is about 2 to about 3 $\mu$m. In other words, a step of about 2 to about 3 $\mu$m is formed in each pixel region of the active matrix substrate 70. When the reflection electrode 69 has a concave and convex shaped surface as shown in FIG. 25, the average value of thicknesses should be dr. In this way, the transmission/reflection type liquid crystal display device 100 includes two types of regions (the reflection regions and the transmission regions) where the thickness of the liquid crystal layer 140 is different therebetween. In this example, the active matrix substrate 70 includes the reflection regions 120R and the transmission regions 120T having different heights formed on the side facing the liquid crystal layer 140.

Figure 26:
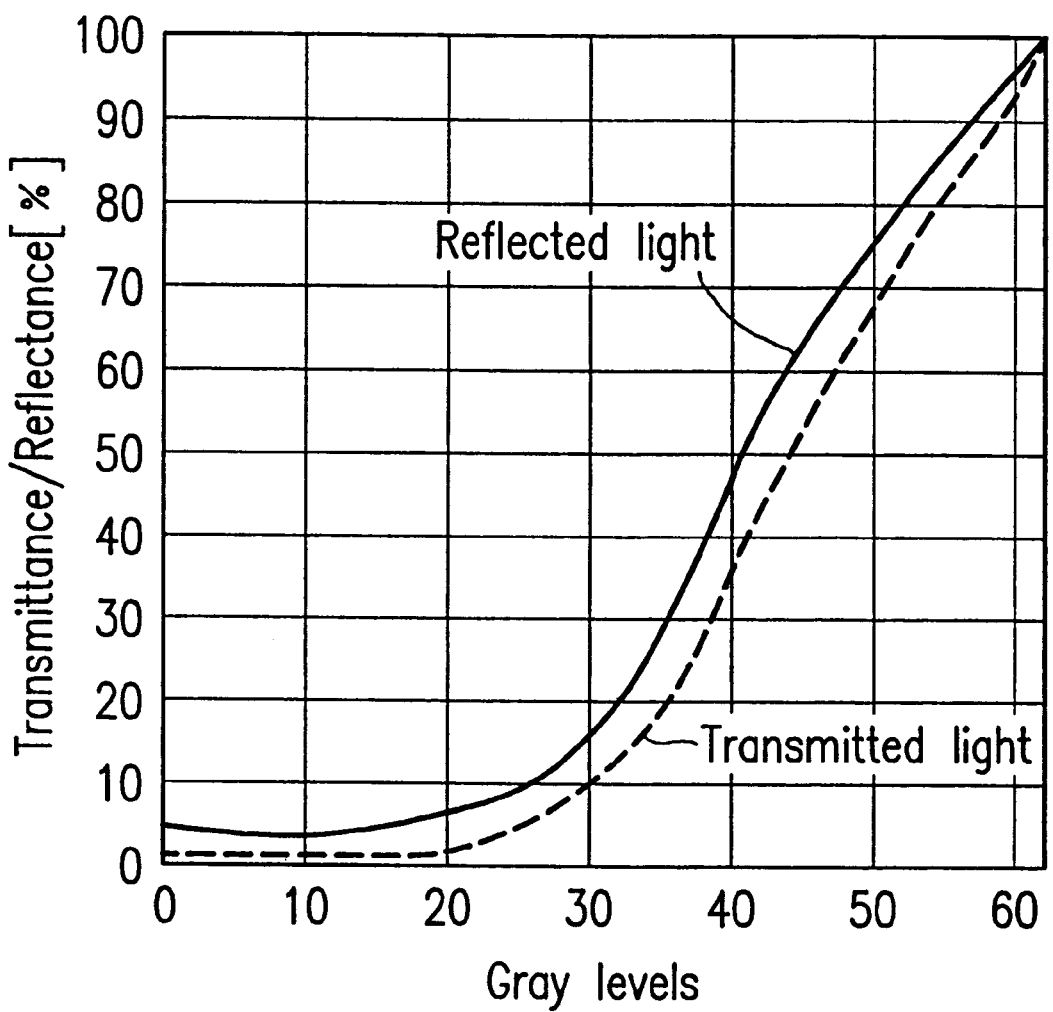
FIG. 26 is a graph showing the transmittance and reflectance in a gray-level display in Example 9.

A liquid crystal display device (diagonal: 8.4 inches) having the construction shown in FIG. 25 was actually fabricated and subjected to a 64 gray-level display to evaluate the display characteristics (transmittance and reflectance) of the device. The evaluation results are shown in FIG. 26. The liquid crystal display device was fabricated under the following conditions. The ratio of the area of the transmission region 120T to that of the reflection region 120R in one pixel was 4:6. The transmission electrodes 68 were made of ITO, while the reflection electrodes 69 were made of Al. The thickness dt of the liquid crystal layer 140 in the transmission regions 120T was set at about 5.5 $\mu$m, while the thickness of the liquid crystal layer 140 in the reflection regions 120R were set at about 3 $\mu$m.

The transmittance of the liquid crystal display device in the transmission mode using light from a backlight was measured by MB-5 manufactured by Topcon Co., while the reflectance of the liquid crystal display device in the reflection mode using ambient light was measured by LCD-5000 manufactured by Otsuka Electronics Co., Ltd. by use of an integrating sphere.

As is apparent from FIG. 26, the variations in the reflectance and the transmittance in the 64 gray-level display (the solid line and the dotted line in FIG. 26, respectively) substantially match with each other. Accordingly, a gray-level display with a sufficient display quality is realized even if the display in the transmission mode using light from the backlight and the display in the reflection mode using ambient light are conducted simultaneously. The contrast ratios in the transmission mode and the reflection mode were about 200 and about 25, respectively.

Figure 27:
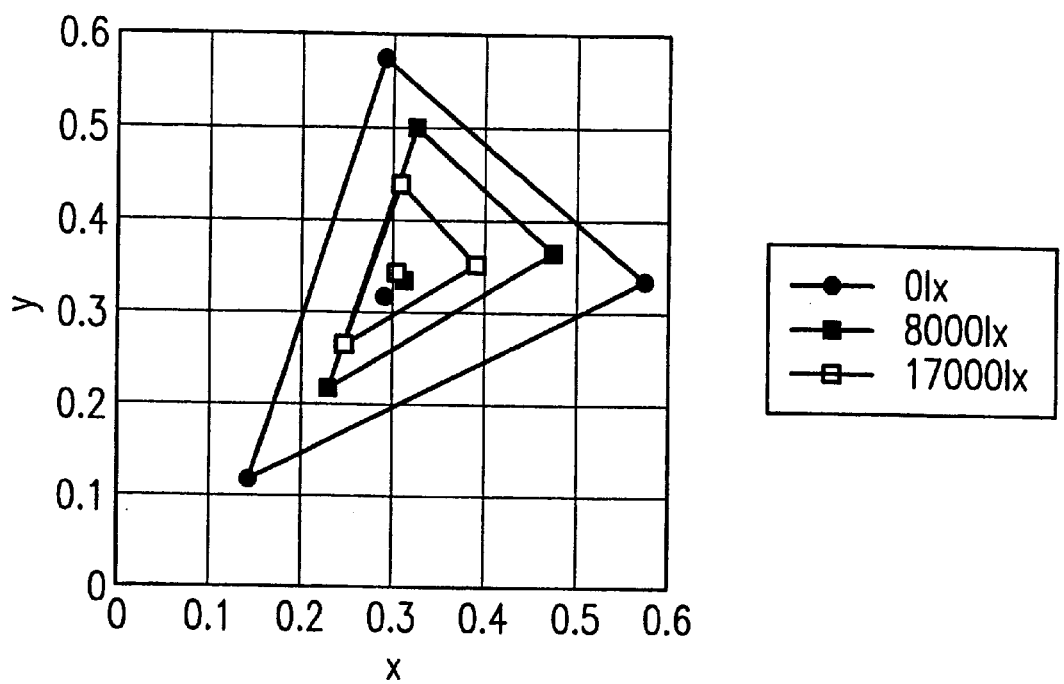
FIG. 27 is a chromaticity diagram of a conventional transmission type liquid crystal display device.
Figure 28:
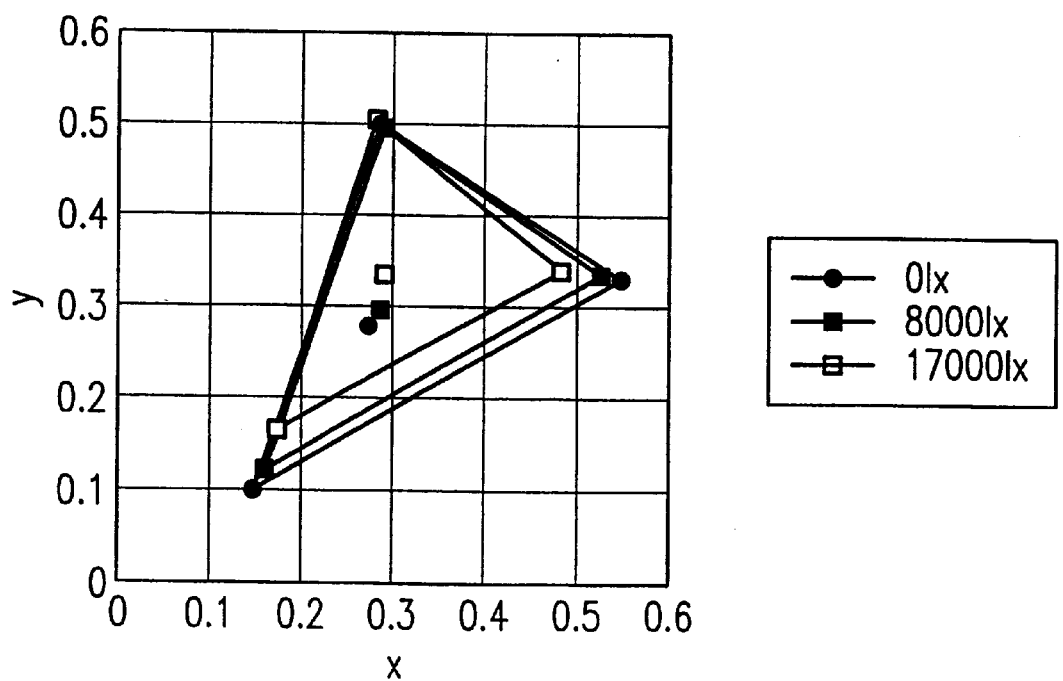
FIG. 28 is a chromaticity diagram of the transmission/reflection type liquid crystal display device of FIG. 9.

Hereinbelow, the evaluation results of color reproducibility will be described. FIGS. 27 and 28 are chromaticity diagrams of a conventional transmission type liquid crystal display device and the transmission/reflection type liquid crystal display device of this example, respectively, under ambient light with different brightnesses. The same backlight was used for these liquid crystal display devices.

As is apparent from FIG. 27, as the illuminance on the display screen by ambient light increases from 0 lx to 8,000 lx and then to 17,000 lx, the range of the color reproducibility (the area inside the triangle in FIG. 27) of the conventional liquid crystal display device significantly decreases. This is recognized by the observer as color blurring. In the transmission/reflection type liquid crystal display device, however, as is observed from FIG. 28, the range of the color reproducibility when the illuminance is 8,000 lx is substantially the same as that when the illuminance is 0 lx. Moreover, only a minor decrease is observed in the color reproducibility when the illuminance is 17,000 lx. Color blurring is therefore hardly recognized.

In the conventional transmission type liquid crystal display device, the contrast ratio is lower due to the reflection of ambient light from the surface of the display panel, as well as due to reflected light from a black mask for light shading, interconnect lines, and the like. On the contrary, in the transmission/reflection type liquid crystal display device of this example, which provides a reflection mode display using ambient light in addition to the transmission mode display, the lowering of the contrast ratio due to the reflection of ambient light in the transmission mode display can be suppressed by the reflection mode display. Thus, the contrast ratio obtained by the liquid crystal display device of this example will not become lower than the contrast ratio which may be obtained by only the reflection mode display irrespective of how bright ambient light becomes. As a result, in the transmission/reflection type liquid crystal display device of this example, the color reproducibility is hardly lowered even under bright ambient light and thus a display with high visibility can be obtained under any environment.

Figure 29:
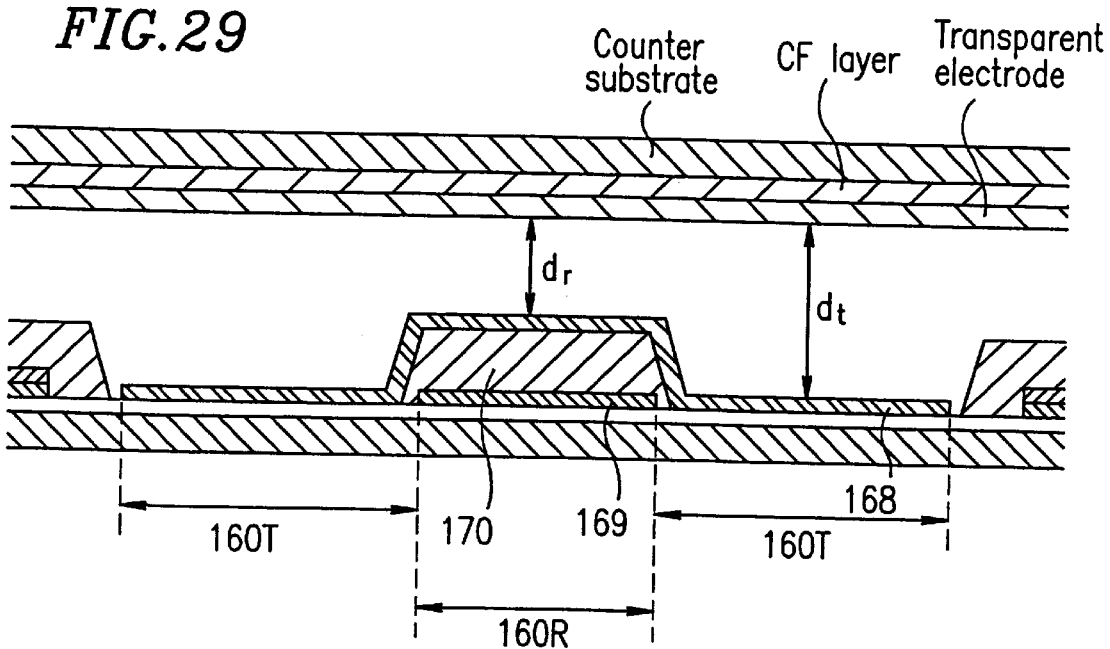
FIG. 29 is a sectional view of another embodiment of the transmission/reflection type liquid crystal display device according to Example 9 of the present invention.

FIG. 29 shows an alternative embodiment of the construction of this example, where a reflection electrode region 160R includes a reflection layer (reflection plate) 169 and a portion of a transmission electrode 168. This is unlike the construction shown in FIG. 25, where the reflection electrode region 120R includes a reflection electrode 69 having a reflection characteristic. The height of the reflection electrode region 160R of the active matrix substrate can be controlled by adjusting the thickness of the reflection layer 169 and/or an insulating layer 170 formed on the reflection layer 169.

EXAMPLE 10

Figure 30:
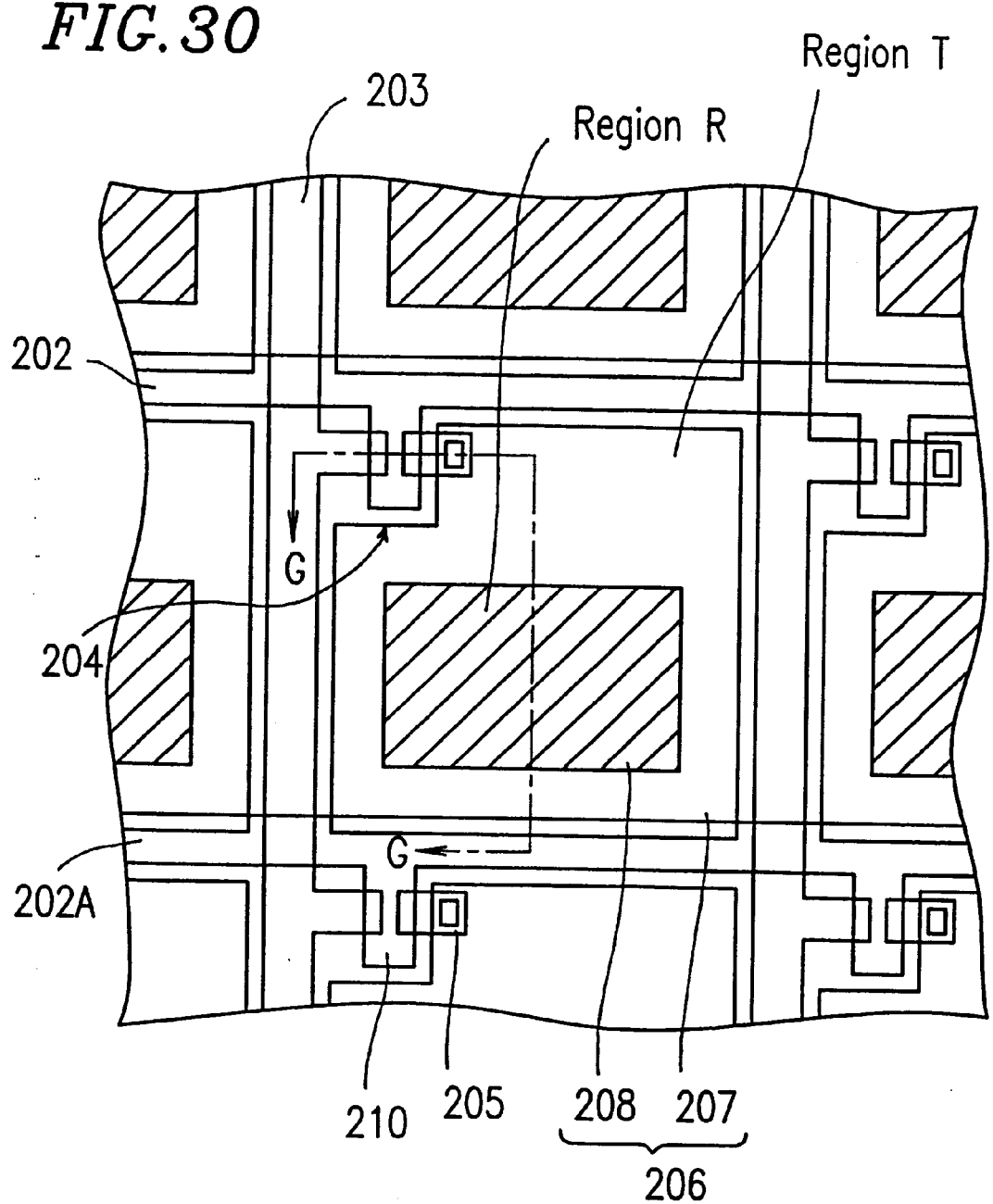
FIG. 30 is a plan view of an active matrix substrate of a liquid crystal display device according to Example 10 of the present invention.
Figure 31:
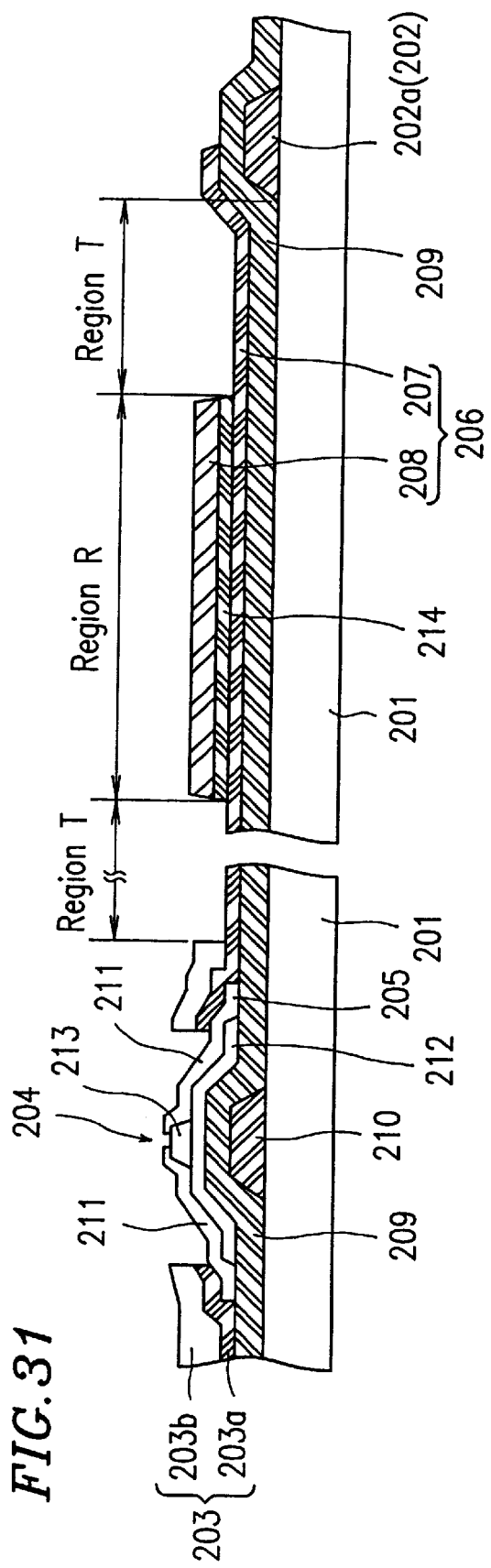
FIG. 31 is a sectional view taken along line G—G of FIG. 30.

FIG. 30 is a partial plan view of an active matrix substrate of a liquid crystal display device of Example 10 according to the present invention. FIG. 31 is a sectional view taken along line G—G of FIG. 30.

Referring to FIGS. 30 and 31, a plurality of gate lines 202 and a plurality of source lines 203 are formed on a transparent insulating substrate 201, made of glass or plastic, so as to cross with each other. Each region surrounded by the adjacent gate lines 202 and the adjacent source lines 203 defines a pixel. A TFT 204 is disposed in the vicinity of each of the crossings of the gate lines 202 and the source lines 203. A drain electrode 205 of each TFT 204 is connected to a corresponding pixel electrode 206. The portion of each pixel where the pixel electrode 206 is formed is composed of two regions as is viewed from the top, i.e., a region T having a high transmission efficiency and a region R having a high reflection efficiency. In this example, an ITO layer 207 constitutes the top layer of the region T as a layer having a high transmission efficiency, while an Al layer 208 (or an Al alloy layer) constitutes the top layer of the region R as a layer having a high reflection efficiency. The layers 207 and 208 constitute the pixel electrode 206 of each pixel. The pixel electrode 206 overlaps a gate line 202a for the adjacent pixel in the next pixel row via a gate insulating film 209. During driving, a storage capacitor for the driving of liquid crystal is formed at this overlap portion.

The TFT 204 includes a gate electrode 210 branched from the corresponding gate line 202 (in this case 202a), a gate insulating film 209, a semiconductor layer 212, a channel protection layer 213, and n$^+$-Si layers 211 which are to be source/drain electrodes deposited in this order.

Though not shown, the resultant active matrix substrate is provided with an alignment film, and then bonded with a counter substrate having a transparent electrode and an alignment film formed thereon. Liquid crystal is injected in a space between the two substrates in a sealing manner, and a backlight is disposed on the rear side of the resultant structure, thereby completing the liquid crystal display device of this example.

A mixture of a guest-host liquid crystal material, ZLI2327 (manufactured by Merck & Co., Inc.) containing black pigments therein and 0.5% of an optically active substance, S-811 (manufactured by Merck & Co., Inc.) was used as the liquid crystal. An electrically controlled birefringence (ECB) mode may also be used as the liquid crystal mode by disposing polarizing plates on the top and bottom surfaces of the liquid crystal layer. When a color display is desired, a color filter (referred to as a CF layer) composed of red, green, and blue colored layers is disposed on top of the liquid crystal layer.

Hereinbelow, a method for fabricating such an active matrix substrate of this example will be described.

First, the gate lines 202 and the gate electrodes 210 made of Ta are formed on the insulating substrate 201, and the gate insulating film 209 is formed over the entire resultant substrate. Subsequently, the semiconductor layer 212 and the channel protection layer 213 are formed above each of the gate electrodes 210, followed by the formation of the $n^+$-Si layers 211 as the source electrodes 211 and drain electrodes 205 (or 211).

An ITO layer 203a (a lower layer) and a metal layer 203b (an upper layer) are formed in this order by sputtering and patterned to form the source lines 203. In this example, Ti was used for the metal layer 203b.

This double-layer structure of the source lines 203 is advantageous in that even if the metal layer 203b constituting each source line 203 is partly defective, the electric connection of the source line 203 is maintained by the ITO layer 203a, reducing the occurrence of disconnections in the source lines 203.

The ITO layer 207 of the region T having a high transmission efficiency is formed of the same material at the same step as the ITO layer 203a of the source line 203. The region R having a high reflection efficiency is formed by forming an Mo layer 214 and the Al layer 208 by sputtering in this order and patterning. The Al layer 208 can provide a sufficiently stable reflection efficiency (about 90%) when the thickness thereof is about 150 nm or more. In this example, the thickness of the Al layer 208 was 150 nm to obtain the reflection efficiency of 90% and thus to allow ambient light to be effectively reflected. Ag, Ta, W, and the like may also be used in place of Al or an Al alloy for the layer (Al layer 208) having a high reflection efficiency.

In this example, the ITO layer 207 and the Al layer 208 are used as the pixel electrode 206 of each pixel. Alternatively, layers of Al or an Al alloy with different thicknesses may be formed to define a region having a high transmission efficiency and a region having a high reflection efficiency as the regions T and R, respectively. This makes the fabrication process simpler than in the case of using different materials. Also, the layer having a high reflection efficiency of the region R (the Al layer 208 in this example) may be made of the same material as that used for the metal layer 203b of the source line 203. This makes it possible to fabricate the liquid crystal display device of this example by the same process as that used in the fabrication of a conventional transmission type liquid crystal display device.

As described above, each pixel electrode 206 is composed of the region T having a high transmission efficiency and the region R having a high reflection efficiency. This construction realizes a liquid crystal display device where a transmission mode display, a reflection mode display, and a transmission/reflection mode display are possible by utilizing ambient light and illumination light more efficiently, compared with the conventional liquid crystal display device using a semi-transmissive reflection film.

The ITO layer 207 is formed, as the pixel electrode 206, over the entire region of each pixel and above the gate line 202a of the adjacent pixel, in the next pixel row, via the gate insulating film 209, interposed therebetween. The Al layer 208 is formed on the ITO layer 207 via the Mo layer 214, interposed therebetween, to constitute the region R in the center portion of the pixel like an island. In this way, since the ITO layer 207 and the Al layer 208 are electrically connected with each other, the regions T and R apply the same voltage received from the same TFT 204 to the liquid crystal. Thus, a disclination line which may occur when the orientation of the liquid crystal molecules varies within one pixel during the voltage application is prevented.

The interposition of the Mo layer 214 between the ITO layer 207 and the Al layer 208 serves to prevent the generation of electric corrosion due to the contact between the ITO layer 207 and the Al layer 208 via an electrolytic solution in the fabrication process.

In this example, good display characteristics are obtained by setting the ratio of the area of the region T to that of the region R at 60:40. The area ratio is not limited to this value, but may be appropriately changed depending on the transmission/reflection efficiency of the regions T and R and the use of the device.

In this example, the area of the region R is preferably about 10 to about 90% of the effective pixel area (i.e., the total of the area of the region T and the area of the region R). If this percentage is below about 10%, i.e., the region having a high transmission efficiency occupies a too large a portion of the pixel, there arises a problem which arises in conventional transmission type liquid crystal display devices, i.e., the problem that the display is blurred when the environment becomes too bright. Conversely, if the percentage of the region R exceeds about 90%, a problem arises when the environment becomes too dark to observe the display only by ambient light. That is, even if the backlight is turned on during such an occasion, the occupation of the region T is so small that the resultant display is not recognizable.

In particular, when the liquid crystal display device is applied to an apparatus which is mainly used outdoors, battery life is an important factor, and the device should be designed so as to utilize ambient light efficiently to realize a lower power consumption. Accordingly, the area of the region R, having a high reflection efficiency, is preferably about 40 to about 90% of the effective pixel area. When the area occupation of the region R is about 40%, the environment where only the reflection mode display is sufficient for display becomes limited, and thus the amount of time requiring light from the backlight becomes too long. This reduces battery life.

On the other hand, when the liquid crystal display device is applied to an apparatus which is mainly used indoors, the device should be designed so as to utilize light from the backlight efficiently. Accordingly, the area of the region R is preferably about 10 to about 60% of the effective pixel area. When the area occupation of the region R exceeds 60%, the region T for transmitting light from the backlight becomes too small. To compensate for this, the brightness of the backlight must be substantially increased when compared with, for example, a transmission type liquid crystal display device. This increases the power consumption and lowers the backlight utilization efficiency of such a device.

The liquid crystal display device of this example was actually mounted in a battery-driven video camera. As a result, the display was kept bright and recognizable regardless of the brightness of ambient light by adjusting the brightness of the backlight. In particular, when the device was used outdoors during a fine weather, it was not necessary to light the backlight, thus reducing the power consumption. Therefore, battery life is significantly increased when compared with a device with only a transmission type liquid crystal display device.

EXAMPLE 11

Figure 32:
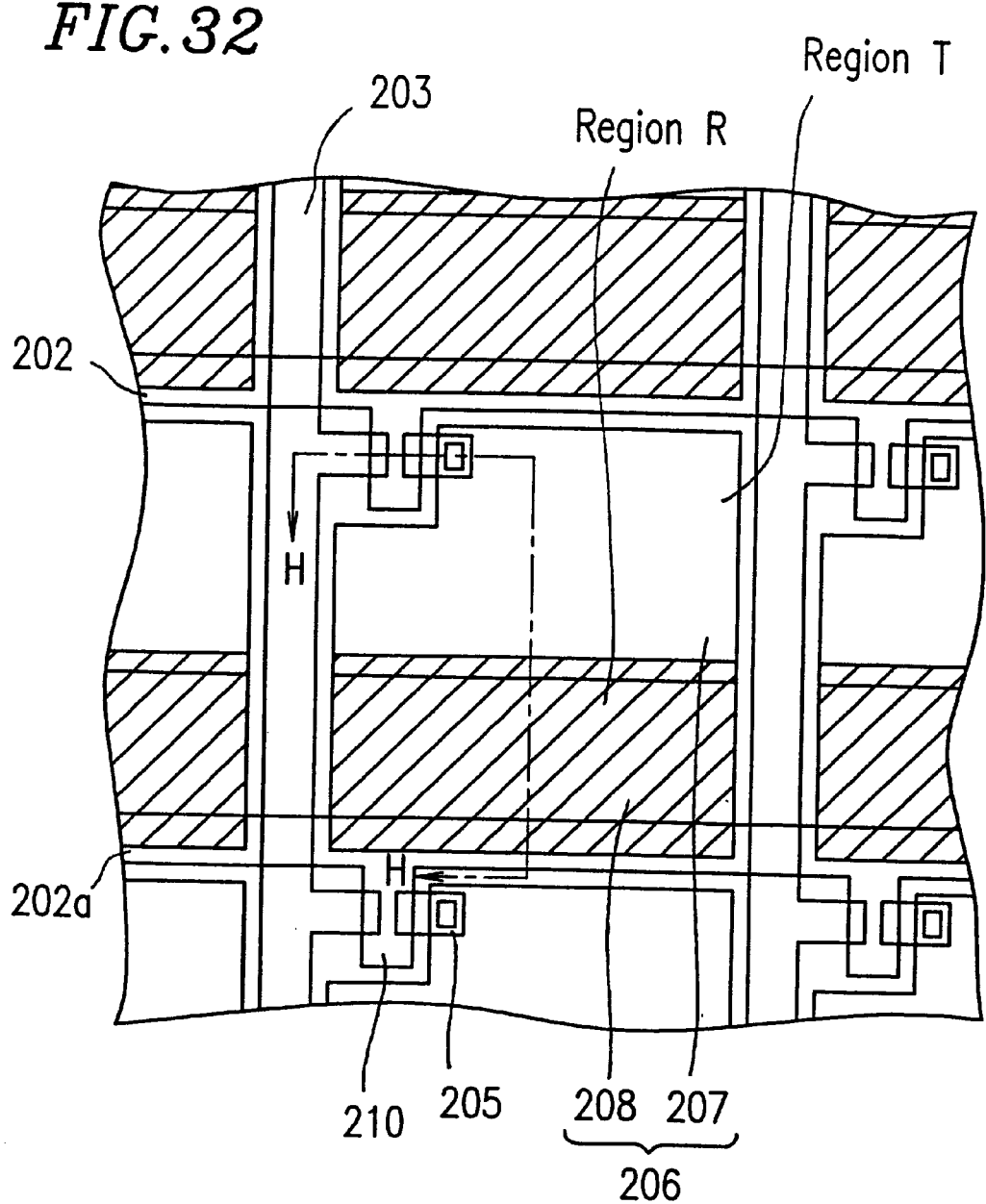
FIG. 32 is a plan view of an active matrix substrate of a liquid crystal display device according to Example 11 of the present invention.
Figure 33:
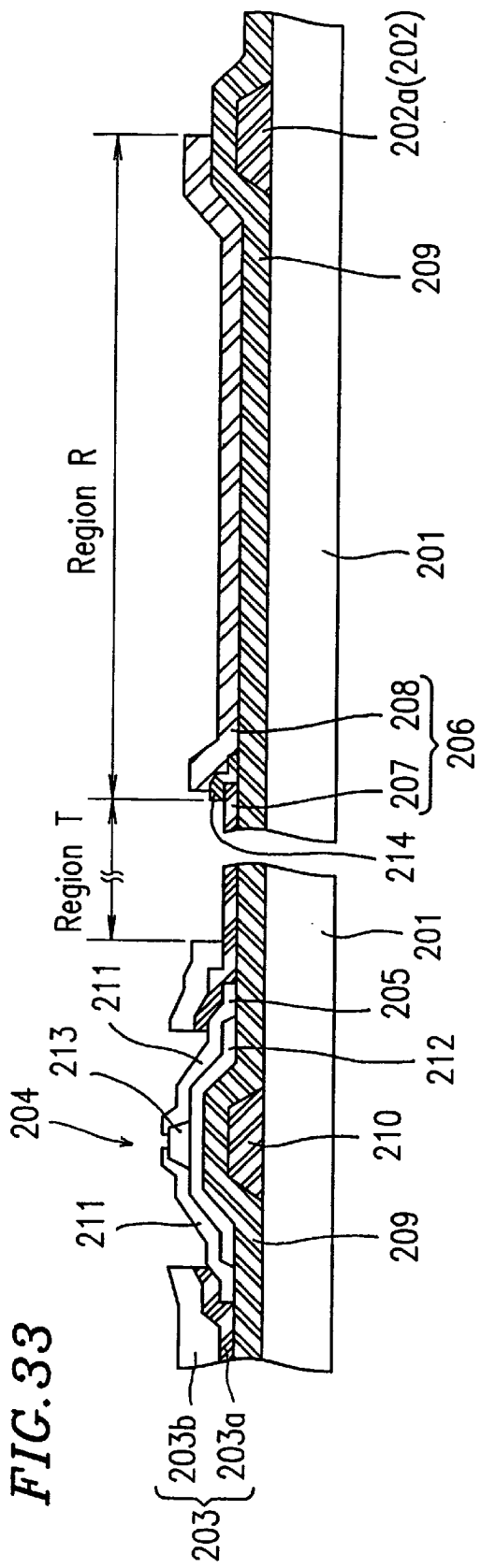
FIG. 33 is a sectional view taken along line H—H of FIG. 32.

FIG. 32 is a partial plan view of an active matrix substrate of a liquid crystal display device of Example 11 according to the present invention. FIG. 33 is a sectional view taken along line H—H of FIG. 32.

In this example, the portion of each pixel where the pixel electrode is formed is divided into two regions at the center thereof as is viewed from the top, i.e., a region T having a high transmission efficiency and a region R having a high reflection efficiency.

The same components are denoted by the same reference numerals as those in FIGS. 30 and 31 in Example 10. The pixels, the structure of the TFTs, and the fabrication process of the device are substantially the same as those described in Example 10.

Referring to FIGS. 32 and 33, an ITO layer 207 is formed over the region of each pixel ranging from the center portion to a vicinity of a corresponding gate line 202, and partly connected to a drain electrode 205 of a TFT 204. An Al layer 208, having a high reflection efficiency, overlaps the ITO layer 207 via an Mo layer 214 at the center portion of the pixel. The Al layer 208 extends on the side of the pixel opposite to the region of the ITO layer 207, to overlap a gate line 202a for the adjacent pixel in the next pixel row via a gate insulating film 209.

Since the ITO layer 207 and the Al layer 208 are electrically connected via the Mo layer 214, electric corrosion due to the contact between the ITO layer 207 and the Al layer 208 is suppressed. The overlap between the Al layer 208, i.e., the region R and the gate line 202a, and the adjacent pixel is accomplished via the insulating film 209. This overlap forms a storage capacitor during the driving of liquid crystal, and this overlap portion of the region R also contributes to the display. This significantly increases the effective area of the pixel compared with the conventional construction.

In order to further increase the aperture ratio of the pixel, a film having a high reflection efficiency such as the Al layer 208 may be formed above the TFT 204 or the source line 203, via an insulating film, to serve as part of the pixel electrode 206 (which is electrically connected to the drain electrode 205). In such a case, however, the thickness, the material, and the pattern design of the insulating film should be appropriately determined so that the degradation of image quality due to a parasitic capacitance generated between the pixel electrode 206 and the TFT 204 or the source line 203 is minimized.

EXAMPLE 12

Figure 34:
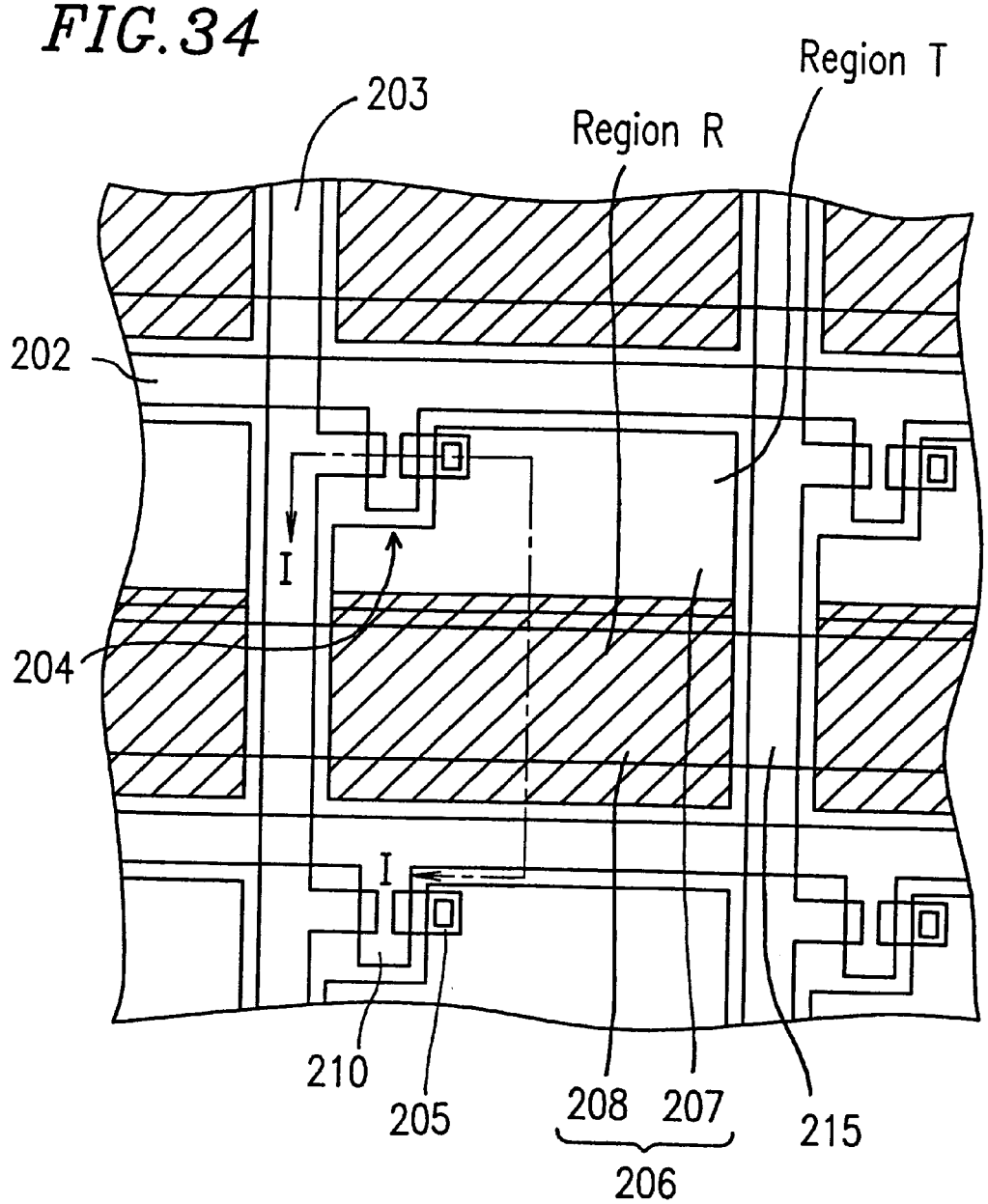
FIG. 34 is a plan view of an active matrix substrate of a liquid crystal display device according to Example 12 of the present invention.
Figure 35:
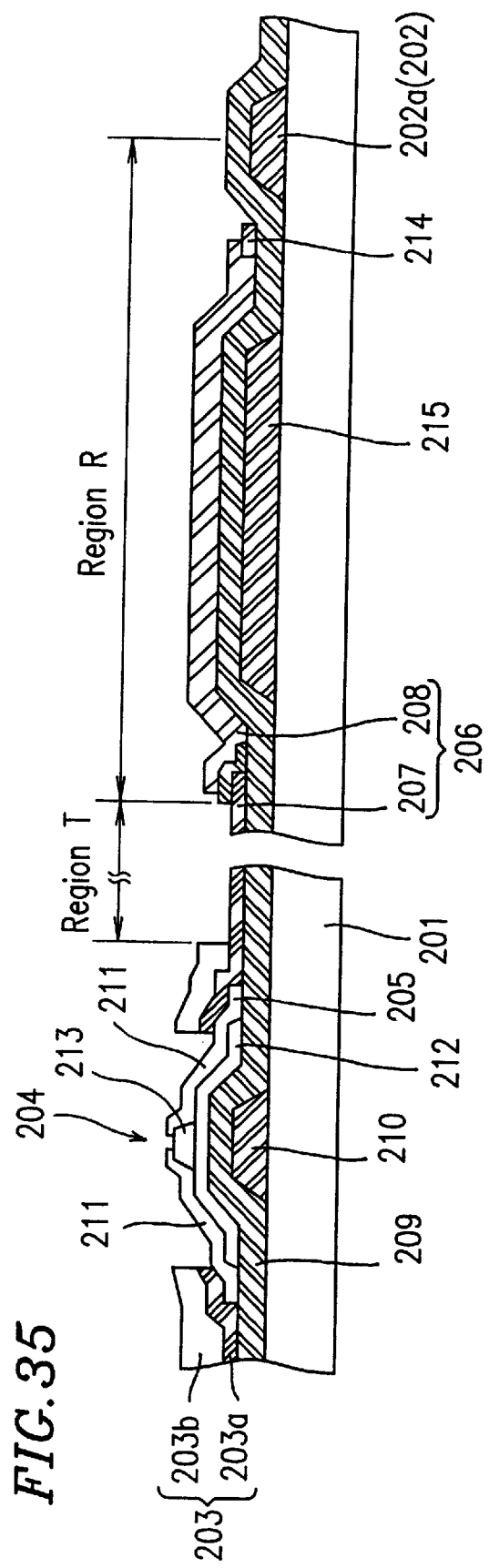
FIG. 35 is a sectional view taken along line I—I of FIG. 34.

FIG. 34 is a partial plan view of an active matrix substrate of a liquid crystal display device of Example 12 according to the present invention. FIG. 35 is a sectional view taken along line I—I of FIG. 34.

This example is different from Example 11 in that a common line 215 is formed under the region R having a high reflection efficiency, via a gate insulating film 209.

The same components are denoted by the same reference numerals as those in FIGS. 30 to 33 in Examples 10 and 11. The pixels, the structure of the TFTs, and the fabrication process of the device are substantially the same as those described in Examples 10 and 11.

Referring to FIGS. 34 and 35, an ITO layer 207 is formed over the region of each pixel ranging from the center portion to a vicinity of a corresponding gate line 202 and connected to a drain electrode 205 of a TFT 204. An Al layer 208 having a high reflection efficiency overlaps the ITO layer 207 via an Mo layer 214 at the center portion of the pixel. The Al layer 208 and extends on the side of the pixel opposite to the region of the ITO layer 207 in the vicinity of a gate line 202a for the adjacent pixel in the next pixel row, overlapping the common line 215 via a gate insulating film 209.

Since the ITO layer 207 and the Al layer 208 are electrically connected via the Mo layer 214, electric corrosion due to the contact between the ITO layer 207 and the Al layer 208 is suppressed. The overlap between the Al layer 208, i.e., the region R and the common line 215 via the insulating film 209 forms a storage capacitor during the driving of liquid crystal, contributing to an improved display. This formation of the storage capacitor will not lower the aperture ratio.

In order to further increase the aperture ratio of the pixel, a film having a high reflection efficiency such as the Al layer 208 may be formed above the TFT 204 or the source line 203, via an insulating film, to serve as part of the pixel electrode 206 (which is electrically connected to the drain electrode 205). In such a case, however, the thickness and the material of the insulating film should be appropriately determined so that no parasitic capacitance is generated between the pixel electrode 206 and the TFT 204 or the source line 203. For example, after the formation of the ITO layers 207, an organic insulating film having a dielectric constant of about 3.6 may be deposited over the entire resultant substrate to a thickness as large as about 3 $\mu$m. Then, the Al layer 208 may be formed in each pixel, so as to overlap the TFT 204 or the source line 203 and to be electrically connected to the drain electrode 205. This electrical connection can be realized via a contact hole by forming a contact hole on the drain electrode 205 or the ITO layer 207.

Figure 36:
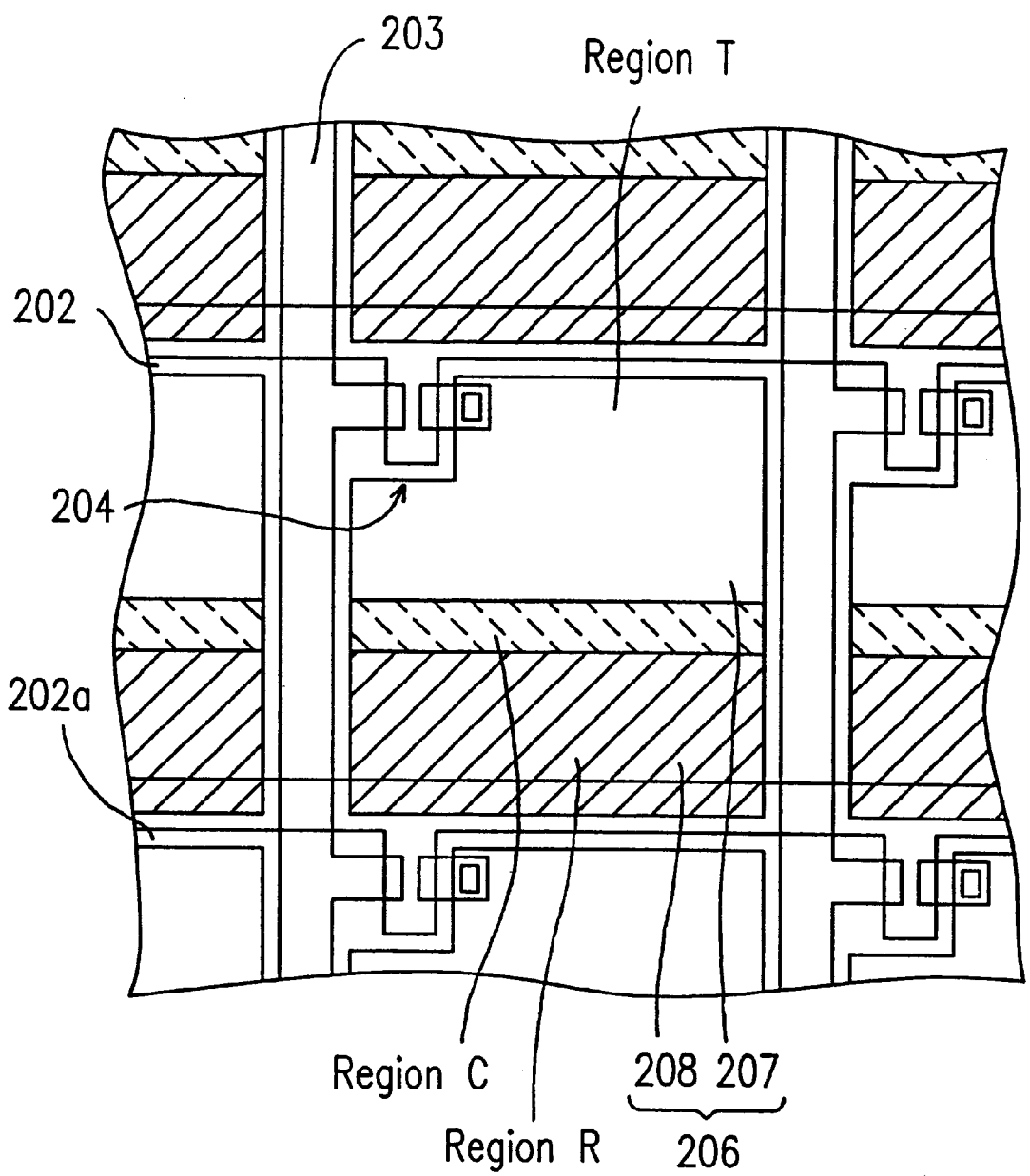
FIG. 36 is a plan view of an alternative embodiment of the active matrix substrate of the liquid crystal display device according to Example 12 of the present invention.

In this example, the portion of each pixel where the pixel electrode 206 is formed is divided into two regions, i.e., a region having a high transmission efficiency (region T) and a region having a high reflection efficiency (region R). Alternatively, the portion may be divided into three or more regions. For example, as shown in FIG. 36, the pixel electrode 206 may be divided into three regions, i.e., the region T having a high transmission efficiency, the region R having a high reflection efficiency, and a region C having a different transmission or reflection efficiency from the other two regions.

EXAMPLE 13

Figure 37:
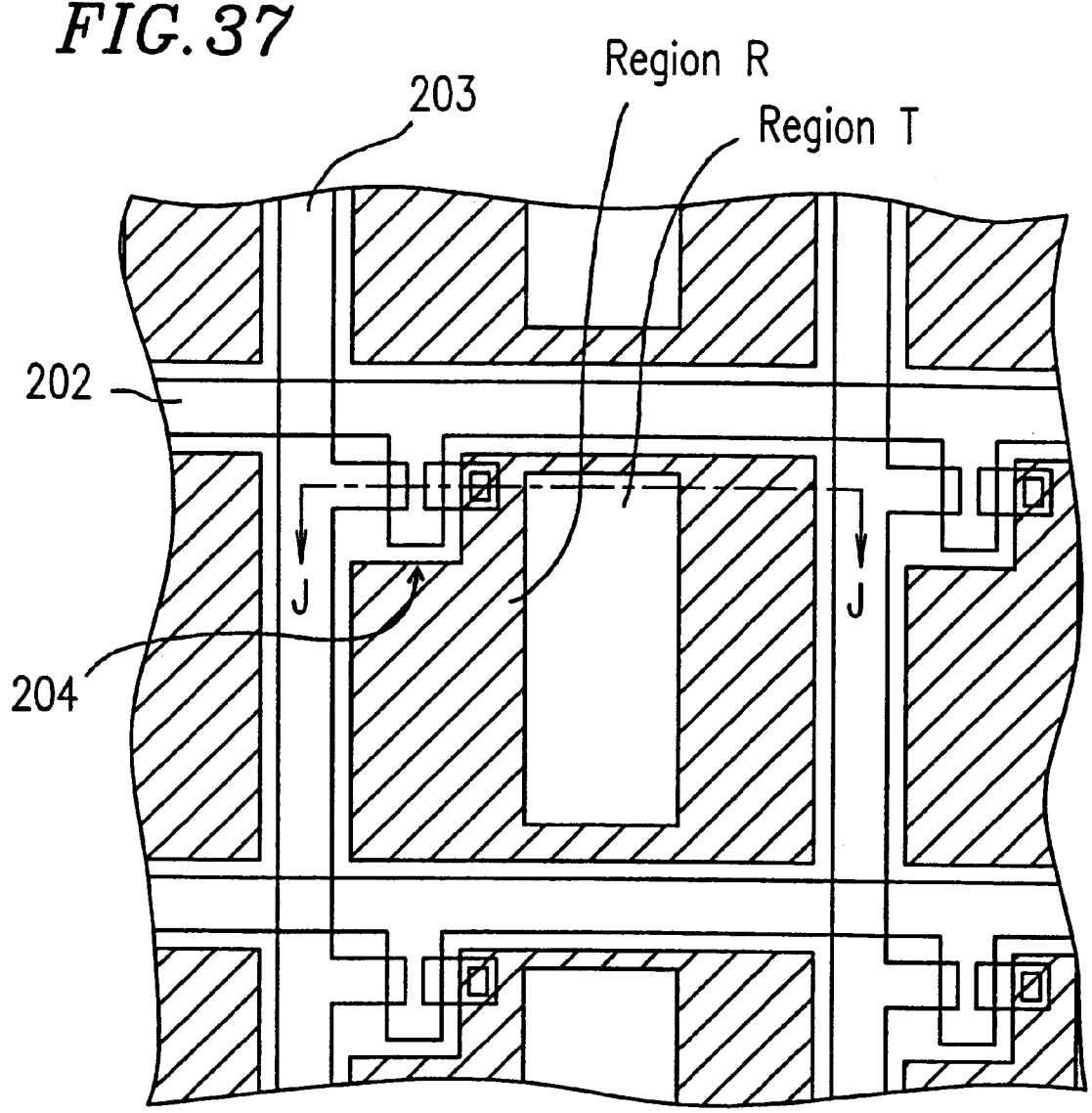
FIG. 37 is a plan view of an active matrix substrate of a liquid crystal display device according to Example 13 of the present invention.

FIG. 37 is a partial plan view of an active matrix substrate of a liquid crystal display device of Example 13 according to the present invention. FIGS. 38A to 38D are sectional views taken along line J—J of FIG. 37, illustrating the process of fabricating the liquid crystal display device of this example.

In this example, regions R having a high reflection efficiency are made of the same material as that used for source lines. The same components are denoted by the same reference numerals as those in FIGS. 30 to 36 in Examples 10 to 12. The pixels, the structure of the TFTs, and the fabrication process of the device are substantially the same as those described in Examples 10 to 12 unless otherwise specified.

In this example, each pixel includes a region T having a high transmission efficiency formed in the center portion thereof and a region R surrounding the region T. The outer profile of the region R is a square along two gate lines and two source lines. The region R includes a layer, having a high reflection efficiency, made of the same material as that for the source line, realizing a high reflection efficiency.

The process of fabricating such a liquid crystal display device will be described with reference to FIGS. 38A to 38D.

Figure 38A:
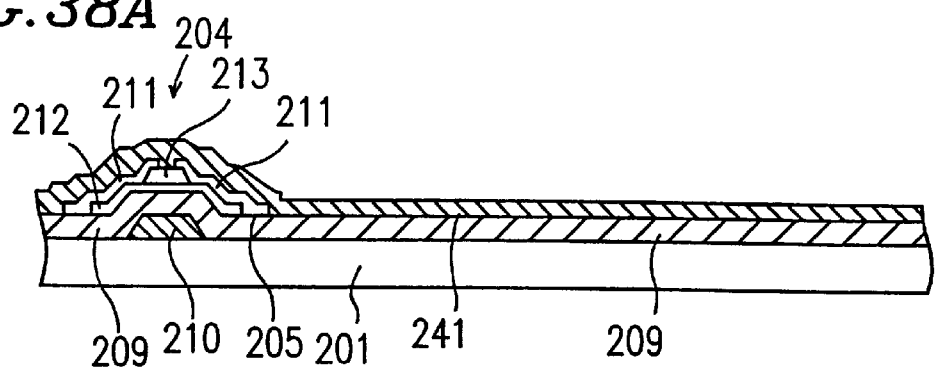
FIGS. 38A to 38D are sectional views taken along line J—J of FIG. 37, illustrating the fabrication process of the active matrix substrate of Example 13.

Referring to FIG. 38A, gate lines 202 (see FIG. 37) and gate electrodes 210, a gate insulating film 209, semiconductor layers 212, channel protection layers 213, and $n^+$-Si layers 211, which are to be source electrodes 211 and drain electrodes 205 (or 211) are sequentially deposited on an insulating substrate 201 by sputtering. Then, a conductive film 241 for source lines 203 (see FIG. 37) is deposited on the resultant substrate by sputtering.

Figure 38B:
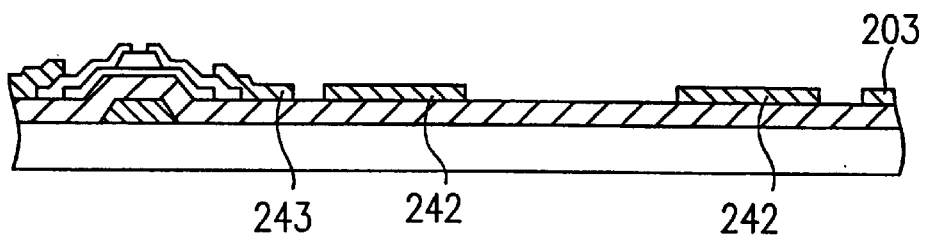

Referring to FIG. 38B, the conductive film 241 is patterned to form layers 242 having a high reflection efficiency, drain-pixel electrode connecting layers 243, and the source lines 203. The regions of the layers 242 having a high reflection efficiency correspond to the regions R.

Figure 38C:
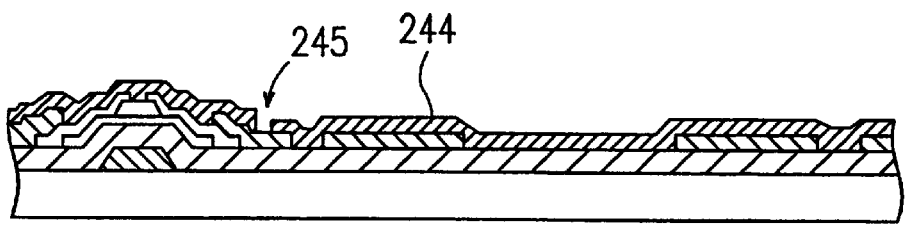

Referring to FIG. 38C, an interlayer insulating film 244 is formed over the resultant substrate, and then contact holes 245 are formed through the interlayer insulating film 244.

Figure 38D:
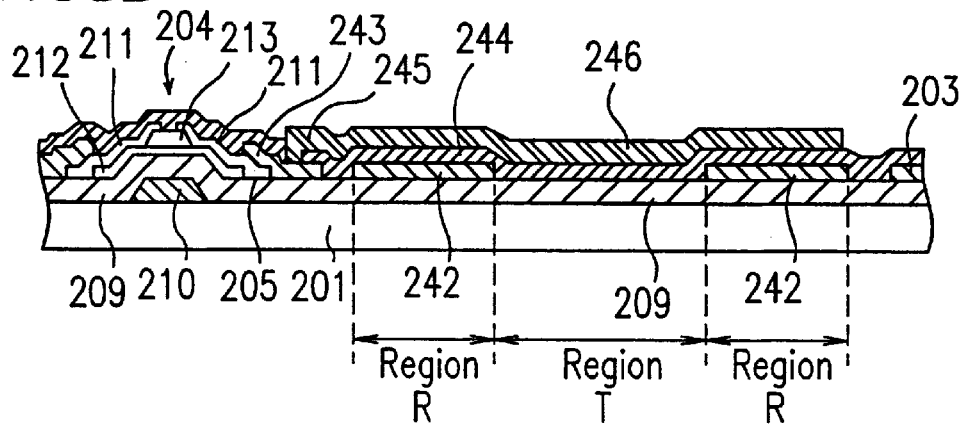

Referring to FIG. 38D, a layer 246 having a high transmission efficiency, made of ITO, is formed over the entire area of each pixel. The layer 246 having a high transmission efficiency may be made of any other material having a high transmission efficiency. The layer 246 having a high transmission efficiency is connected to the connecting layer 243 via the contact hole 245 formed through the interlayer insulating film 244, thus being electrically connected to a corresponding drain electrode 205. The layer 246 having a high transmission efficiency also serves as the pixel electrode for applying a voltage to a liquid crystal layer, so that the voltage is applied to the portions of the liquid crystal layer corresponding to both the regions T and R via the layer 246 having a high transmission efficiency. Thus, in this example, each pixel electrode is composed of only the layer 246 having a high transmission efficiency, and are not composed of the region T having a high transmission efficiency and the region R having a high reflection efficiency. This construction is advantageous over the transmission type liquid crystal display device in that the region having a high reflection efficiency can be formed without increasing the number of process steps and that failure in the formation of pixel electrodes is minimized.

EXAMPLE 14

Figure 39:
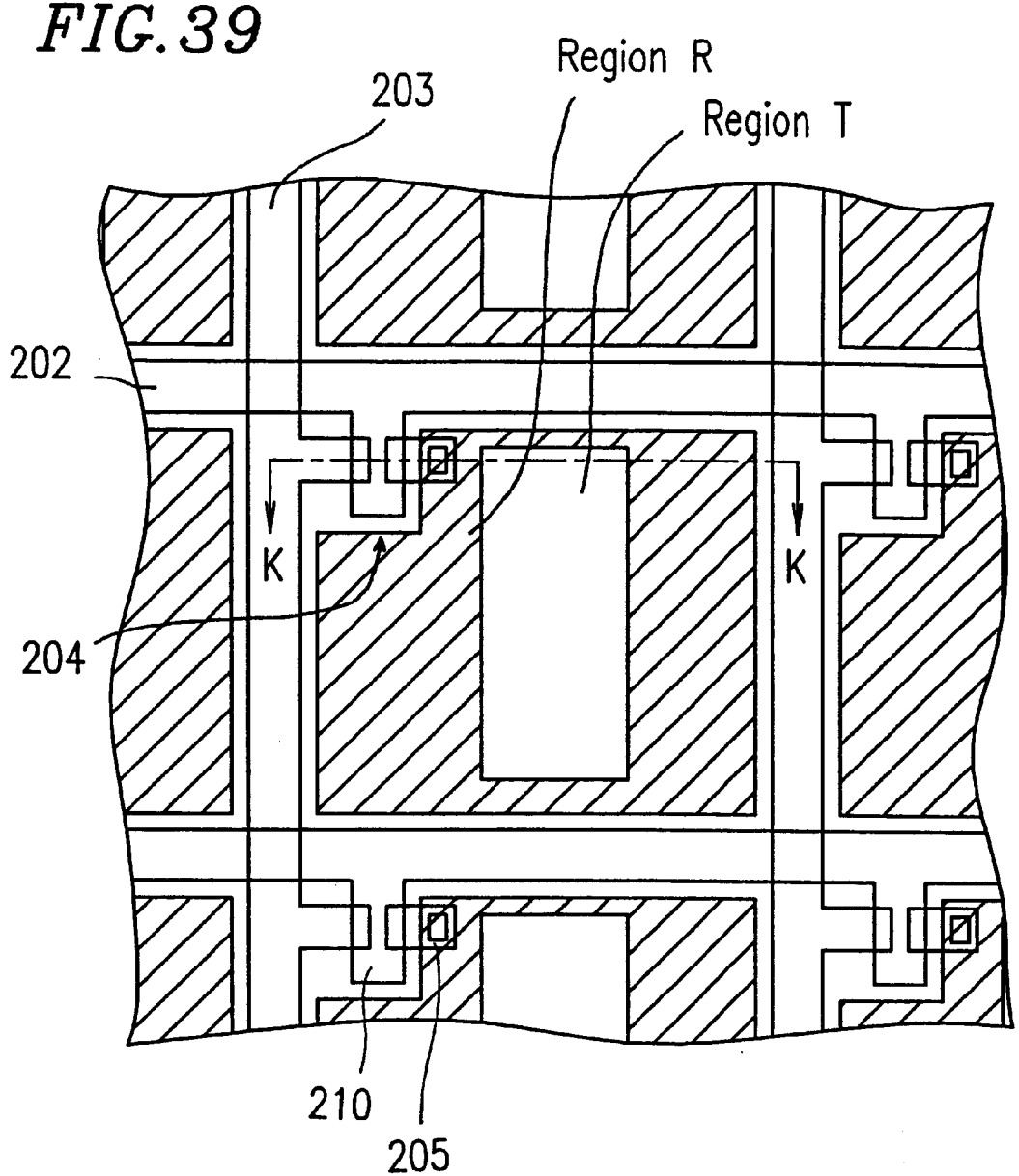
FIG. 39 is a plan view of an active matrix substrate of a liquid crystal display device according to Example 14 of the present invention.

FIG. 39 is a partial plan view of an active matrix substrate of a liquid crystal display device of Example 14 according to the present invention. FIGS. 40A to 40D are sectional views taken along line K—K of FIG. 39, illustrating the process of fabricating the liquid crystal display device of this example.

In this example, regions R (the hatched portion in FIG. 39) having a high reflection efficiency are made of the same material as is used for gate lines. The same components are denoted by the same reference numerals as those in FIGS. 30 to 38 in Examples 10 to 13. The pixels, the structure of the TFTs, and the fabrication process of the device are substantially the same as those described in Examples 10 to 13 unless otherwise specified.

In this example, each pixel includes a rectangular region T having a high transmission efficiency formed in the center portion thereof and a region R substantially composed of two connected strips surrounding the region T as is viewed from the top. The outer profile of the region R is a square along two gate lines and two source lines. The region R includes a layer, having a high reflection efficiency, made of the same material as that for the gate line, realizing a high reflection efficiency.

The process of fabricating such a liquid crystal display device will be described with reference to FIGS. 40A to 40D.

Figure 40A:
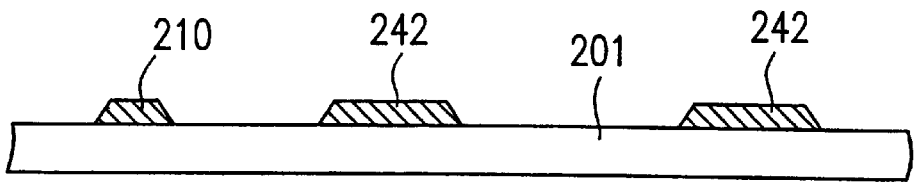
FIGS. 40A to 40D are sectional views taken along line K—K of FIG. 39, illustrating the fabrication process of the active matrix substrate of Example 14.

Referring to FIG. 40A, a conductive film is formed on an insulating substrate 201. The conductive film is then patterned to form gate electrodes 210, gate lines 202 (see FIG. 39), and layers 242 having a high reflection efficiency. The layers 242 having a high reflection efficiency correspond to the regions R.

Figure 40B:
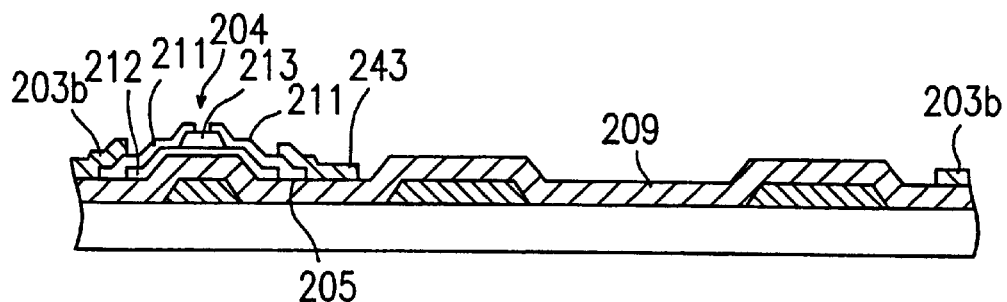

Referring to FIG. 40B, a gate insulating film 209, semiconductor layers 212, channel protection layers 213, and $n^+$-Si layers 211 which are to be source electrodes 211 and drain electrodes 205 (or 211) are sequentially deposited on the resultant substrate by sputtering. Then, metal layers 203b, used as part of source layers 203, and drain-pixel electrode connecting layers 243 are formed during the same step. The connecting layers 243 partly overlap drain electrodes 205 of TFTs 204.

Figure 40C:
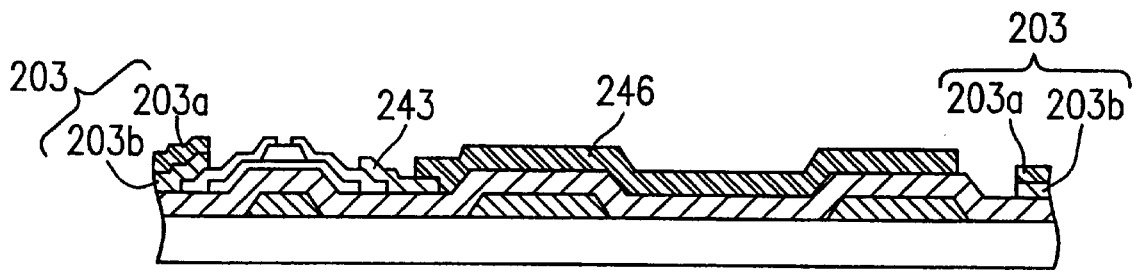

Referring to FIG. 40C, ITO is deposited on the resultant substrate by sputtering and patterned to form layers 246 having a high transmission efficiency and ITO layers 203a as part of the source lines 203. The layers 246 having a high transmission efficiency are formed over the entire areas of respective pixels, and the ITO layers 203a are formed on the metal layers 203b to have the same pattern as the metal layers 203b. The layers 246 having a high transmission efficiency partly overlap the connecting layers 243 to be electrically connected to the respective TFTs 204.

Figure 40D:
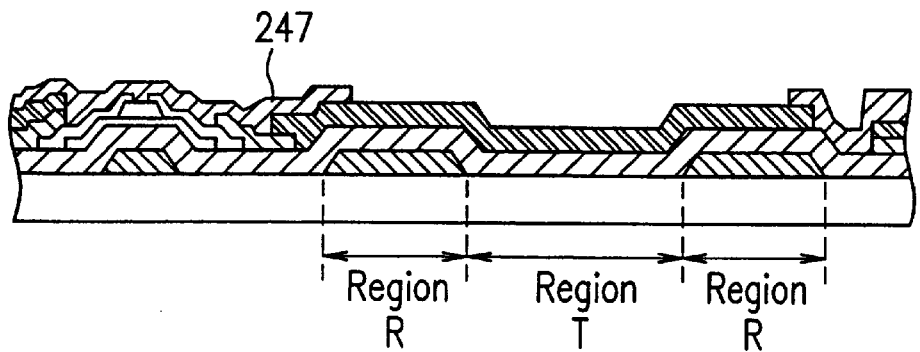

Referring to FIG. 40D, a passivation film 247 is formed and patterned.

Thus, each pixel of the liquid crystal display device of this example includes the region T having a high transmission efficiency in the center portion thereof, and the region R having a high reflection efficiency surrounding the region T in a shape of two connected strips along the adjacent source lines. In this case, since the ITO layers 203a of the source lines 203 and the layers 242, having a high reflection efficiency are located at different levels, the gap between the ITO layer 203a and the layer 242, having a high reflection efficiency, of each pixel, which is required to prevent a leakage therebetween, can be narrowed, and thus the aperture ratio of the pixel can be increased, compared with the case where the regions T and R are formed in reverse (i.e., the case where the layer having a high reflection efficiency is located in the center portion of the pixel).

In this example, as in Example 13, each pixel electrode is composed of only one type of electrode (i.e., the layer 246 having a high transmission efficiency). This construction is advantageous over the construction where the pixel electrode is composed of two types of electrodes in that the occurrence of defects is reduced and efficient fabrication of the device is possible.

In this example, each source line 203 is of a double layer structure composed of the metal layer 203b and the ITO layer 203a. Even if the metal layer 203b is partly defective, the electric connection of the source line 203 is maintained by the ITO layer 203a. This reduces the occurrence of disconnections in the source line 203.

EXAMPLE 15

Figure 41:
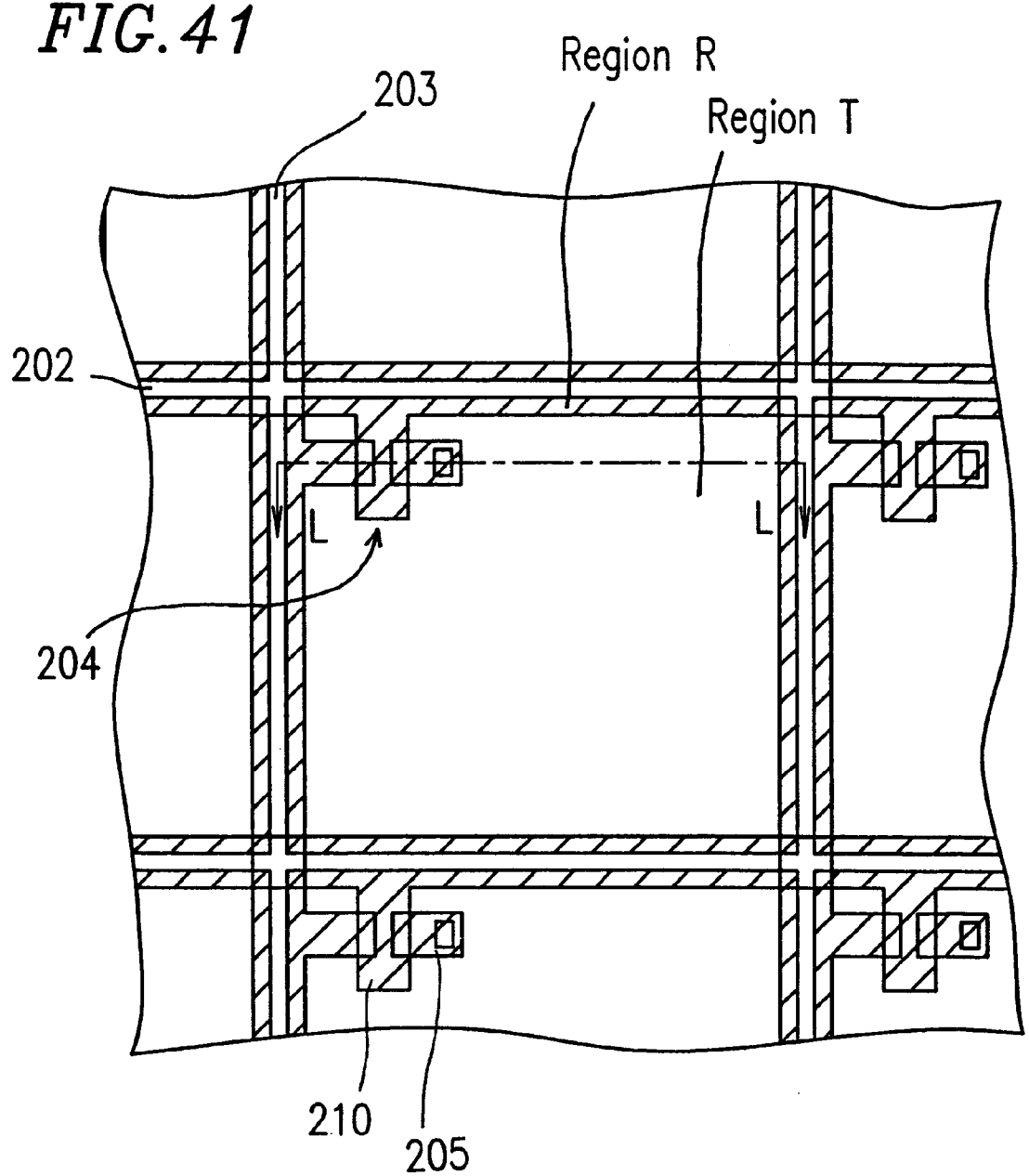
FIG. 41 is a plan view of an active matrix substrate of a liquid crystal display device according to Example 15 of the present invention.
Figure 42A:
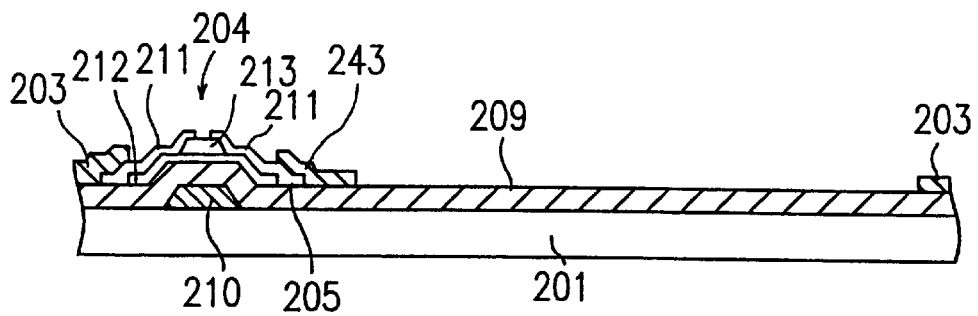
FIGS. 42A to 42C are sectional views taken along line L—L of FIG. 41, illustrating the fabrication process of the active matrix substrate of Example 15.
Figure 42B:
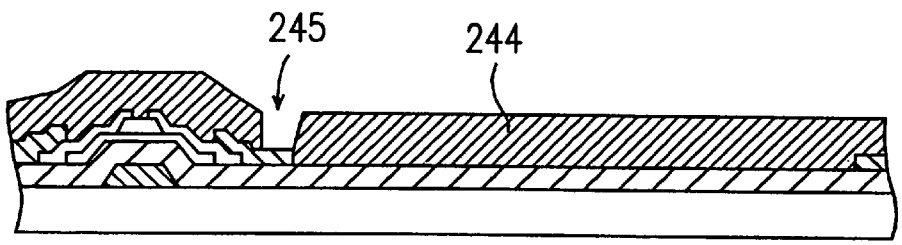
Figure 42C:
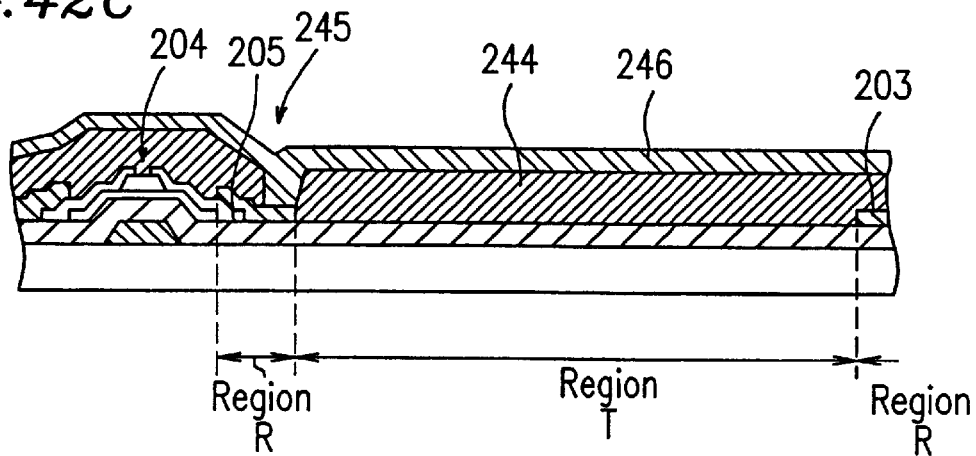

FIG. 41 is a partial plan view of an active matrix substrate of a liquid crystal display device of Example 15 according to the present invention. FIGS. 42A to 42C are sectional views taken along line L—L of FIG. 41, illustrating the process of fabricating the liquid crystal display device of this example.

In this example, pixel electrodes extend over gate lines and/or source lines via an insulating film so as to increase the effective pixel area (the area substantially functioning as a pixel).

The same components are denoted by the same reference numerals used in Examples 10 to 14. The pixels, the structure of the TFTs, and the fabrication process of the device are substantially the same as those described in Examples 10 to 14 unless otherwise specified.

As shown in FIG. 41, in this example, each pixel includes a region T having a high transmission efficiency formed in the center portion thereof and a region R (a hatched portion in FIG. 41) a square formed from narrow strips, surrounding the region T as is viewed from the top. The pixel electrode including a layer having a high transmission efficiency overlaps adjacent gate lines 202 and source lines 203 via an interlayer insulating film, so that a voltage can be applied to the portions of a liquid crystal layer located above the gate lines 202 and the source lines 203. This ensures a larger effective pixel area than in Examples 10 to 14. In this example, the gate lines 202 and the source lines 203 serve as layers having a high reflection efficiency in the region R.

The process of fabricating such a liquid crystal display device will be described with reference to FIGS. 42A to 42C.

Referring to FIG. 42A, gate electrodes 210, gate lines 202 (see FIG. 41), a gate insulating film 209, semiconductor layers 212, channel protection layers 213, and n$^+$-Si layers 211, which are to be source electrodes 211 and drain electrodes 205 (or 211) are sequentially deposited on an insulating substrate 201 by sputtering. At least either of the gate lines 202 and the source lines 203, which are to be overlapped by light transmission layers as the pixel electrodes at a later step, are preferably made of a material having a high reflection efficiency.

Referring to FIG. 42B, an interlayer insulating film 244 is formed on the resultant substrate, and then contact holes 245 are formed through the interlayer insulating film 244.

Referring to FIG. 42C, a material having a high transmission efficiency such as ITO is deposited on the resultant substrate by sputtering and patterned to form layers 246 having a high transmission efficiency. The layers 246, having a high transmission efficiency, are connected, via the contact holes 245, to connecting layers 243 which are in turn connected to drain electrodes 205 of TFTs 204. At this time, the layers 246 having a high transmission efficiency are patterned so as to overlap at least either of the gate lines 202 and the source lines 203. With this construction, the gate lines 202 and/or the source lines 203 which are overlapped by the layers 246 having a high transmission efficiency via the interlayer insulating film 244, can be used as the layers having a high reflection efficiency.

The display device having the above construction should be designed so that a degradation of the image quality, due to a phenomenon such as crosstalk, does not occur due to a capacitance generated between the layer 246, having a high transmission efficiency, and the gate line 202 or the source line 203.

Thus, in this example, each pixel includes the region T having a high transmission efficiency formed in the center portion thereof and the region R having a high reflection efficiency formed at positions corresponding to the adjacent gate lines and/or the source lines. This eliminates the necessity of forming an additional layer having a high reflection efficiency, and thus the process can be shortened.

EXAMPLE 16

FIG. 43 is a partial plan view of an active matrix substrate of a liquid crystal display device of Example 16 according to the present invention. FIGS. 44A to 44F are sectional views taken along line M—M of FIG. 43, illustrating the process of fabricating the liquid crystal display device of this example.

As shown in FIG. 43, each pixel of the liquid crystal display device of this example includes a region T having a high transmission efficiency in the center portion thereof, and a region R (hatched portions in FIG. 43) having a high reflection efficiency composed of two strips along adjacent source lines 203 formed on the sides of the region T.

Figure 44A:
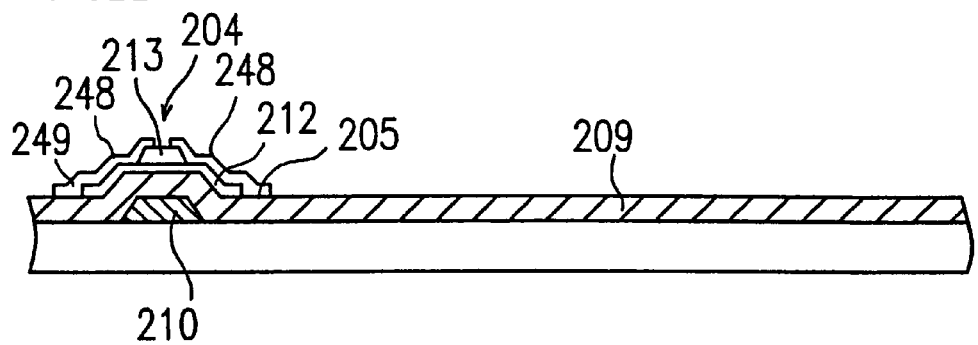
FIGS. 44A to 44F are sectional views taken along line M—M of FIG. 43, illustrating the fabrication process of the active matrix substrate of Example 16.
Figure 44B:
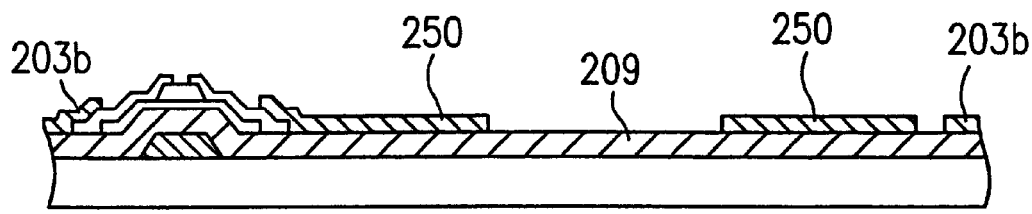
Figure 44C:
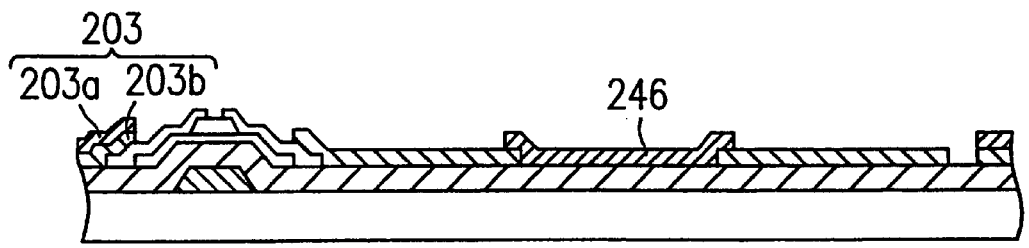
Figure 44D:
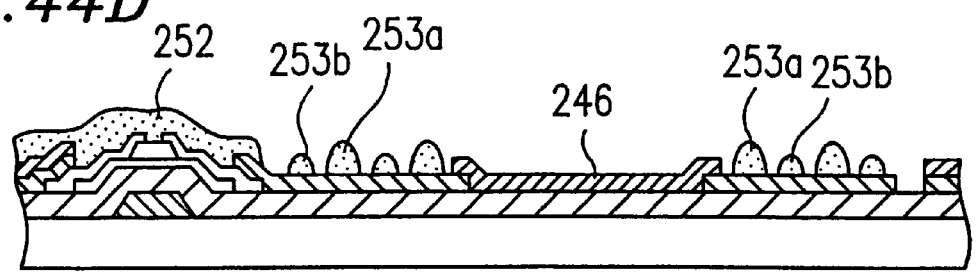
Figure 44E:
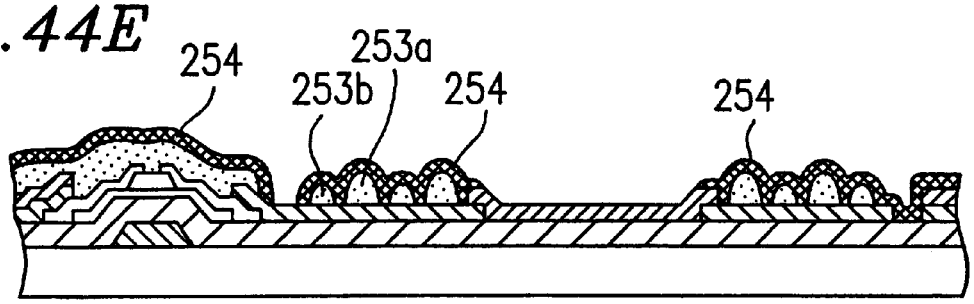
Figure 44F:
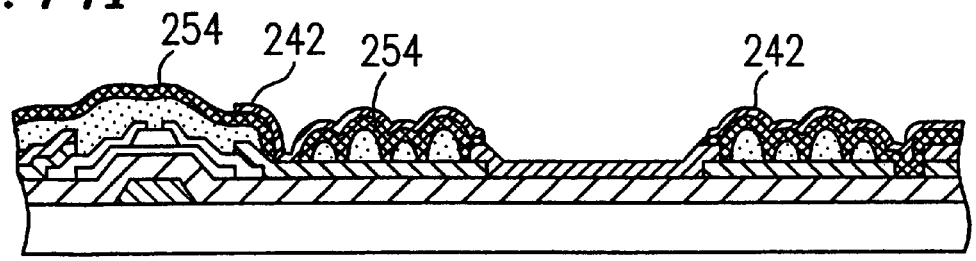

As shown in FIG. 44F, the region R includes high convex portions 253a and low convex portions 253b formed randomly on an insulating substrate 201, a polymer resin layer 254 formed over these convex portions 253a and 253b, and a layer 242, having a high reflection efficiency, formed on the polymer resin layer 254. The resultant layer 242, which constitutes the surface layer of the region R, has a surface of a continuous wave shape, and is electrically connected to a drain electrode 205 via a contact hole 245 and an underlying electrode (not shown).

The method for fabricating such a liquid crystal display device will be described with reference to FIGS. 44A to 44F.

Referring to FIG. 44A, a plurality of gate lines 202 (see FIG. 43) and gate electrodes 210 branched from the gate lines 202, made of Cr, Ta, or the like, are formed on the insulating substrate 201.

Then, a gate insulating film 209, made of SiN$_x$, SiO$_x$, or the like, is formed over the insulating substrate 201 covering the gate lines 202 and the gate electrodes 210. Semiconductor layers 212, made of amorphous silicon (a-Si), polysilicon, CdSe, or the like, are formed on the portions of the gate insulating film 209 located above the gate electrodes 210. A channel protection layer 213 is formed on each of the semiconductor layers 212. A pair of contact layers 248, made of a-Si or the like, are formed on both side portions of the channel protection layer extending to the side portions of the semiconductor layers 212.

A source electrode 249, made of Ti, Mo, Al, or the like, is formed on one of the contact layers 248, while the drain electrode 205 made of Ti, Mo, Al, or the like, is formed on the other contact layer 248.

In this example, as the material of the insulating substrate 201, a glass plate with a thickness of 1.1 mm, product number 7059 manufactured by Corning Inc. may be used.

Referring to FIG. 44B, a conductive film is formed on the resultant substrate by sputtering and patterned, to form metal layers 203b used as part of the source lines 203 and the underlying electrodes 250 simultaneously. Each of the underlying layers 250 may be formed to partly overlap the gate electrode 202 for the adjacent pixel in the next pixel row, via the gate insulating film 209, so as to form a storage capacitor therebetween.

Each of the gate lines 202 used to form a storage capacitor may be overlapped by a layer having a high reflection efficiency, or the reflection efficiency of the gate line 202 itself may be made high to serve as part of the pixel region (the region R, to further increase the aperture ratio.

Referring to FIG. 44C, ITO is deposited on the resultant substrate by sputtering and patterned to form ITO layers 203a which constitute the source lines 203 together with the metal layers 203b.

In this example, each source line 203 is of a double-layer structure composed of the metal layer 203b and the ITO layer 203a. The double-layer structure is advantageous in that, even if the metal layer 203b is partly defective, the electric connection of the source line 203 is maintained by the ITO layer 203a. This reduces the occurrence of disconnections in the source line 203.

Simultaneously with the formation of the ITO layers 203a, layer 246, having a high transmission efficiency and which constitute the pixel electrodes, are also obtained by the patterning. In this way, the layers 246 having a high transmission efficiency as the pixel electrodes can be formed simultaneously with the source lines 203.

Referring to FIG. 44D, a resist film 252, made of a photosensitive resin, is formed and patterned, and then heat-treated in order to round it, so that the high convex portions 253a and the low convex portions 253b, having a substantially circular cross-section, are formed on the portions of the resultant substrate corresponding to the regions R. Such convex portions 253a and 253b are preferably not formed on the layers 246 having a high transmission efficiency so that a voltage can be efficiently applied to a liquid crystal layer. Even if the convex portions 253a and 253b are formed on the layers 246, however, no significant optical influence will be observed so long as the convex portions are transparent.

Referring to FIG. 44E, a polymer film 254 is formed over the convex portions 253a and 253b. With this film, the concave and convex shaped surface of the region R can be made more continuous by reducing the number of flat portions. This step may be omitted by changing the fabrication conditions.

Referring to FIG. 44F, layers 242 having a high reflection efficiency made of Al as the pixel electrodes are formed on predetermined portions of the polymer films 254 by sputtering, for example. Materials suitable for the layers 242 having a high reflection efficiency include, besides Al and an Al alloy, Ta, Ni, Cr, and Ag having a high light reflection efficiency. The thickness of the layers 242 having a high reflection efficiency is preferably in the range of about 0.01 to about 1.0 $\mu$m.

Thus, each pixel of the liquid crystal display device of this example includes the region T having a high transmission efficiency formed in the center portion thereof, and the region R having a high reflection efficiency formed along the adjacent source lines. With this construction, since the ITO layers 203a of the source lines 203 and the layers 242 having a high reflection efficiency are located at different levels, the gap between the ITO layer 203a and the layer 242 with a high reflection efficiency of each pixel, which is required to prevent a leakage therebetween, can be narrowed, and thus the aperture ratio of the pixel can be increased, compared with the case where the regions T and R are formed in reverse (i.e., the case when the layer having a high reflection efficiency is located in the center portion of the pixel).

In this example, the layers 242 having a high reflection efficiency have a smooth concave and convex shaped surface to allow reflected light to be scattered in a wide range of directions. When a scattering sheet is jointly used, such convex portions need not be formed with the resist film 252, instead the surface of the layers 242 having a high reflection efficiency can be made flat. In either case, the layers 242, having a high reflection efficiency, and the layers 246 having a high transmission efficiency, exist as individual layers with a third substance (e.g., a resin and a metal such as Mo) interposed therebetween. With this construction, in the specific case where the layers having a high transmission efficiency are made of ITO and the layers having a high reflection efficiency are made of Al or an Al alloy, Al patterning failure due to an electric corrosion which tends to be generated at the Al etching step can be reduced.

EXAMPLE 17

Figure 45:
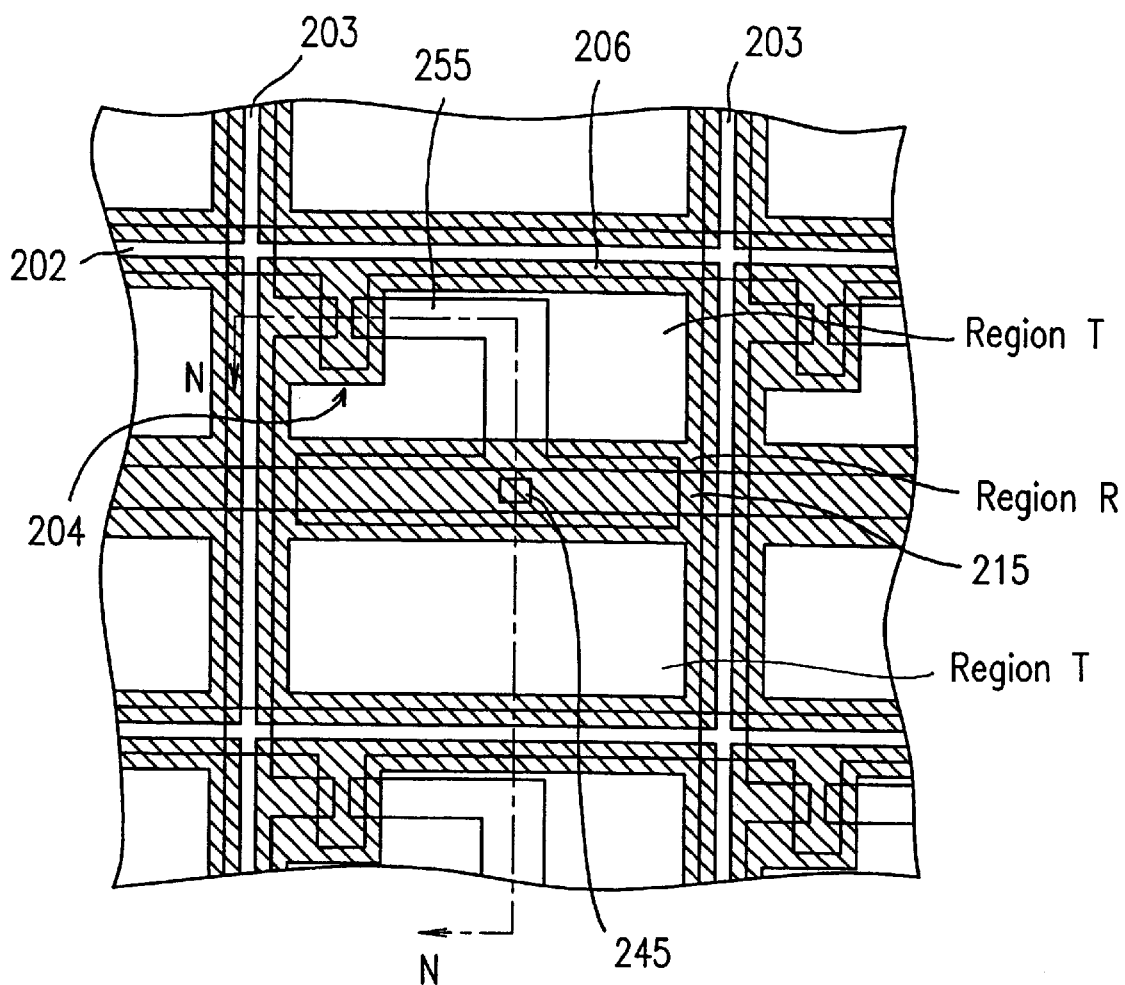
FIG. 45 is a plan view of an active matrix substrate of a liquid crystal display device according to Example 17 of the present invention.
Figure 46:
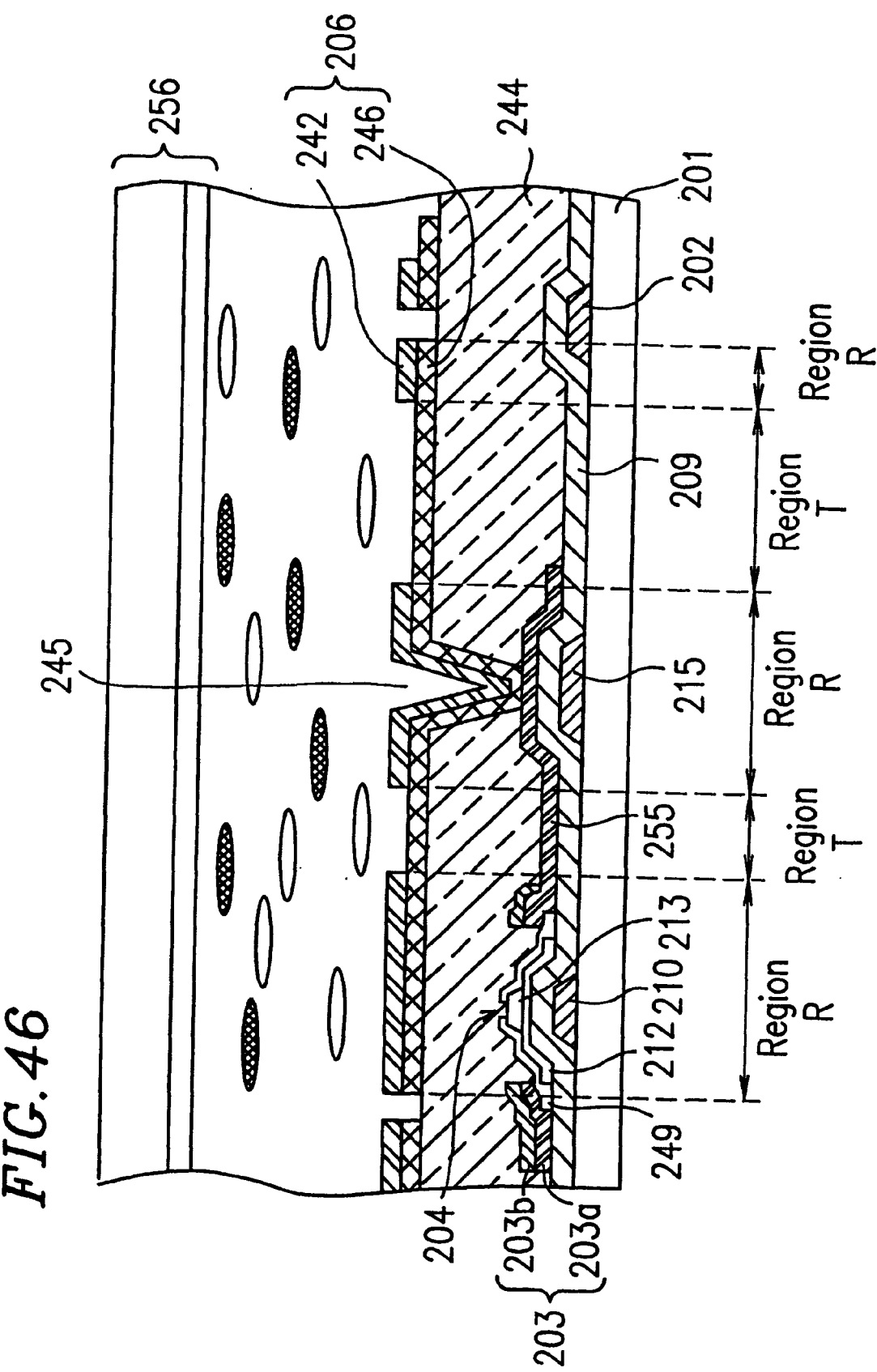
FIG. 46 is a sectional view taken along line N—N of FIG. 45.

FIG. 45 is a partial plan view of an active matrix substrate of a liquid crystal display device of Example 17 according to the present invention. FIG. 46 is a sectional view taken along line N—N of FIG. 45.

Referring to FIGS. 45 and 46, the active matrix substrate includes pixel electrodes 206 formed in a matrix and gate lines 202 for supplying scanning signals and source lines 203 for supplying display signals running along the peripheries of the pixel electrodes 206 so as to cross with each other.

The pixel electrodes 206 overlap the gate lines 202 and the source lines 203 at the peripheries via an interlayer insulating film 244. The gate lines 202 and the source lines 203 are composed of metal films.

A TFT 204 is formed in the vicinity of each of the crossings of the gate lines 202 and the source lines 203 as the switching element for supplying display signals to the corresponding pixel electrode 206. A gate electrode 210 of the TFT 204 is connected to the corresponding gate line 202 to drive the TFT 204 with signals input into the gate electrode 210. A source electrode 249 of the TFT 204 is connected to the corresponding source line 203 to receive data signals. A drain electrode 205 of the TFT 204 is electrically connected to a connecting electrode 255 and then to the pixel electrode 206 via a contact hole 245.

The connecting electrode 255 forms a storage capacitor with a common line 215 via a gate insulating film 209.

The common line 215 is composed of a metal film, and connected to a counter electrode formed on a counter substrate 256 via an interconnect (not shown). The common line 215 may be formed during the same step as the formation of the gate lines 202 to shorten the fabrication process.

Each of the pixel electrodes 206 is composed of a layer 242 having a high reflection efficiency made of Al or an Al alloy and a layer 246 having a high transmission efficiency made of ITO. When viewed from the top, the pixel electrode 206 is divided into three regions, i.e., two regions T having a high transmission efficiency and a region R having a high reflection efficiency (corresponding to the hatched portion in FIG. 45). The layer 242 having a high reflection efficiency may also be composed of a conductive metal layer having a high reflection efficiency such as Ta as in the above examples.

Each region R is designed to cover part of light-shading electrodes and interconnect lines, such as the gate lines 202, the source lines 203, the TFT 204, and the common line 215, which do not transmit light from a backlight. With this construction, the regions of each pixel portion which are not usable as the regions T can be used as the region R having a high reflection efficiency. This increases the aperture ratio of the pixel portion. The regions T of each pixel portion are surrounded by the region R.

The method for fabricating the active matrix with the above construction will be described.

First, the gate electrodes 210, the gate lines 202, the common lines 215, the gate insulating film 209, semiconductor layers 212, channel protection layers 213, the source electrodes 249, and the drain electrodes 205 are sequentially formed on a transparent insulating substrate 201 made of glass or the like.

Then, a transparent conductive film and a metal film which are to constitute the source lines 203 and the connecting electrodes 255 are deposited on the resultant substrate by sputtering and patterned into a predetermined shape.

Thus, each of the source lines 203 is of a double-layer structure composed the ITO layer 203a and the metal layer 203b. The double-layer structure is advantageous in that, even if the metal layer 203b is partly defective, the electric connection of the source lines 203 is maintained by the ITO layer 203a. This reduces the occurrence of disconnections in the source lines 203.

Thereafter, a photosensitive acrylic resin is applied to the resultant substrate by a spin application method to form the interlayer insulating film 244 with a thickness of about 3 μm. The acrylic resin is then exposed to light according to a desired pattern and then developed with an alkaline solution. Only the light-exposed portions of the film are etched away with the alkaline solution to form the contact holes 245 through the interlayer insulating film 244. By employing this alkaline development, well-tapered contact holes 245 are obtained.

Using a photosensitive acrylic resin for the interlayer insulating film 244 is advantageous in the aspect of productivity in view of the following points. Since the spin application method can be employed for the thin film formation, a film as thin as several micrometers can be easily formed. Also, no photoresist application step is required at the patterning of the interlayer insulating film 244.

In this example, the acrylic resin is originally colored and can be made transparent by exposing the entire surface to light after the patterning. The acrylic resin may also be made transparent by chemical processing.

Thereafter, an ITO film is formed by sputtering and patterned, to be used as the layers 246 having a high transmission efficiency of the pixel electrodes 206. Thus, the layers 246 having a high transmission a re electrically connected to the corresponding connecting electrodes 255 via the contact holes 245.

The layers 242 having a high reflection efficiency, made of Al or an Al alloy, are then formed on the portions of the layers 246 having a high transmission efficiency, which correspond to the regions R, so as to overlie the gate lines 202, the source lines 203, the TFTs 204, and the common lines 215. The two layers 242 and 246 are electrically connected with each other, thereby forming pixel electrodes 206. Any adjacent pixel electrodes 206 are separated along the portions located above the gate lines 202 and the source lines 203 so as not to be electrically connected with each other.

As shown in FIG. 46, the thus-fabricated active matrix substrate and the counter substrate 256 are bonded together, and liquid crystal is injected in a space between the substrates to complete the liquid crystal display device of this example.

As described above, the liquid crystal display device of this example includes the layers 242, having a high reflection efficiency, formed above the TFTs 204, the gate lines 202, and the source lines 203 so as to constitute the regions R of the pixel electrodes 206. This eliminates the necessity of providing light-shading films for preventing light from entering the TFTs 204 and light-shading the portions of the pixel electrodes 206 located above the gate lines 202, the source lines 203, and the common lines 215. In such portions, a light leakage tends to be generated in the form of domains, disclination lines, and the like in display regions. As a result, the regions which are conventionally unusable as display regions because they are blocked by the light-shading films can be made usable as display regions. This allows for effective use of the display regions.

When the gate lines and the source lines are composed of metal films, they block light from a backlight in a conventional transmission type display device and thus are unusable as display regions. In this example, however, the region T having a high transmission efficiency is formed in the center portion of each pixel (as two separate portions in this example). The region R, having a high reflection efficiency, is formed in a shape of strips surrounding the region T That is, the region R having a high reflection efficiency overlies the gate lines, the source lines, the common line, and the switching element, and is used as the reflection electrode region of each pixel electrode. This construction increases the aperture ratio of the pixel electrode more than the case of the reverse pattern (i.e., the pattern where the region T surrounds the region R.

Figure 47:
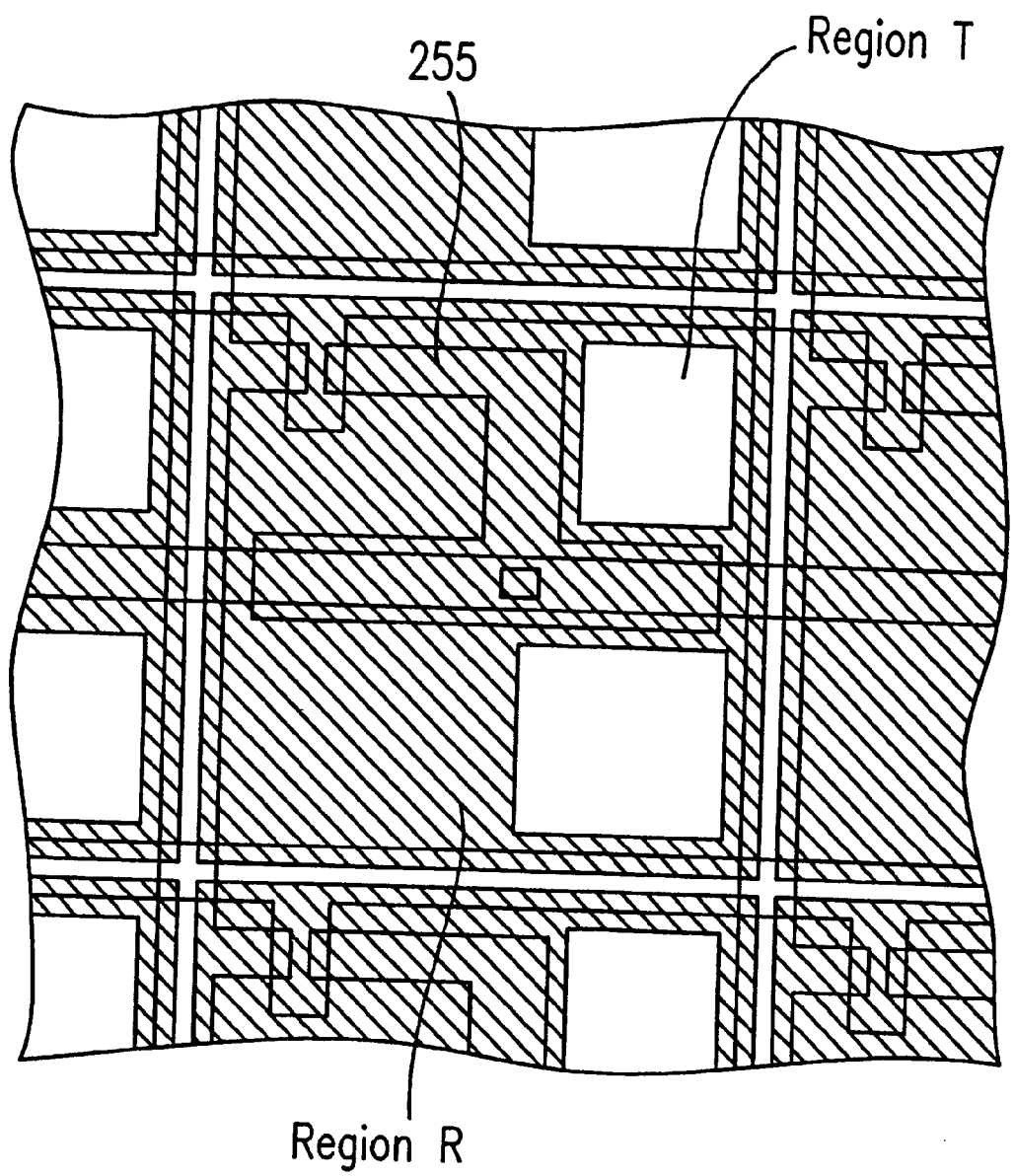
FIG. 47 is a plan view of an alternative embodiment of the active matrix substrate of the liquid crystal display device according to Example 17 of the present invention.

Alternatively, the region R of each pixel may be formed as shown in FIG. 47 (hatched portion) including the connecting electrode 255. This suppresses the decrease in the brightness of light passing through the region T.

EXAMPLE 18

In the above examples, the present invention was applied to the active matrix liquid crystal display device. The present invention can also be applied to a simple matrix liquid crystal display device.

Hereinbelow, a basic construction of a pair of a column electrode (a signal electrode) and a row electrode (a scanning electrode) which face each other will be described. In the simple matrix liquid crystal display device, the region where the pair of the column electrode and the row electrode cross with each other defines a pixel.

Figure 48A:
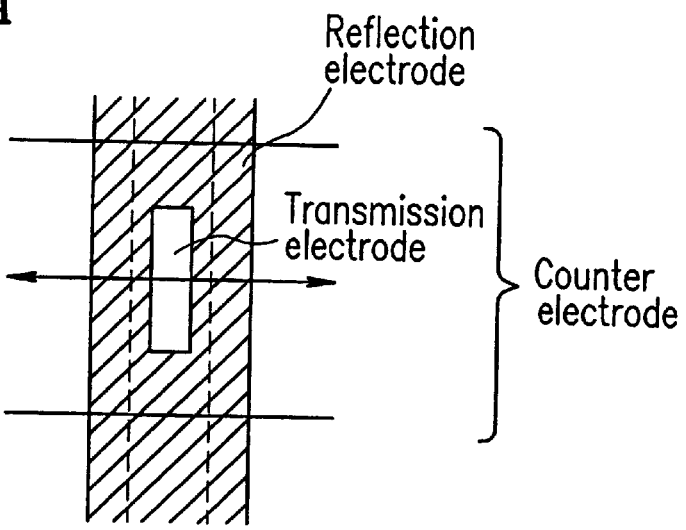
FIGS. 48A to 48C are views illustrating a construction of Example 18 where the present invention is applied to a simple matrix liquid crystal display device.
Figure 48B:
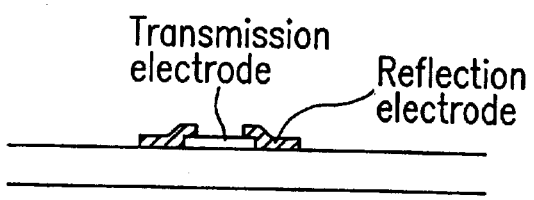
Figure 48C:
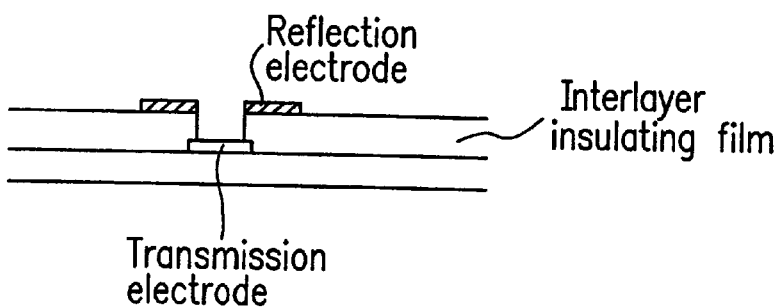

FIGS. 48A to 48C show one example of such a pixel region. Referring to FIG. 48A, a transmission electrode region is formed in the center portion of the column electrode in one pixel region, while a reflection electrode region is formed in the remaining peripheral portion thereof. The construction of the column electrode may be as shown in FIG. 48B or 48C. The height of the reflection electrode region can be adjusted by forming an interlayer insulating film between the reflection electrode and the transmission electrode as shown in FIG. 48C.

Figure 49A:
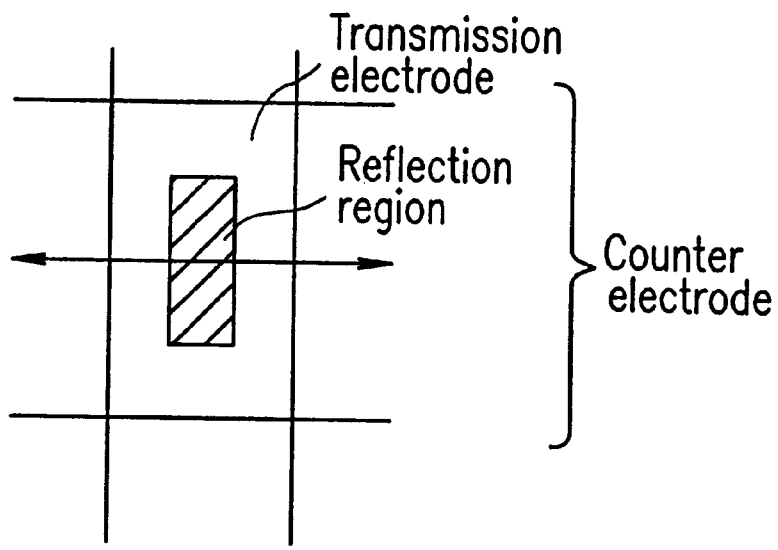
FIGS. 49A to 49C are views illustrating another construction of Example 18.
Figure 49B:
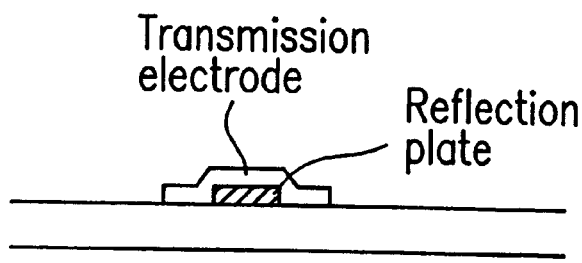
Figure 49C:
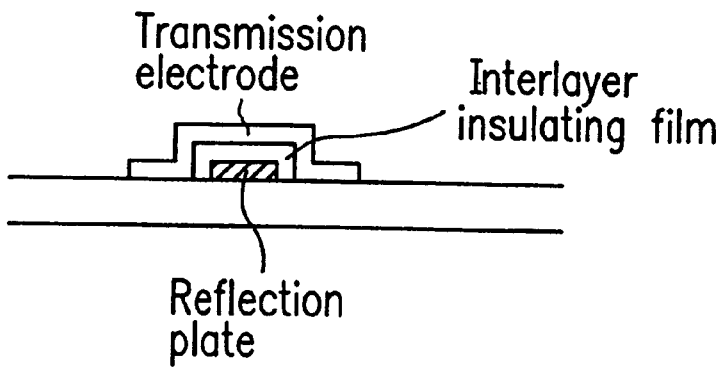

Alternatively, as shown in FIG. 49A, a reflection electrode region may be formed in the center portion of the column electrode in one pixel region, while a transmission electrode region is formed in the remaining peripheral portion thereof. The construction of the column electrode may be as shown in FIG. 49B or 49C. The height of the reflection electrode region can be adjusted by forming an interlayer insulating film between the reflection plate and the transmission electrode as shown in FIG. 49C.

Figure 50A:
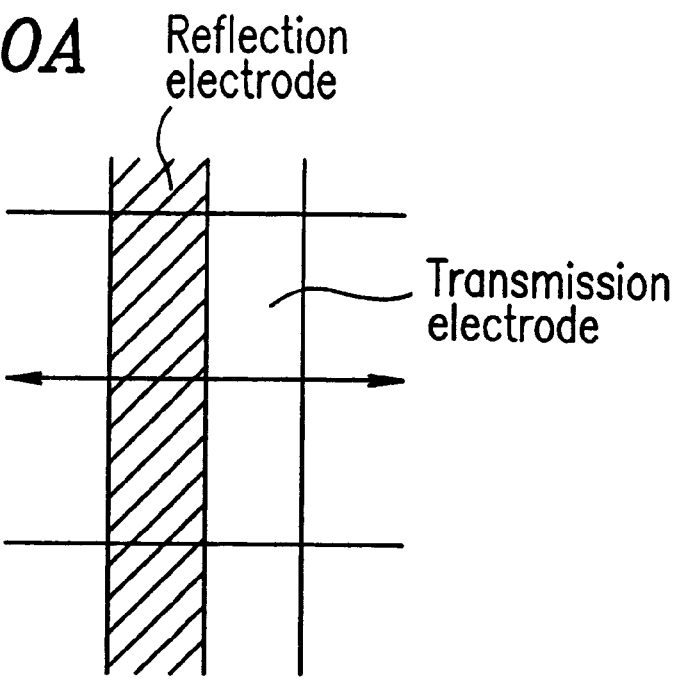
FIGS. 50A to 50C are views illustrating still another construction of Example 18.
Figure 50B:
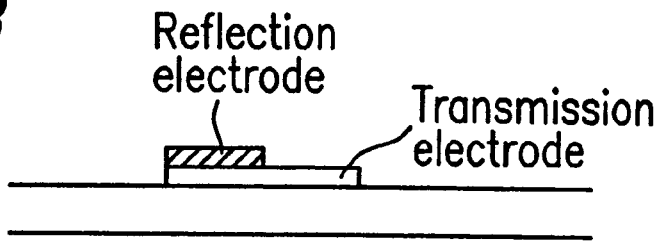
Figure 50C:
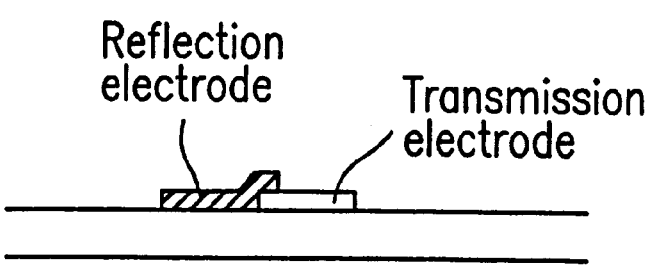
Figure 51A:
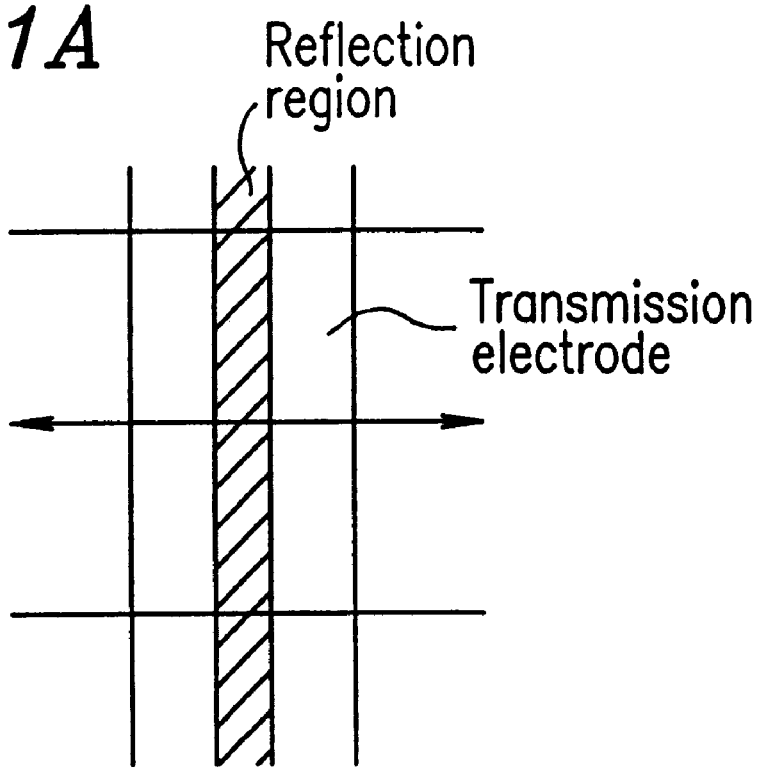
FIGS. 51A and 51B are views illustrating still another construction of Example 18.
Figure 51B:
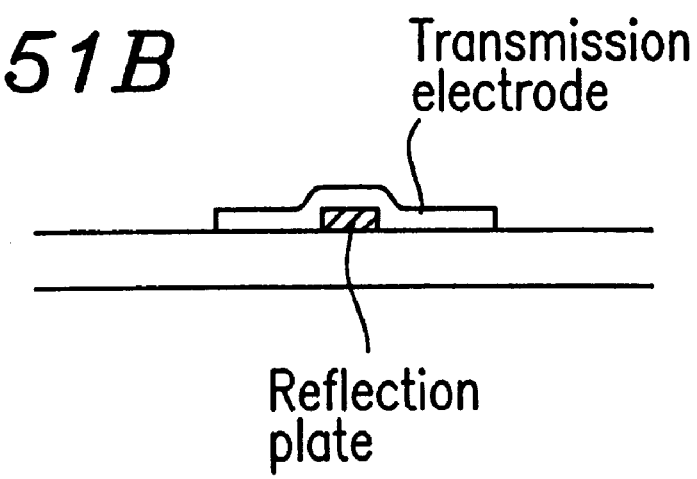
Figure 52:
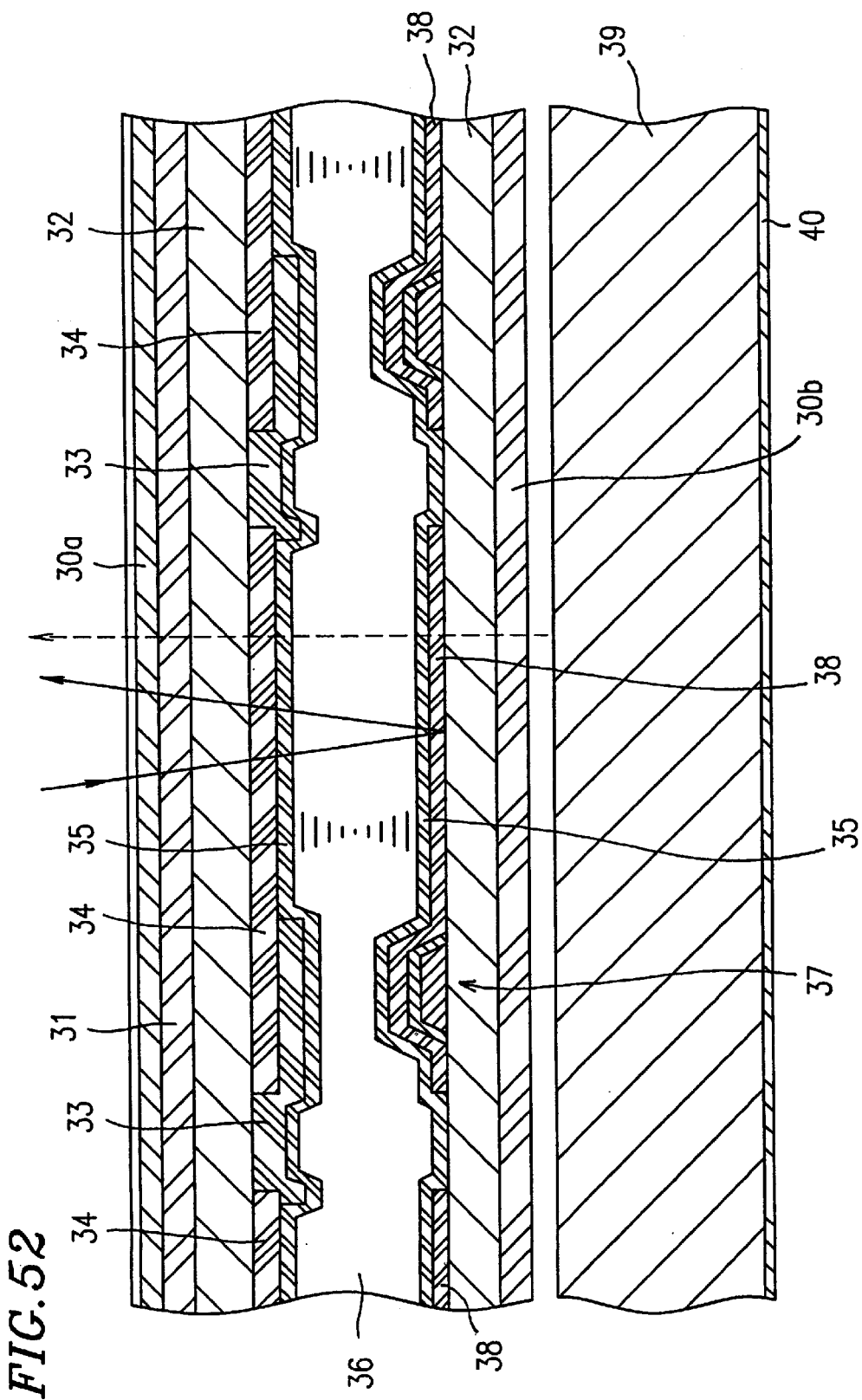
FIG. 52 is a sectional view of a conventional liquid crystal display device.

Alternatively, as shown in FIGS. 50A, 50B and 50C and FIGS. 51A and 51B, the column electrode may have a strip-shaped reflection electrode region. Such a strip-shaped reflection electrode region may be formed along one side of the column electrode as shown in FIGS. 50A to 50C, or along the center thereof as shown in FIG. 51A and 51B.

EXAMPLE 19

Figure 53:
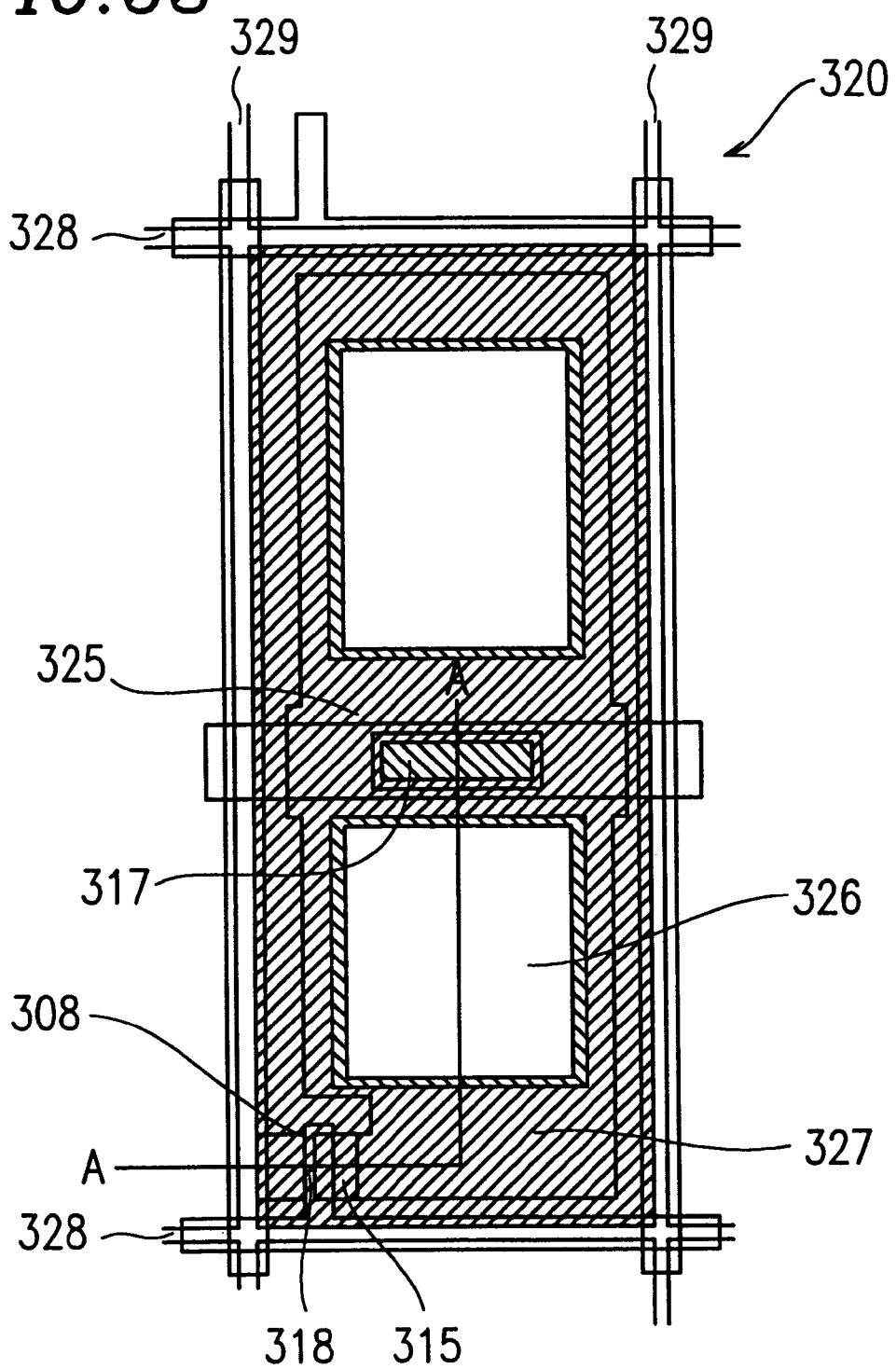
FIG. 53 is a plan view showing a structure of a pixel of a liquid crystal display device according to example 19.
Figure 54:
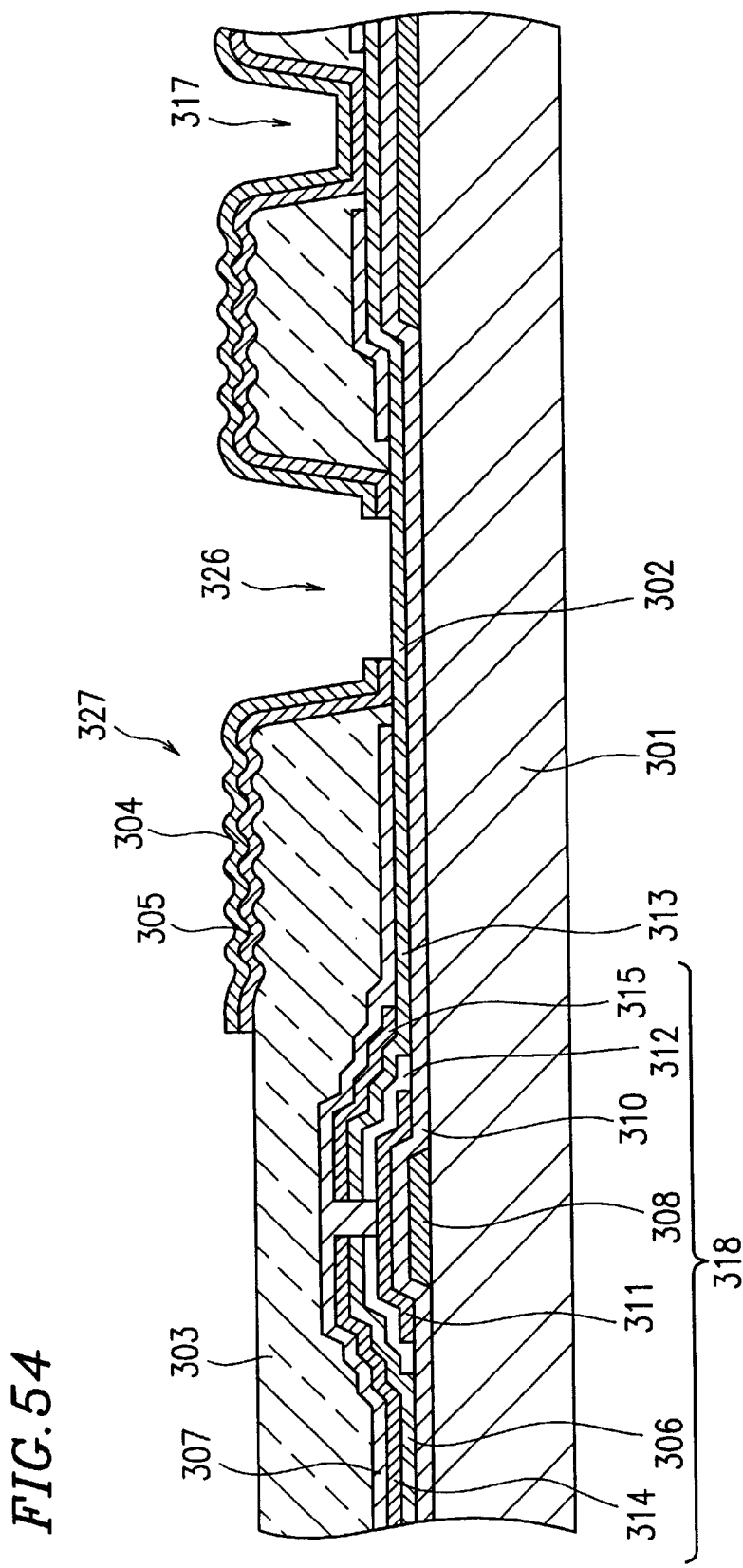
FIG. 54 is a cross-sectional view of the pixel taken along line A—A in FIG. 53.

FIG. 53 is a plan view showing a structure of a pixel formed on one of opposite substrates of a liquid crystal display device 320 according to example 19. FIG. 54 is a cross-sectional view of the pixel taken along line A—A in FIG. 53.

As shown in FIG. 53, in a liquid crystal display device 320 according to example 19, a pixel region 325 on one of the opposite substrates is enclosed by two gate lines 328 and two source signal lines 329, and includes a transmission region 326 and a reflection region 327. It is preferable that the gate line 328 and the source signal lines 329 cross with each other so that the gate line 328 and the source signal lines 329 form a two-level crossing section so as not to be electrically connected to each other. The gate line 328 is connected to a gate electrode of a thin film transistor 318, and the source signal lines 329 is connected to a source electrode of the thin film transistor 318. In a liquid crystal display device 320 according to example 19, a pixel region 325 further includes a contact hole 317 in the reflection region 327. In the contact hole 317, a reflection electrode consisting of layers 304 and 305 is electrically connected to a transmission electrode 302.

As shown in FIG. 54, the thin film transistor 318 is formed on an insulating substrate 301. One end 313 of a transmission electrode 302 and a layer 315 form a drain electrode 313 of the thin film transistor 318. An interlayer insulating film 303 entirely covers the thin film transistor 318. The reflection electrode (304 and 305) partially covers the interlayer insulating film 303. As shown in FIG. 54, the interlayer insulating film 303 and the reflection electrode (304 and 305) over a predetermined area of the transmission electrode 302 are removed, thereby forming the transmission region 326. In example 19, a region in which the reflection electrode (304 and 305) is formed is referred to as the reflection region 327. The transmission electrode 302 is electrically connected to the reflection electrode (304 and 305) at the interface area between the transmission region 326 and the reflection region 327. That is, in the liquid crystal display device 320 according to example 19, the transmission electrode 302 is electrically connected to the reflection electrode (304 and 305) in the contact hole 317 and in the interface area between the transmission region 326 and the reflection region 327. As a complete liquid crystal display device, an orientation film, a liquid crystal layer, a counter substrate, etc., are provided over the reflection electrode.

As shown and described, in a liquid crystal display device 320 according to example 19, an unavailable display region, which cannot be used as either a transmission display region or a reflection display region, is used for an electrical connection between the transmission electrode 302 and the reflection electrode (304 and 305).

Such a structure prevents an insufficient connection between the transmission electrode 302 and the reflection electrode (304 and 305), which often occurs in the contact hole of the liquid crystal display device, thereby improving the production yield of the liquid crystal display device.

An electrolytic corrosion may occur during a step of removing a photoresist used for patterning a laminated film (Al/Mo) for the purpose of forming the reflection electrode (304 and 305). In order to prevent the electrolytic corrosion, in a water washing process of example 19, alkalinization of a washing solution due to a mixture of water and MEA (monoethanolamine) in a water washing reservoir is prevented by, for example, providing a plurality of reservoirs before the water washing reservoir. The water washing process will be described in a later section.

FIGS. 55A to 55H are cross-sectional views showing a fabrication process of a transmission display section and a reflection display section of a pixel of the liquid crystal display device 320 according to example 19. Now, with reference to FIGS. 55A to 55H, the fabrication process of the transmission display section and the reflection display section of the pixel of the liquid crystal display device 320 according to example 19 is described.

Figure 55A:
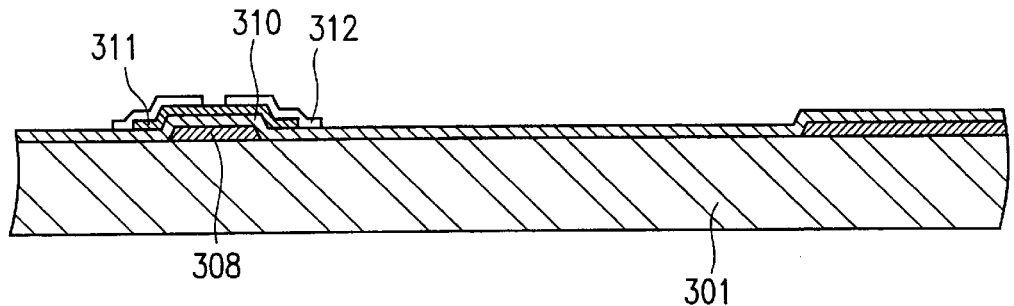
FIGS. 55A to 55H are cross-sectional views showing a fabrication process of a transmission display section and a reflection display section of a pixel of the liquid crystal display device according to example 19.

Referring to FIG. 55A, an insulating film (not shown) such as $Ta_2O_5$, $SiO_2$, etc, is formed on the insulating substrate 301. Thereafter, a metal thin film containing Al, Mo, Ta, etc., is formed on the insulating film by sputtering and is patterned, thereby forming a gate electrode 308.

Next, a gate insulating film 310 is formed on the insulating substrate 301 so as to cover the gate electrode 308. In example 19, a $SiN_x$, film is formed as the gate insulating film 310 by the P-CVD method so as to have a thickness of 3000 Å. In order to improve the insulation performance, it is suggested that the gate electrode 308 be anodized to form an anodization film thereon, the anodization film be used as a first gate insulating film 309 (not shown), and the insulating film made of SiN, etc. , be formed on the first gate insulating film 309 by the CVD method and used as a second insulating film 310.

Next, a channel layer 311 (amorphous Si) and a electrode contact layer 312 (amorphous Si or microcrystalline Si, doped with impurities such as phosphorus) are formed on the gate insulating film 310 in succession by the CVD method so as to have thickness of 1500 Å and 500 Å, respectively. The channel layer 311 and the electrode contact layer 312 are patterned as shown in FIG. 55A by dry etching with $HCl+SF_6$ mixture gas.

Figure 55B:
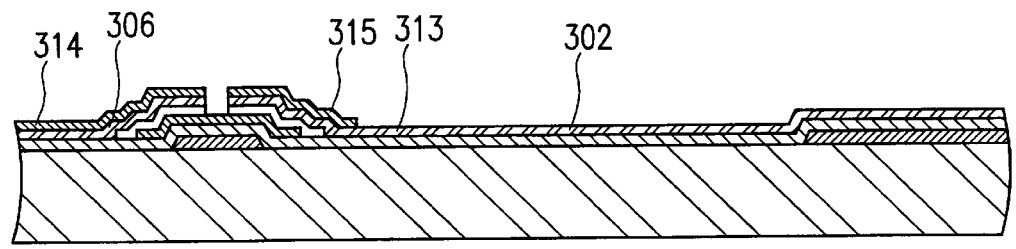

Thereafter, referring to FIG. 55B, a transparent conducting film (ITO) is formed by sputtering so as to have a thickness of 1500 Å as an electrode material for a transmission electrode 302 constituting the transmission display section. Then, a metal thin film containing Al, Mo, Ta, etc., is formed on the transparent conducting film. Thereafter, the transparent conducting film and the metal thin film are patterned to form a source electrode consisting of layers 306 and 314 and a drain electrode consisting of layers 313 and 315. Thus, the transmission electrode 302 constituting the transmission display region is electrically connected to the drain electrode of the thin film transistor 318 because a portion 313 of the drain electrode of the thin film transistor 318 and the transmission electrode 302 are made from the identical film.

Figure 55C:
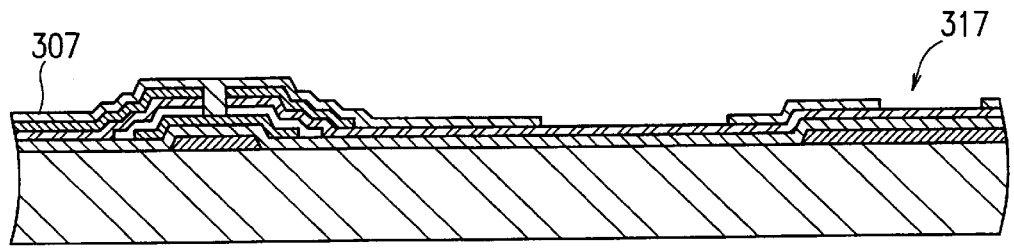

Next, referring to FIG. 55C, an insulating film made of SiN, etc., is formed on the structure shown in FIG. 55B by the CVD method so as to have a thickness of 3000 Å, portions of the insulating film corresponding to a transmission display region, a region in which a contact hole 317 is to be formed, and an interface area between the transmission display region and the reflection display region, are removed, and the remaining insulating film is patterned to form an interlayer film 307 as shown in FIG. 55C. In example 19, the insulating film 307 is removed not only in the transmission display region but also in the entire interface area between the transmission display region and the reflection display region. However, it is not necessarily required to entirely remove the insulating film in the interface area between the transmission display region and the reflection display region as long as the transmission electrode 302 is electrically connected to the reflection electrode (304 and 305).

Figure 55D:
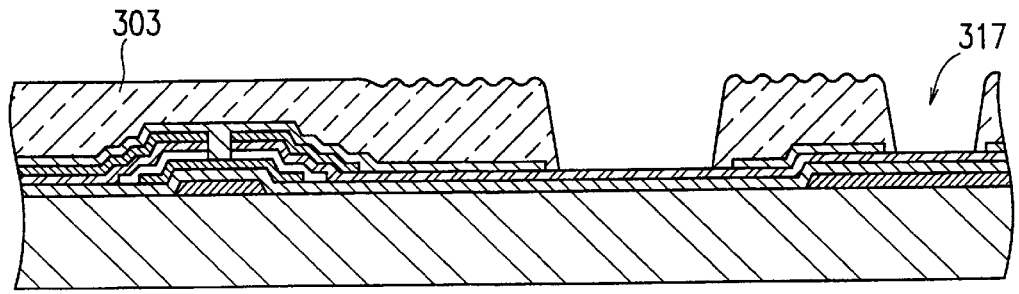

Next, referring to FIG. 55D, a photosensitive resin 303 to be used as an interlayer insulating film is applied to the structure shown in FIG. 55C so as to have a thickness of about 4 μm. The photosensitive resin 303 is exposed to light, developed, and subjected to a thermal treatment, so that the surface of the photosensitive resin 303 has smooth concave and convex portions 318 (not shown). Then, the photosensitive resin 303 over the transmission display region and in the region in which the contact hole 317 is to be formed is removed.

Figure 55E:
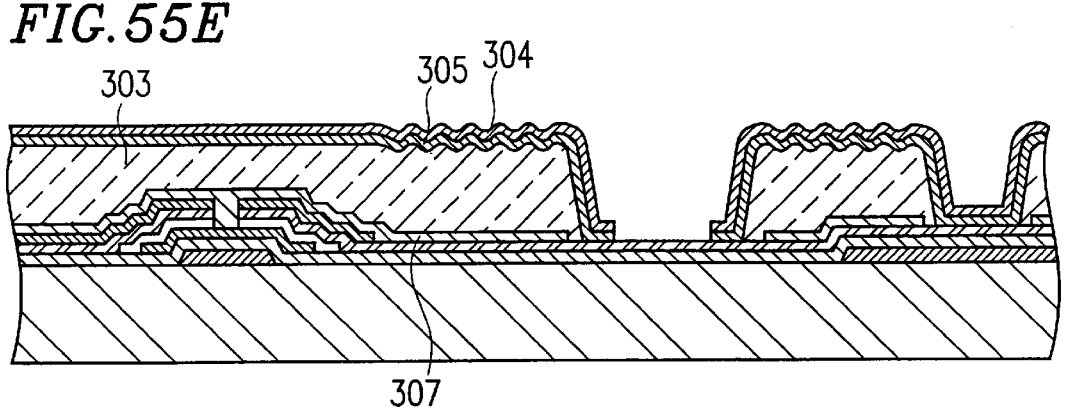

Next, referring to FIG. 55E, an Al film 304 and a Mo film 305, which are to function as the reflection electrode (304 and 305) constituting the reflection display region, are formed on the structure shown in FIG. 55D by sputtering so as to have a thickness of 1000 Å and 500 Å, respectively.

Figure 55F:
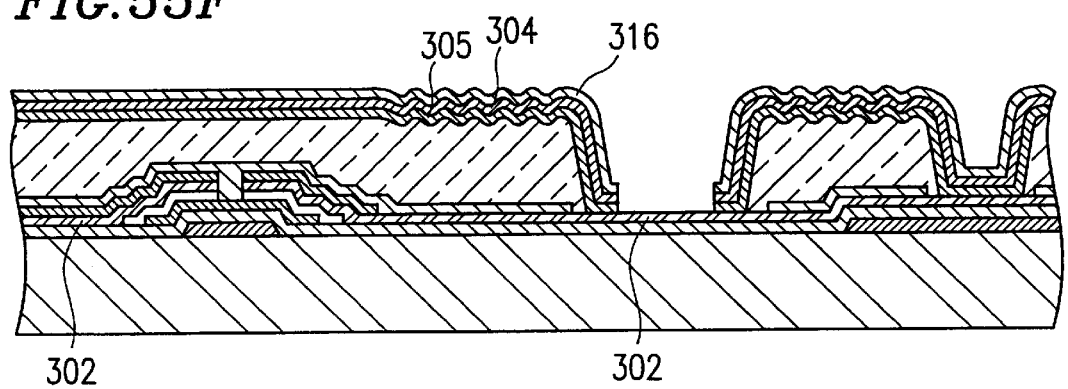

Then, referring to FIG. 55F, a photoresist layer 316 is formed on the structure shown in FIG. 55E, and patterned into a predetermined shape. Since the Mo film 305 is interposed between the Al film 304 and the ITO film 302, even if an electrolytic solution permeates through a defective part of the Al film 304 when the photoresist layer 316 is developed, the Mo film 305, functioning as a barrier metal, blocks the permeating electrolytic solution, thereby preventing an electrolytic corrosion.

Figure 55G:
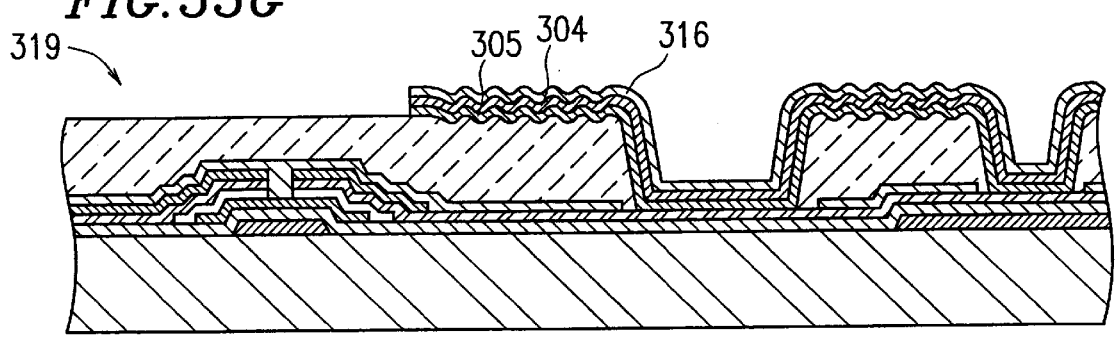
Figure 55H:
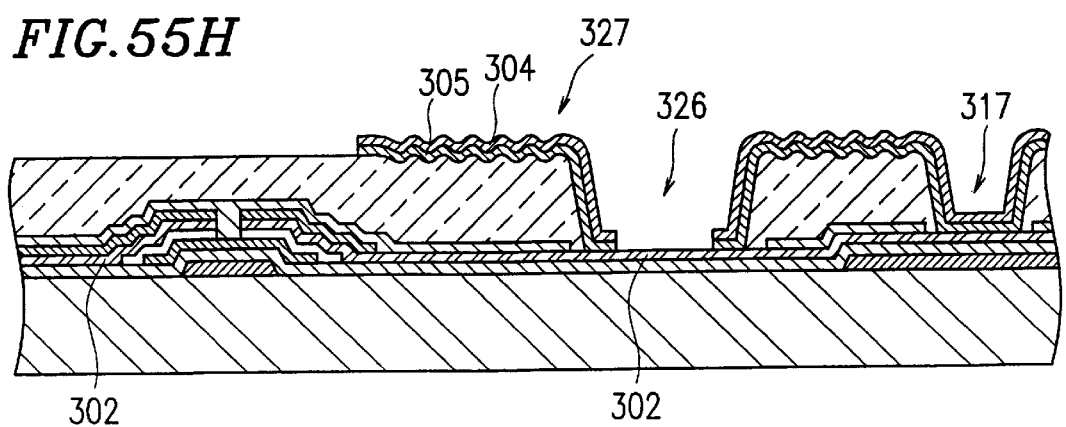

Thereafter, the Al film 304 and the Mo film 305 are simultaneously etched with an etchant containing nitric acid, acetic acid, and phosphoric acid, and water, thereby forming the reflection electrode (304 and 305) as shown in FIG. 55G.

Finally, the photoresist layer 316 shown in FIG. 55G is removed by a batch type removing apparatus, thereby completing a pixel region of the liquid crystal display device 320 according to example 19. In example 19, an exposed portion of the transmission region 302 corresponds to the transmission region 326, and a region in which the reflection electrode (304 and 305) is formed corresponds to the reflection region 327.

Now, a method for removing the photoresist layer 316 is described.

The resultant structure 319 (FIG. 55G), fabricated through the above described process, is dipped into a removing solution containing 60 wt % of MEA as amine. Then, the structure 319 is washed in a water washing reservoir in order to wash away the removing solution from the surface of the structure 319.

According to the conventional method, after the structure 319 is dipped into the removing solution containing MEA, the photoresist layer 316 of the structure 319 has been removed in a removing reservoir (DMSO reservoir) containing a removing solution mainly composed of dimethylsulfoxide, and the structure 319 is washed in a water washing reservoir. If this removing process is repeated without exchanging the solutions in the removing reservoir and the water washing reservoir, the MEA concentration in the removing reservoir increases. As a result, the MEA solution of high concentration is carried into the water washing reservoir, whereby the alkalinity of the washing solution in the water washing reservoir increases. This alkalinized washing solution causes an electrolytic corrosion in a contact portion between the transmission electrode 302 and the Mo film 305 of the reflection electrode in the interface area between the transmission display region and the reflection display region.

Figure 56:
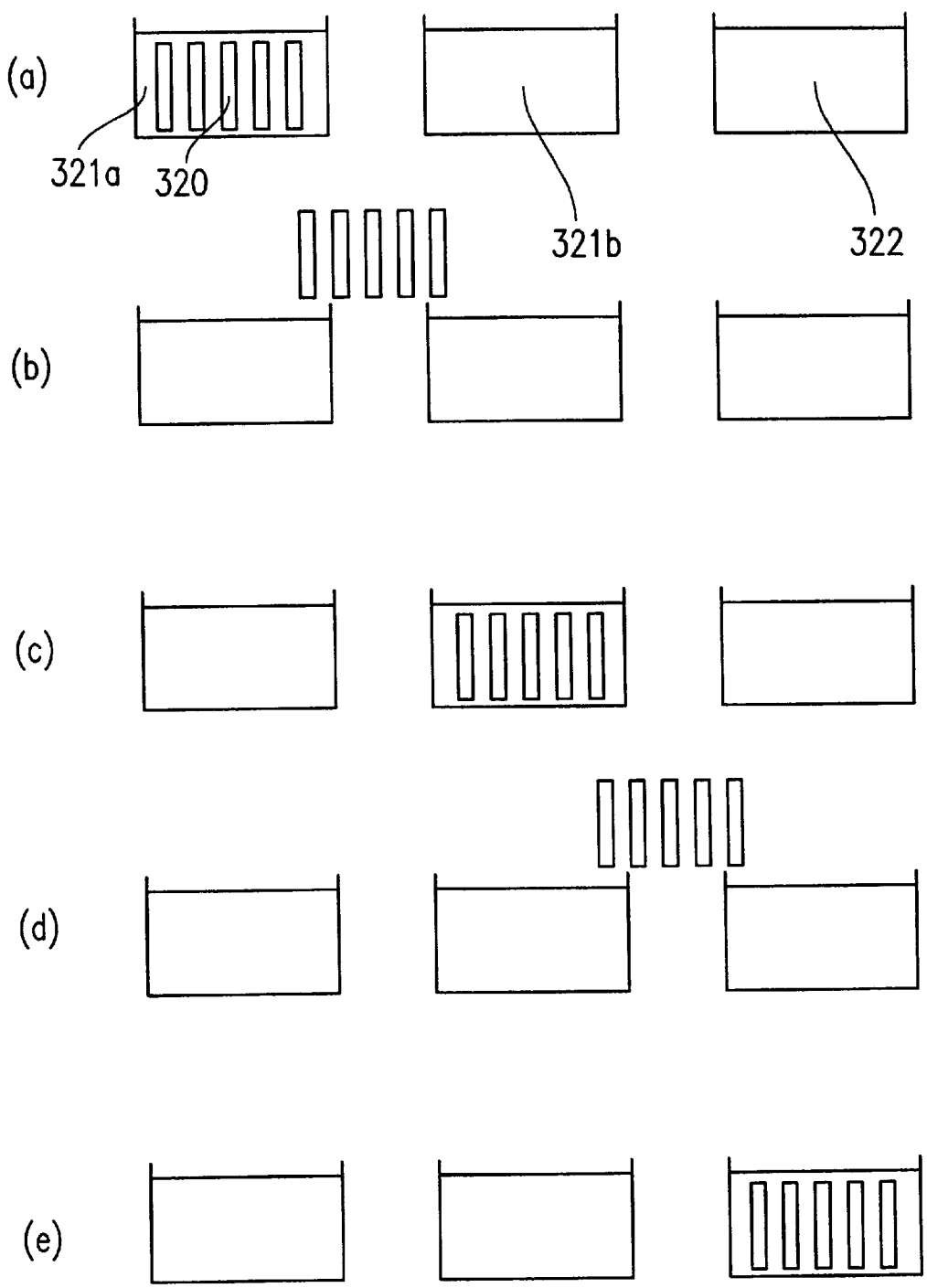
FIG. 56 schematically show removing steps using the batch type removing apparatus of example 19.

Parts (a) to (e) of FIG. 56 schematically show removing steps using the batch type removing apparatus of example 19. According to example 19, after the structure 319 is dipped into the removing solution containing MEA, the structure 319 is dipped into a first removing reservoir 321a to remove the photoresist layer 316, and dipped into a second removing reservoir 321b in succession. Thereafter, the structure 319 is washed in the water washing reservoir 322. This arrangement using two removing reservoirs prevents the MEA being carried into the water washing reservoir 322, whereby alkalinization of the washing solution is suppressed. As a result, occurrence of an electrolytic corrosion in a contact portion between the transmission electrode 302 and the Mo film 305 of the reflection electrode is prevented.

Thereafter, a TFT substrate having the thus-fabricated pixel portion and a transparent counter substrate (not shown) having a transparent electrode formed thereon each are provided with an orientation film, and baked. Then, the orientation films are subjected to a rubbing treatment, and spacers are applied to the rubbed orientation films. After the application of the spacers, the substrates are combined with a sealing resin, and a liquid crystal material is injected into a space between the substrates by the vacuum injection method, thereby obtaining a liquid crystal display device. In the last step, a polarization plate and a phase plate are provided to each of the substrates, and a backlight is provided on the back surface of the liquid crystal display device, thereby completing the liquid crystal display device of example 19.

EXAMPLE 20

Figure 57:
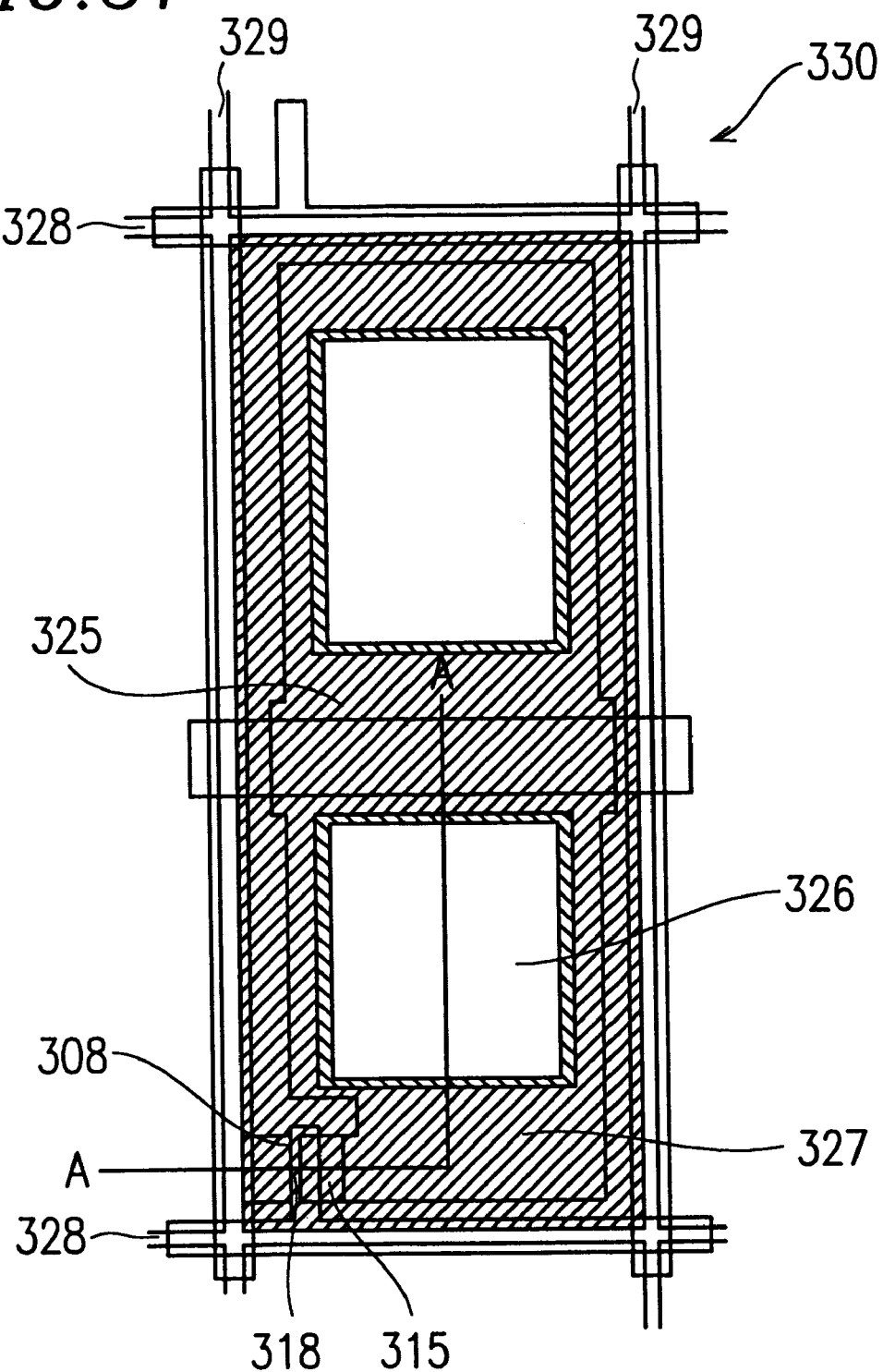
FIG. 57 is a plan view showing a structure of a pixel of a liquid crystal display device 330 according to example 20.
Figure 58:
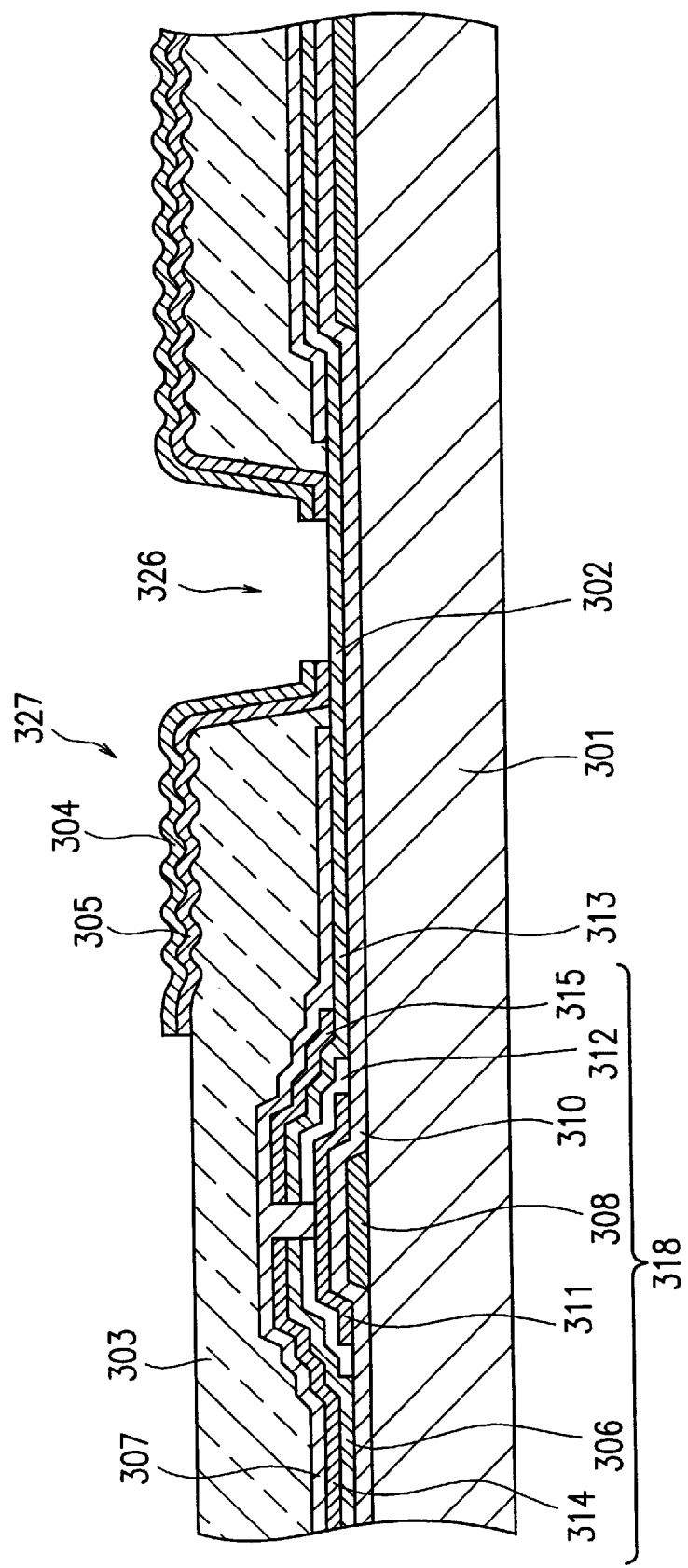
FIG. 58 is a cross-sectional view of the pixel taken along line A—A in FIG. 57.

FIG. 57 is a plan view showing a structure of a pixel formed on one of opposite substrates of a liquid crystal display device 330 according to example 20. FIG. 58 is a cross-sectional view of the pixel taken along line A—A in FIG. 57. In example 20, like reference numerals used in example 19 refer to like elements.

As shown in FIG. 57, in a liquid crystal display device 330 according to example 20, a pixel region 325 on one of the opposite substrates is enclosed by two gate lines 328 and two source signal lines 329, and includes a transmission region 326 and a reflection region 327. It is preferable that the gate line 328 and the source signal lines 329 cross with each other so that the gate line 328 and the source signal lines 329 form a two-level crossing section so as not to be electrically connected to each other. The gate line 328 is connected to a gate electrode of a thin film transistor 318, and the source signal lines 329 is connected to a source electrode of the thin film transistor 318. The pixel region 325 of the liquid crystal display device 330 according to example 20 is the same as that of the liquid crystal display device 320 according to example 19 except that the pixel region 325 does not include a contact hole.

As shown in FIG. 58, the thin film transistor 318 is formed on an insulating substrate 301. One end 313 of a transmission electrode 302 and a layer 315 form a drain electrode of the thin film transistor 318. An interlayer insulating film 303 entirely covers the thin film transistor 318. The reflection electrode (304 and 305) partially covers the interlayer insulating film 303. As shown in FIG. 58, the interlayer insulating film 303 and the reflection electrode (304 and 305) over a predetermined area of the transmission electrode 302 are removed, thereby forming the transmission region 326. In example 20, a region in which the reflection electrode (304 and 305) is formed is referred to as the reflection region 327. The transmission electrode 302 is electrically connected to the reflection electrode (304 and 305) at the interface area between the transmission region 326 and the reflection region 327.

As shown and described, in the liquid crystal display device 330 according to example 20, an unavailable display region, which cannot be used as either a transmission display region or a reflection display region, is used for an electrical connection between the transmission electrode 302 and the reflection electrode (304 and 305).

Such a structure prevents an insufficient connection between the transmission electrode 302 and the reflection electrode (304 and 305), which may occur in the contact hole, thereby improving the production yield of the liquid crystal display device.

The liquid crystal display device 330 according to example 20 does not include a contact hole, the transmission electrode 302 and the reflection electrode (304 and 305) are electrically connected only in the interface area between the transmission region 326 and the reflection region 327.

FIGS. 59A to 59H are cross-sectional views showing a fabrication process of a transmission display section and a reflection display section of a pixel of the liquid crystal display device 330 according to example 20. Now, with reference to FIGS. 59A to 59H, the fabrication process of the transmission display section and the reflection display section of the pixel of the liquid crystal display device 330 according to example 20 is described.

Figure 59A:
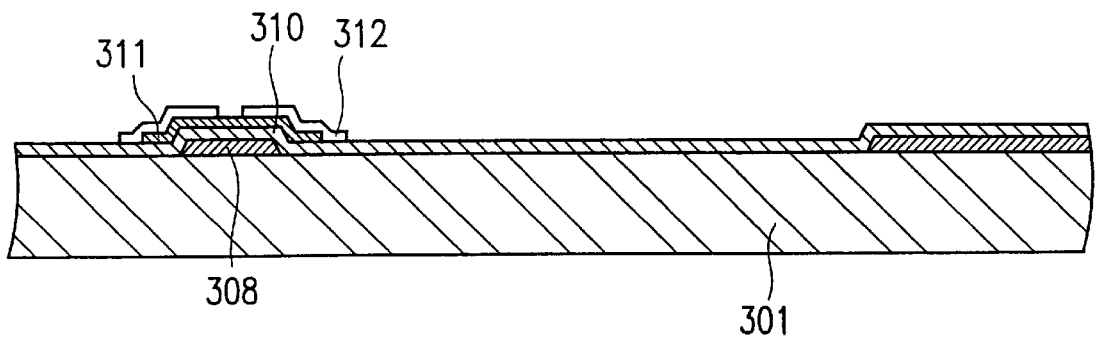
FIGS. 59A to 59H are cross-sectional views showing a fabrication process of a transmission display section and a reflection display section of a pixel of the liquid crystal display device 330 according to example 20.

Referring to FIG. 59A, an insulating film (not shown) such as $Ta_2O_5$, $SiO_2$, etc, is formed on the insulating substrate 301. Thereafter, a metal thin film containing Al, Mo, Ta, etc., is formed on the insulating substrate 301 by sputtering and is patterned, thereby forming a gate electrode 308.

Next, a gate insulating film 310 is formed on the substrate 301 so as to cover the gate electrode 308. In example 20, a $SiN_x$, film is formed as the gate insulating film 310 by the P-CVD method so as to have a thickness of 3000 Å. In order to improve the insulation performance, it is suggested that the gate electrode 308 be anodized to form an anodization film thereon, the anodization film be used as a first gate insulating film 309 (not shown), and the insulating film made of SiN, etc., be formed on the first gate insulating film 309 by the CVD method and used as a second insulating film 310.

Next, a channel layer 311 (amorphous Si) and a electrode contact layer 312 (amorphous Si or microcrystalline Si doped with impurities such as phosphorus) are formed on the gate insulating film 310 in succession by the CVD method so as to have thickness of 1500 Å and 500 Å, respectively. The channel layer 311 and the electrode contact layer 312 are patterned by dry etching with $HCl+SF_6$ mixture gas as shown in FIG. 59A.

Figure 59B:
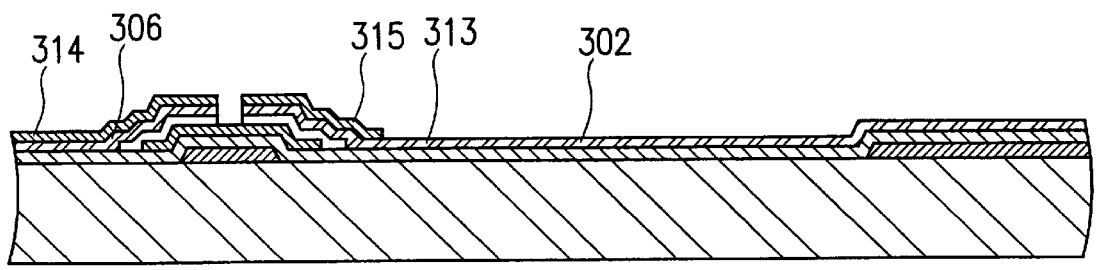

Thereafter, referring to FIG. 59B, a transparent conducting film (ITO) is formed by sputtering so as to have a thickness of 1500 Å as an electrode material for a transmission electrode 302 constituting the transmission display section. Then, a metal thin film containing Al, Mo, Ta, etc., is formed on the transparent conducting film. Thereafter, the transparent conducting film and the metal thin film are patterned to form a source electrode consisting of layers 306 and 314 and a drain electrode consisting of layers 313 and 315. Thus, the transmission electrode 302 constituting the transmission display region is electrically connected to the drain electrode of the thin film transistor 318 because a portion 313 of the drain electrode of the thin film transistor 318 and the transmission electrode 302 are made from the identical film.

Figure 59C:
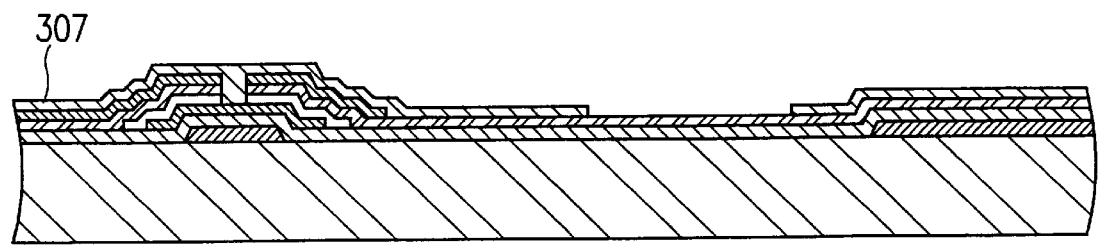

Next, referring to FIG. 59C, an insulating film made of SiN, etc., is formed on the structure shown in FIG. 59B by the CVD method so as to have a thickness of 3000 Å, portions of the insulating film corresponding to a transmission display region and an interface area between the transmission display region and the reflection display region, are removed, and the remaining interlayer film 307 is patterned to form an interlayer film 307 as shown in FIG. 59C. In example 20, the insulating film is removed not only in the transmission display region but also in the entire interface area between the transmission display region and the reflection display region. However, it is not necessarily required to entirely remove the interlayer film in the interface area between the transmission display region and the reflection display region as long as the transmission electrode 302 is electrically connected to the reflection electrode (304 and 305).

Figure 59D:
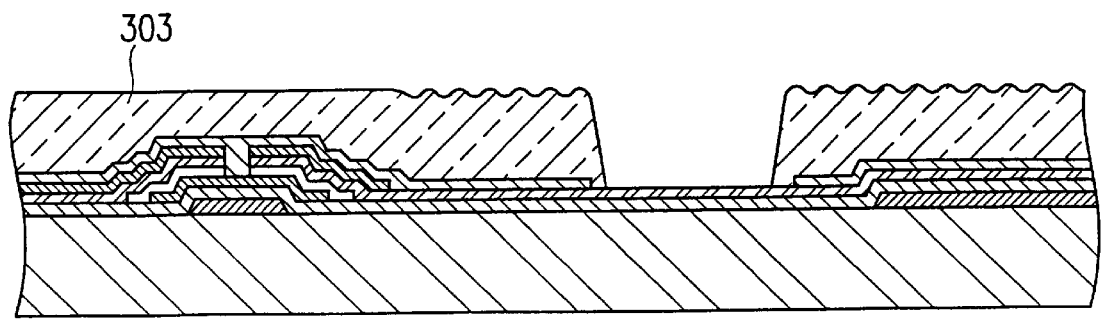

Next, referring to FIG. 59D, a photosensitive resin 303 to be used as an interlayer insulating film is applied to the structure shown in FIG. 59C so as to have a thickness of about 4 μm. The photosensitive resin 303 is exposed to light, developed, and subjected to a thermal treatment, so that the surface of the photosensitive resin 303 has smooth concave and convex portions 318 (not shown). Then, the photosensitive resin 303 over the transmission display region is removed.

Figure 59E:
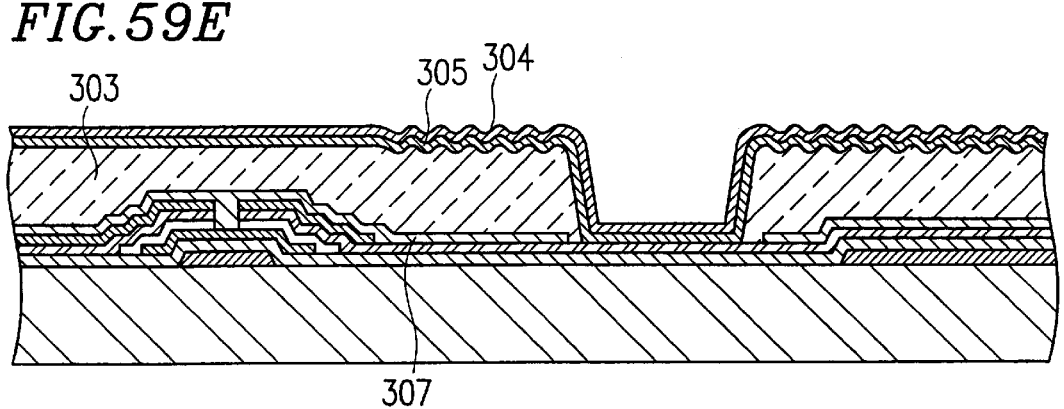

Next, referring to FIG. 59E, an Al film 304 and a Mo film 305, which are to function as the reflection electrode (304 and 305) constituting the reflection display region, are formed on the structure shown in FIG. 59D by sputtering so as to have a thickness of 1000 Å and 500 Å, respectively.

Figure 59F:
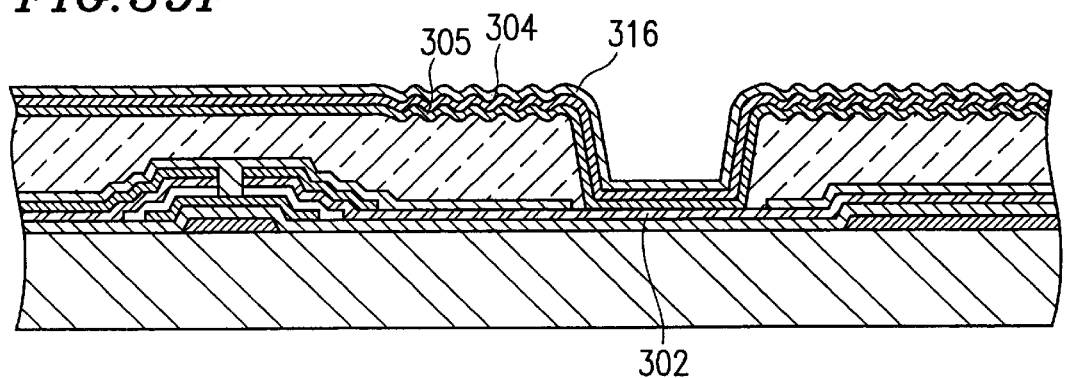

Then, referring to FIG. 59F, a photoresist layer 316 is formed on the structure shown in FIG. 59E, and is patterned into a predetermined shape. Since the Mo film 305 is interposed between the Al film 304 and the ITO film 302, even if a electrolytic solution permeates through a defective part of the Al film 304 when the photoresist layer 316 is developed, the Mo film 305 functioning as a barrier metal blocks the permeating electrolytic solution, thereby preventing an electrolytic corrosion.

Figure 59G:
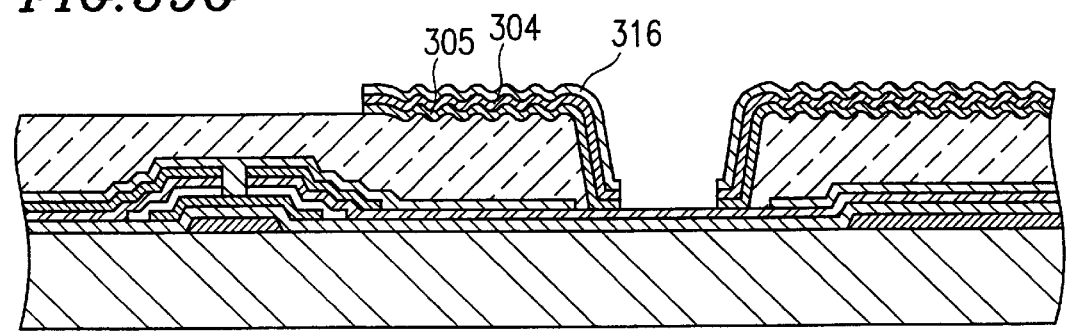
Figure 59H:
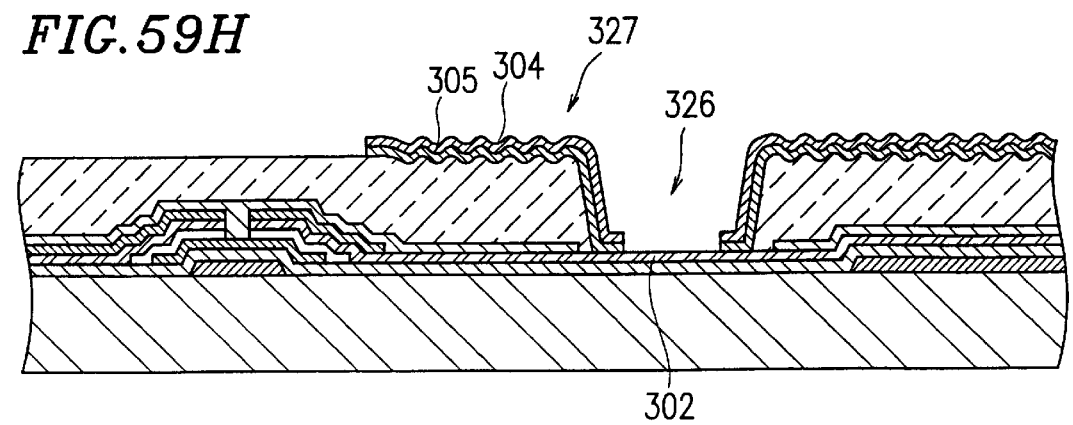

Thereafter, the Al film 304 and the Mo film 305 are simultaneously etched with an etchant containing nitric acid, acetic acid, and phosphoric acid, and water, thereby forming the reflection electrode (304 and 305) as shown in FIG. 59G.

Finally, the photoresist layer 316 shown in FIG. 59G is removed by a batch type removing apparatus as described in example 19 with reference to FIG. 56, thereby completing a pixel region of the liquid crystal display device 330 according to example 20.

Thereafter, a TFT substrate having the thus-fabricated pixel portion and a transparent substrate (not shown) having a transparent electrode formed thereon each are provided with an orientation film, and baked. Then, the orientation films are subjected to the rubbing treatment, and spacers are applied to the rubbed orientation films. After the application of the spacers, the substrates are combined with a sealing resin, and a liquid crystal material is injected into a space between the substrates by the vacuum injection method, thereby obtaining a liquid crystal display device. In the last step, a polarization plate and a phase plate are provided to each of the substrates, and a backlight is provided on the back surface of the liquid crystal display device, thereby completing the liquid crystal display device 330 of example 20.

According to example 20, the liquid crystal display device 330 does not have a contact hole formed in the interlayer insulating film 303. Therefore, it is possible to form concave and convex portions in a region that would have been used for a contact hole over the interlayer insulating film 303 in the liquid crystal display device. That is, according to example 20, a region which would be used for the contact hole in the liquid crystal display device or in the device of example 19, which cannot be used for the transmission display region or the reflection display region in the liquid crystal display device having a contact hole, can be used for the reflection display region of the liquid crystal display device 330. Thus, a larger effective display pixel region can be obtained in the liquid crystal display device 330 than in a device having a contact hole.

EXAMPLE 21

Hereinafter, example 21 of the present invention will be described with reference to FIGS. 60 and 61.

Figure 60:
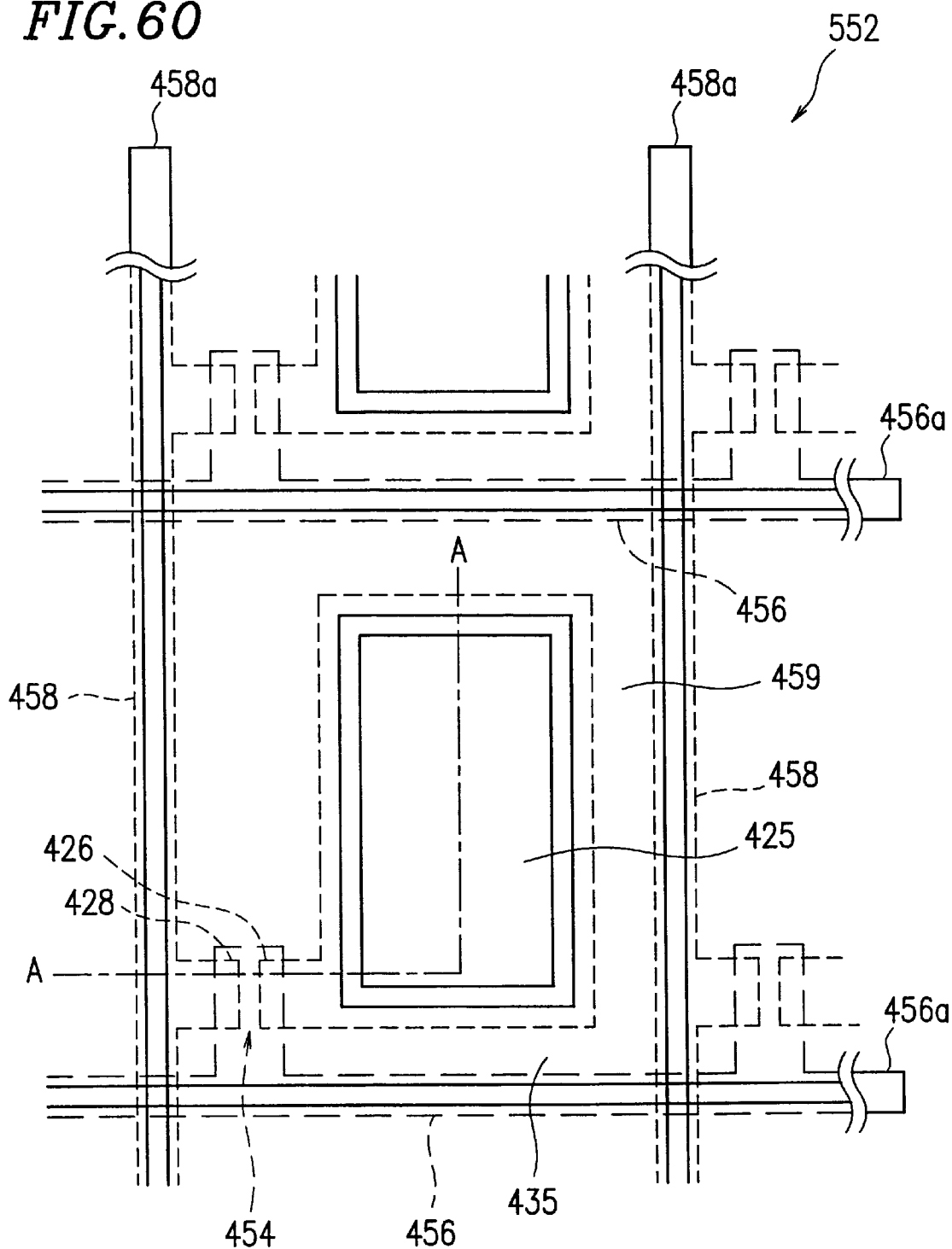
FIG. 60 is a plan view showing a structure of a TFT array substrate 552 used for a liquid crystal display device according to example 21.

FIG. 60 is a plan view showing a structure of a TFT array substrate 552 (active matrix substrate) used for a liquid crystal display device according to example 21. In the TFT array substrate 552, a plurality of gate signal lines 456 and a plurality of source signal lines 458 are formed in parallel, respectively. The gate signal lines 456 and the source signal lines 458 cross at the right angle so as to form two-level crossing sections. Each of the gate signal lines 456 has a gate signal input portion (control signal input portion) 456a, and each of the source signal lines 458 has a source signal input portion (data signal input portion) 458a. The gate signal input portion 456a and the source signal input portion 458a are connected to a liquid crystal driving circuit (not shown) for providing a gate signal (control signal) and a source signal (data signal).

An area enclosed by two adjacent gate signal lines 456 and two adjacent source signal lines 458 form a pixel region 459. A transmission electrode 424, a reflection electrode 434, and a thin film transistor 454 (hereinafter, referred to as a TFT 454) are formed on the TFT array substrate 552. Each pixel region 459 includes a transmission region 425 and a reflection region 435.

Figure 61:
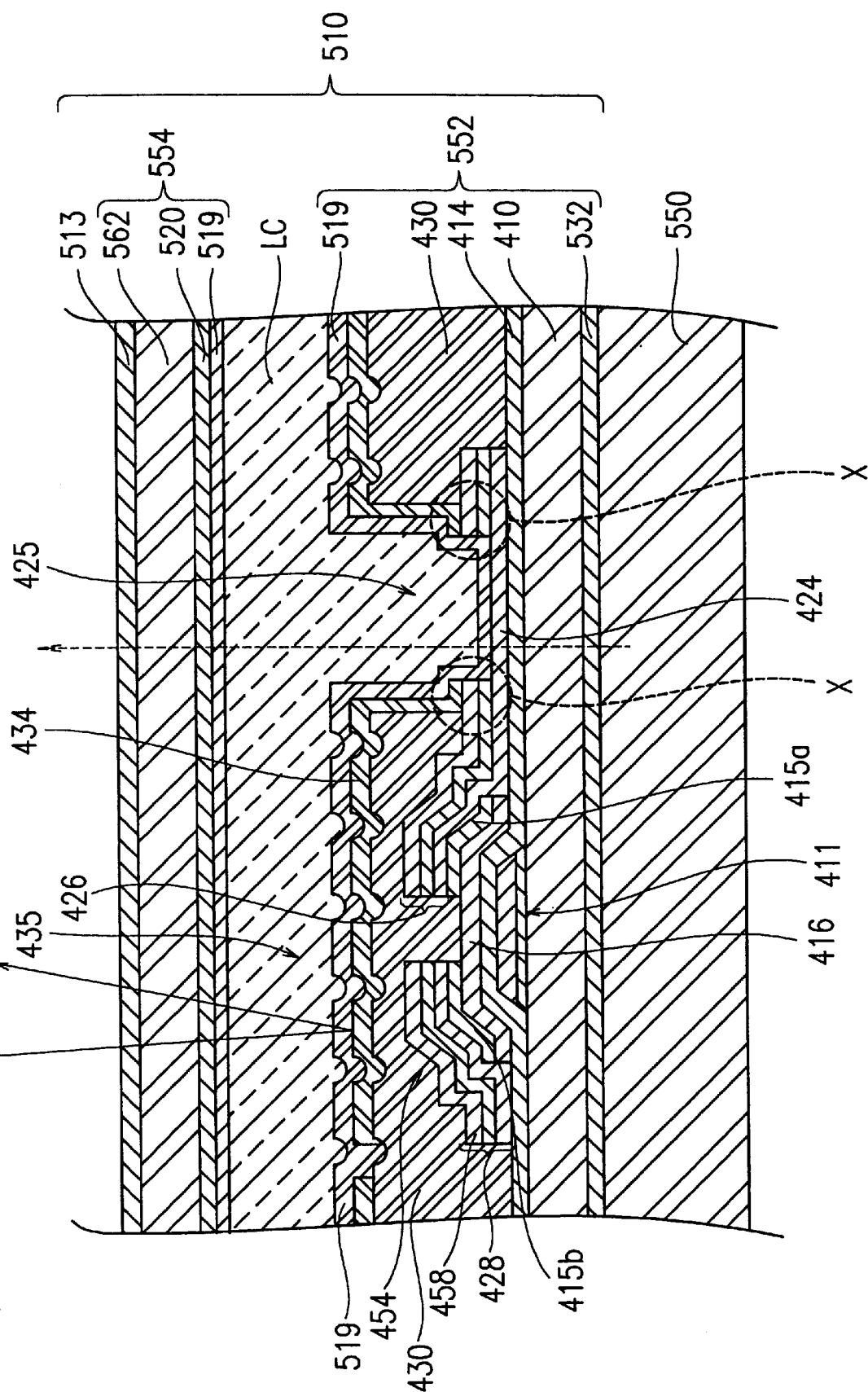
FIG. 61 is a cross-sectional view of a liquid crystal cell 510 taken along line A—A in FIG. 60.

FIG. 61 is a cross-sectional view of a liquid crystal cell 510 formed using the TFT array substrate 552 taken along line A—A in FIG. 60. The liquid crystal cell 510 includes the TFT array substrate 552, a counter substrate 554, a liquid crystal material LC, and polarization plates 513 and 532. The polarization plate 532 and a light source 550 are provided on the back face of the TFT array substrate 552. The counter substrate 554 having a counter electrode 520 and a transmissive substrate 562 is provided on the front side of the TFT array substrate 552 (upper side of FIG. 61). The polarization plate 513 is provided on the screen side of the counter substrate 554 (upper side of FIG. 61). Surfaces of the TFT array substrate 552 and the counter substrate 554 are covered with orientation films 519. The liquid crystal material LC is interposed between the TFT array substrate 552 and the counter substrate 554.

In the TFT array substrate 552, at the crossing section of the gate signal lines 456 and the source signal lines 458, a insulating film 414 is interposed between the gate signal lines 456 and the source signal lines 458. A gate electrode 411 of the TFT 454, which is formed by an extended portion of the gate signal line 456 (FIG. 60), is made of a dual layer metallic film as shown in FIG. 61.

The insulating film 414 is formed on the gate electrode 411, and a semiconductor region 416 of the TFT 454 is formed on the insulating film 414. On the semiconductor region 416, contact layers 415a and 415b are formed with a predetermined space therebetween. A source electrode 428 and a drain electrode 426 each consisting of three layers are formed on the contact layers 415a and 415b, respectively. The source electrode 428 includes an extended portion of the source signal line 458 (FIG. 60). The drain electrode 426 includes a portion of the transmission electrode 424 extended over the semiconductor region 416. The contact layers 415a and 415b are formed for the purpose of making an ohmic contact between the semiconductor region 416 and a metal constituting the drain electrode 426 and the source electrode 428.

The TFT 454, the gate signal line 456, and the source signal line 458 are covered with an interlayer insulating film 430. The reflection electrode 434 is formed so as to cover the interlayer insulating film 430 except for a disconnection region between the adjoining pixels. Furthermore, the reflection electrode 434 is connected to the transmission electrode 424 through the drain electrode 426 at lower corners of ends of the interlayer insulating film 430 (portions X encircled by dotted circles as shown in FIG. 61), i.e., in interface areas of the transmission region 425 and the reflection region 435.

Adjoining reflection electrodes 434 are formed with a predetermined space therebetween such that they are disconnected. This disconnected region between the adjoining reflection electrodes 434 is formed in an area above the region in which the gate signal line 456 or the source signal line 458 has been formed. That is, the reflection electrode 434 is formed so as to overlap a portion of the gate signal line 456 or the source signal line 458 through the interlayer insulating film 430 interposed therebetween.

Now, materials used for the respective elements are described. The gate electrode 411 and the gate signal line 456 are made of a titanium layer and a layer of aluminum or an aluminum alloy superposed thereon. The insulating film 414 is made of silicon nitride. The source signal line 458, the source electrode 428, and the drain electrode 426 are made of ITO (Indium Tin Oxide), molybdenum, and aluminum or an aluminum alloy superposed in this order. The transmission electrode 424 is made of ITO, and the reflection electrode 434 is made of aluminum or an aluminum alloy. The interlayer insulating film 430 is made of silicon nitride, organic resin, or the like.

Next, operation of the liquid crystal display device of example 21 is described with reference to FIG. 61.

When the above-described liquid crystal display device is used in an environment in which ambient light is insufficient for displaying images, the liquid crystal display device operates in a transmission display mode. In this case, light from a light source 550 (shown by a broken line arrow of FIG. 61) is utilized. Light output from the light source 550 is converted into linearly polarized light by the polarization plate 532. The linearly polarized light passes through the transmissive substrate 410, the insulating film 414, and the transmission electrode 424, thereby reaching the liquid crystal layer LC.

The TFT 454 is turned ON/OFF based on a gate signal supplied by the gate signal line 456, thereby controlling the supply of the source signal from the source signal line 458 to the transmission electrode 424. When the source signal is input to the transmission electrode 424, a voltage is applied to an area between the transmission electrode 424 and the counter electrode 520.

The polarization direction of the light introduced into the liquid crystal layer LC is rotated by the effect of liquid crystal in accordance with the applied voltage. The light transmitted through the liquid crystal layer LC passes through the counter substrate 554, and reaches the polarization plate 513. The quantity of light that passes through the polarization plate 513 varies in accordance with the angle of rotation of the polarization direction caused by the liquid crystal. This changes the intensity of light within an entire pixel region of a pixel when an image is displayed.

In this case, in portions other than the transmission electrode 424, light from the light source 550 is prevented from reaching the liquid crystal layer LC by the reflection electrode 434, the gate signal line 456, or the source signal line 458. Thus, even in a region in which no transmission electrode 424 and no reflection electrode 434 are formed and to which no voltage thus can be applied, it is unnecessary to form a black mask. Alternatively, the interlayer insulating film 430 is made of an organic resin containing a light-shielding material such as a graphite powder so that the interlayer insulating film 430 can block the passage of light, whereby a similar light-shielding function can be realized.

On the other hand, in an environment with sufficient ambient light for displaying images, the liquid crystal display device operates in a reflection display mode. In this case, ambient light coming into the liquid crystal layer LC (shown by a solid line arrow of FIG. 61) is utilized. Ambient light is converted into linearly polarized light by the polarization plate 513, transmitted through counter substrate 554, and reaches the liquid crystal layer LC. The light passes through the liquid crystal layer LC, and is reflected by the reflection electrode 434, whereby the light reaches the counter substrate 554 again. During passing through the liquid crystal layer LC, the polarization direction of the light is rotated based on the above described principle in accordance with a voltage applied to an area between the counter electrode 520 and the reflection electrode 434. Thereafter, images are displayed in the above-described manner.

As described above, the reflection electrode 434 is formed above the TFT 454, and the gate electrode 411 is formed under the TFT 454. The reflection electrode 434 and the gate electrode 411 are made of a material containing aluminum or an aluminum alloy, and the aluminum or an aluminum alloy blocks the passage of substantially all the portions of light. Therefore, the semiconductor region 416 of the TFT 454 is shielded by the reflection electrode 434 and the gate electrode 411 from light, whereby a malfunction due to introduced light is prevented. Thus, it is unnecessary to form a black mask around the TFT 454.

Furthermore, in the reflection display mode, if the interlayer insulating film 430 is capable of blocking light, ambient light introduced through the adjoining reflection electrodes 434 is reflected by the gate signal line 456 or the source signal line 458, whereby light leakage can be prevented.

Furthermore, concave and convex portions may be formed in the reflection electrode 434, thereby improving the reflection efficiency.

EXAMPLE 22

Hereinafter, example 22 of the present invention will be described with reference to FIGS. 60 and FIGS. 62A to 62O. In example 22, like reference numerals used in example 21 refer to like elements, and descriptions for such elements are herein omitted.

FIGS. 62A to 62E are cross-sectional views taken along line A—A in FIG. 60 showing fabrication steps of the TFT array substrate 552 according to example 22. FIGS. 62F to 62J and FIGS. 62K to 62O are cross-sectional views showing fabrication steps of the gate signal input portion 456a and the source signal input portion 458a according to example 22.

First, referring to FIGS. 62A and 62F, a titanium film (thickness: 500 Å) to be a lower metal film (first lower metal film) 412a and an aluminum film (thickness: 3000 Å) to be an upper metal film (first upper metal film) 412b are sequentially formed on a transmissive substrate 410 by sputtering to form a gate electrode 411. Thereafter, the metal film 412 is subjected to a first photolithography, thereby forming a metal film (first metal film) 412. The photolithography used herein includes a resist application step, an exposure step, a developing step, an etching step, and a resist removing step.

In the first photolithography, a photoresist is applied to a portion to be the gate electrode 411 (FIG. 62A), a portion to be a gate signal line 456, and a portion to be a gate signal input portion 456a (FIG. 62F). Then, the aluminum and the titanium are dry etched with a chlorinated gas, thereby forming a predetermined pattern. At this time, a portion to be a source signal line 458 and a portion to be a source signal input portion 458a (FIG. 62K) are not formed.

Next, referring to FIGS. 62B, 62G, and 62L, silicon nitride (thickness: 4000 Å) to be an insulating film 414, amorphous silicon (thickness: 1500 Å) to be a high-resistive semiconductor film constituting a semiconductor region 416, and amorphous silicon (thickness: 500 Å) doped with impurities to be a low-resistive semiconductor film 415, are sequentially formed on the transmissive substrate 410 so as to cover the gate electrode 411 by the plasma CVD method. Thereafter, the resultant structure is subjected to a second photolithography.

In the second photolithography, a photoresist is applied to a portion to be the semiconductor region 416 (FIG. 62B). Then, the amorphous silicon and the amorphous silicon doped with impurities are simultaneously and selectively dry etched with a $SF_6$ gas, thereby forming the semiconductor region 416 on the insulating film 414 over the gate electrode 411. At this time, a portion of the metal film 412 to be a gate signal input portion 456a is covered with the insulating film 414 (FIG. 62G), and a portion of the transmissive substrate 410 on which a source signal input portion 458a is to be formed is also covered with the insulating film 414 (FIG. 62L).

Next, referring to FIGS. 62C and 62M, an ITO layer (thickness: 1000 Å), to be a transparent conductive film 418, is formed on the insulating film 414 by sputtering. Furthermore, a molybdenum film (thickness: 1000 Å) to be a lower metal film (second lower metal film) 420a and an aluminum film (thickness: 1000 Å) to be an upper metal film (second upper metal film) 420b are sequentially formed on the transparent conductive film 418 by sputtering. Thereafter, the resultant structure is subjected to a third photolithography, thereby forming a metal film (second metal film) 420 as shown in FIGS. 62C and 62M.

In the third photolithography, a photoresist is applied to a portion to be the transmission electrode 424, a portion to be the drain electrode 426 of the TFT 454, a portion to be the source electrode 428 of the TFT 454, a portion to be the source signal line 458, and a portion to be the source signal input portion 458a. By using the identical photoresist, the molybdenum film and the aluminum film are etched using mixed acid mainly composed of phosphoric acid, and the ITO is etched with a 1% solution of hydrochloric acid. Subsequently, the amorphous silicon doped with impurities, which is a low-resistive semiconductor film 415 on the semiconductor region 416, is selectively etched. As a result, as shown in FIG. 62C, the drain electrode 426, the source electrode 428, and source signal line 458 of the TFT 454 are formed while the contact layers 415a and 415b and a channel portion of the TFT 454 are formed at the same time. Furthermore, as shown in FIG. 62M, a portion 420a to be the source signal input portion 458a (FIG. 62O) is formed. At this time, a portion 412a to be the gate signal input portion 456a (FIG. 62J) remains the same as shown in FIG. 62G.

Next, as shown in FIG. 62D, a silicon nitride film (thickness: 2000 Å) to be an interlayer insulating film 430 is formed on the structure shown in FIG. 62C by the plasma CVD method. Thereafter, the resultant structure is subjected to a fourth photolithography.

In the fourth photolithography, a photoresist is applied to the interlayer insulating film 430 except for regions to be an opening portion 430a, the gate signal input portion 456a, and the source signal input portion 458a. By using the identical photoresist, the interlayer insulating film 430 is dry etched with $CF_4/O_2$ gas, thereby forming the opening portion 430a. In portions to be the gate signal input portion 456a and the source signal input portion 458a, the interlayer insulating film 430 is etched away. In a portion to be the gate signal input portion 456a, the insulating film 414 is further etched away. The opening portion 430a is formed over a portion of the transmission electrode 424 so that the insulating film 414 under the transmission electrode 424 is not exposed.

Although silicon nitride is used for the interlayer insulating film 430 in example 22, silicon oxide film may be used instead. Alternatively, a polyimide or acrylic resin, which is an organic resin material, or the like may be applied and cured, thereby forming the interlayer insulating film 430. A silicon oxide film and an organic resin film have a lower specific inductive capacity relative to a silicon nitride film. With the silicon oxide film or the organic resin film, a parasitic capacitance between the reflection electrode 434 and the gate signal line 456 or the source signal line 458 can be reduced.

Next, an aluminum film (thickness: 1000 Å), to be a third metal film 432, is formed by sputtering over the structure shown in FIG. 62E. Then, a resultant structure is subjected to the fifth photolithography, thereby forming the structure shown in FIG. 62E.

In the fifth photolithography, a photoresist is applied to a portion to be the reflection electrode 434, and the patterning is performed to a resultant structure by wet etching using a mixed acid mainly composed of phosphoric acid and nitric acid, thereby forming the reflection electrode 434 as shown in FIG. 62E. Subsequently, the third metal film (aluminum) 432, the upper metal film (aluminum) 420b, and the lower metal film (molybdenum) 420a over the transmission electrode 424 are etched away, thereby forming a transmission opening portion 436 for transmitting light into a pixel as shown in FIG. 62E. As shown in FIG. 62J, in a portion to be the gate signal input portion 456a, the third metal film 432 and the upper metal film 412b are etched away, while the lower metal film 412a remains and constitutes the gate signal input portion 456a. As shown in FIG. 62O, in a portion to be the source signal input portion 458a, the third metal film 432, the upper metal film 420b, and the lower metal film 420a are etched away, while the transparent conductive film 418 remains and constitutes the source signal input portion 458a.

The reflection region 435 is such as shown in FIG. 60. That is, the reflection electrode 434 overlaps a portion of the gate signal line 456 and a portion of the source signal line 458, by which a pixel is enclosed, via the interlayer insulating film 430 interposed therebetween. To this end, the photoresist used in the fifth photolithography is formed on the gate signal line 456 and the source signal line 458 so as to be narrower than the width of the gate signal line 456 and the source signal line 458, respectively.

Thereafter, the face of the structure that underwent the above-described process is provided with the orientation film 519 for determining the orientation of the liquid crystal, thereby completing the TFT array substrate 552. Then, the liquid crystal material is injected between this TFT array substrate 552 and the counter substrate 554 having the counter electrode, thereby completing the liquid crystal cell 510.

EXAMPLE 23

Hereinafter, example 23 of the present invention will be described with reference to FIGS. 63A to 63O and FIGS. 64 and 65. In example 23, like reference numerals used in examples 21 and 22 refer to like elements, and descriptions for such elements are herein omitted.

FIGS. 63A to 63E are cross-sectional views taken along line A—A in FIG. 60 showing fabrication steps of the TFT array substrate 552 according to example 23. FIGS. 63F to 63J and FIGS. 63K to 63O are cross-sectional views showing fabrication steps of the gate signal input portion 456a and the source signal input portion 458a according to example 23.

Steps shown in FIGS. 63A to 63C are the same as the steps shown in FIGS. 62A to 62C, i.e., the same as the first through third photolithography steps. (This is also true of FIGS. 63F to 63H and FIGS. 63K to 63M.) Thus, descriptions for these steps are herein omitted.

A photosensitive acrylic resin film to be the interlayer insulating film 430 is applied by a spin coat method over the entire structure shown in FIGS. 63C, 63H, and 63M. Then, the resultant structure is subjected to a photo-process. The photo-process used herein includes a resist application step, an exposure step, and a developing step.

The photo-processed portion of the photosensitive acrylic resin becomes dissolvable. The portions to be the opening portion 430a, the gate signal input portion 456a, and the source signal input portion 458a are exposed to light, developed, and thermally cured, thereby removing the interlayer insulating film 430 over the opening portion 430a, the gate signal input portion 456a, and the source signal input portion 458a. Then, the interlayer insulating film 430 is patterned, thereby forming a structure shown in FIGS. 63D. At this time, the upper metal film 420b over the source signal input portion 458a is already exposed as shown in FIGS. 63N.

Next, the insulating film 414 is etched using the pattern of the interlayer insulating film 430, thereby exposing the upper metal film 412b over the gate signal input line 456a.

Subsequent steps shown in FIGS. 63E, 63J, and 63O of example 22 are the same as the steps after the formation of the third metal film as described in example 22 with reference to FIGS. 62E, 62J, and 62O. Upon going through these steps, the TFT array substrate 552 is completed.

Figure 64:
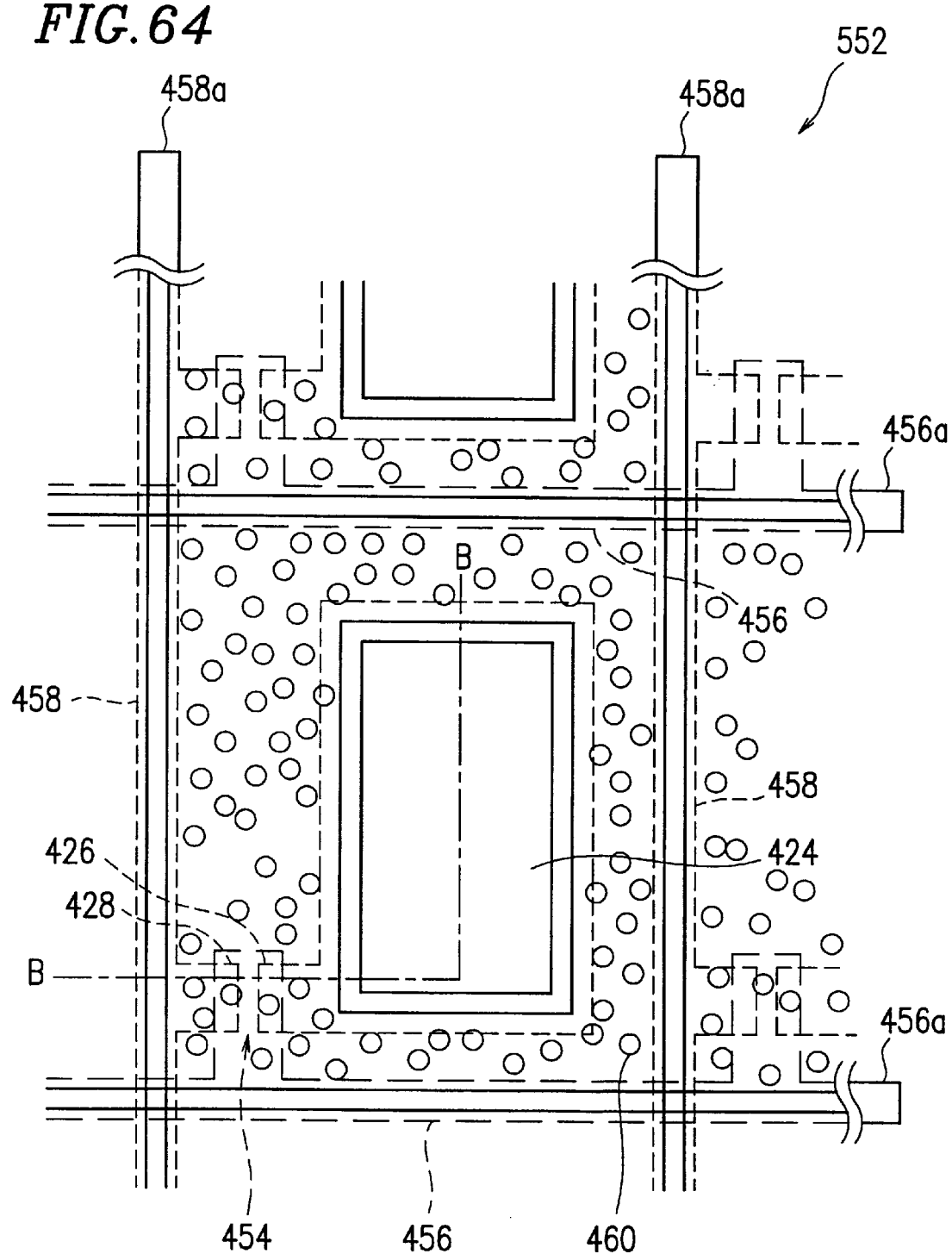
FIG. 64 is a plan view of the TFT array substrate 552 of the liquid crystal display device according to the variation of example 23.
Figure 65:
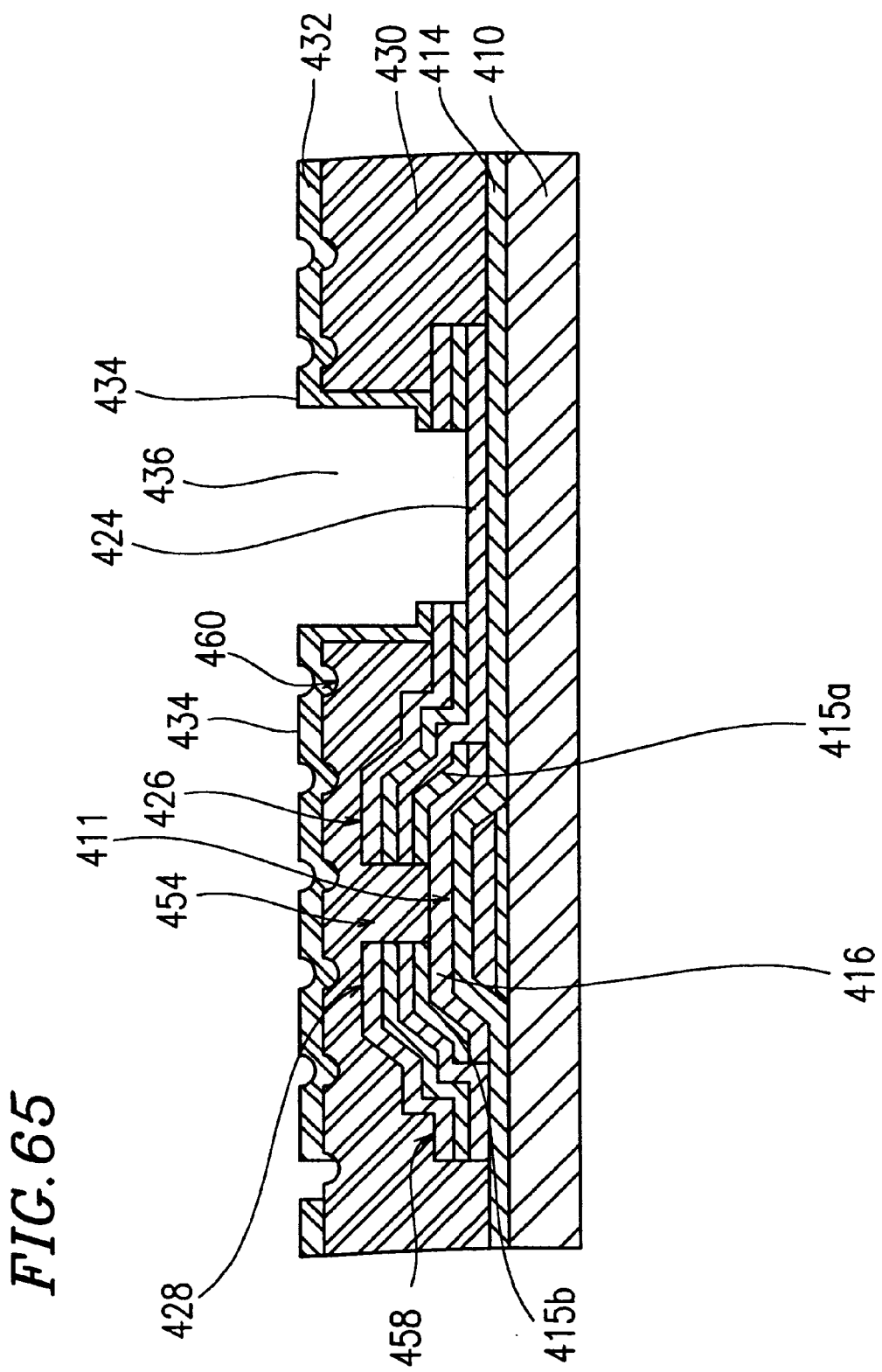
FIG. 65 is a cross-sectional view of the TFT array substrate taken along line B—B in FIG. 64.

Next, a variation of example 23 is described. FIG. 64 is a plan view of the TFT array substrate 552 of the liquid crystal display device according to the variation of example 23. FIG. 65 is a cross-sectional view of the TFT array substrate 552 taken along line B—B in FIG. 64.

As described above, the interlayer insulating film 430 is formed so as to have a flat surface in example 23. However, in this variation, the interlayer insulating film 430 is formed so that concave and convex portions are formed in the surface thereof as described below.

A photosensitive acrylic resin film is applied on the interlayer insulating film 430 by a spin coat method so as to have a thickness of 30000 Å, and the exposure as a photoprocess is performed twice. First, in order to form concave and convex portions, the exposure is performed with light of h ray (ultraviolet ray having a wavelength of 405 nm) in a state of half exposure obtained by an exposure energy of 40 mJ, thereby forming concave and convex portions 460 on the top surface of the interlayer insulating film 430. Next, only a portion of the gate signal input portion 456$a$ which is required to be exposed in the final shape, a portion corresponding to a source signal input portion 458$a$, and the opening portion 430$a$ are fully exposed to a h ray at an exposure energy of 240 mJ. Then, the structure is developed and thermally cured, thereby completing the patterning of the interlayer insulating film 430. Thus, concave and convex portions 460 are obtained as shown in FIG. 64 by providing a half exposure step. Such concave and convex portions 460 improve the reflection efficiency of the reflection electrode 434 to be formed thereon.

Hereinabove, the examples and embodiments of the present invention have been described in detail. These descriptions are only to clarify the technical advantages of the present invention, and the present invention is thus not limited to the specific and restricted examples as described above.

Hereinbelow, the features of the liquid crystal display device according to the present invention distinguished from the conventional reflection type or transmission type liquid crystal display device will be described.

In the conventional reflection type liquid crystal display device, the display is effected by use of ambient light to realize low power consumption. Accordingly, when ambient light is lower than a certain limit value, the display fails to be recognized even if the device is being used in an environment where sufficient power supply is possible. This is one of the biggest shortcomings of the reflection type liquid crystal display device.

If the reflection characteristics of the reflection electrodes vary at the fabrication, the ambient light utilization efficiencies of the reflection electrodes also vary. This varies the critical value of the ambient light intensity at which the display becomes unrecognizable depending on the panels. At the fabrication, therefore, the variation in the reflection characteristics must be controlled more carefully than the variation in the aperture ratio of which control is required for the conventional transmission type liquid crystal display device. Otherwise, a liquid crystal display device having stable display characteristics is not obtained.

On the contrary, in the liquid crystal display device according to the present invention, light from a backlight is utilized under the environment where sufficient power supply is possible as in the conventional transmission type liquid crystal display device. Accordingly, the display can be recognized regardless of the intensity of ambient light. Thus, the variation in the ambient light utilization efficiency due to the variation in the reflection characteristics is not required to be controlled as strictly as that in the reflection type liquid crystal display device.

On the other hand, in the conventional transmission type liquid crystal display device, when ambient light becomes bright, the surface reflection components of the light increases, making it difficult to recognize the display. In the liquid crystal display device according to the present invention, when ambient light becomes bright, the reflection regions are used together with the transmission regions. This increases the panel brightness, and thus improves the visibility.

Thus, the liquid crystal display device according to the present invention can overcome both the problems that visibility is lowered due to surface reflection under high (i.e. , bright) ambient light in a conventional transmission type liquid crystal display device and that display recognition becomes difficult due to a decrease in the panel brightness under low (i.e., dark) ambient light in a conventional reflection type liquid crystal display device simultaneously. In addition to the above, both the features of these devices can be obtained.

As described above, according to the present invention, each pixel includes a region having a higher transmission efficiency and a region having a higher reflection efficiency than in the case of using a semi-transmissive reflection film. In each region, a layer having a high transmission efficiency or a layer having a high reflection efficiency serves as the pixel electrode. With this construction, unlike the conventional liquid crystal display device using a semi-transmissive reflection film, the utilization efficiency of ambient light and illumination light is prevented from decreasing due to straylight phenomenon, for example. Good images can be displayed regardless of the brightness of ambient light by using either a reflection mode display, a transmission mode display, or both a reflection mode display and a transmission mode display. Since both light from the backlight and the ambient light contribute to the display simultaneously and efficiently, power consumption significantly decreases compared with the transmission type liquid crystal display device which always uses light from the backlight.

In other words, the shortcomings that visibility is significantly lower under low ambient light in a conventional reflection type liquid crystal display device and the display recognition becomes difficult under high ambient light in a conventional transmission type liquid crystal display device can be overcome simultaneously by increasing the light utilization efficiency according to the present invention.

Since the regions having a high reflection efficiency partly cover the gate lines, the source lines, and/or the switching elements, light incident on these portions can also be used for the display. Therefore, the effective area of the pixel increases markedly. This not only overcomes the problems of the conventional device using the semi-transmissive reflection film, but also increases the aperture ratio of each pixel even if compared with a normal transmission type liquid crystal display device.

In the case where only a layer having a high transmission efficiency constitutes a pixel electrode, the occurrence of a defect caused by the pixel electrode can be reduced, compared with the case where a layer having a high transmission efficiency and a layer having a high reflection efficiency are electrically connected with each other to form a pixel electrode of one pixel and the case where a layer having a high transmission efficiency and a layer having a high reflection efficiency partly overlap each other to form a pixel electrode of one pixel. As a result, the yield increases.

The layer having a high transmission efficiency or the layer having a high reflection efficiency may be made of the same material as that for the source lines or the gate lines. This simplifies the fabrication process of the liquid crystal display device.

The occupation of the area of the region having a high reflection efficiency in the effective pixel area is set at about 10 to about 90%. This setting overcomes both the problems that the display becomes less recognizable when ambient light is too high in a convention transmission type liquid crystal display device and that the display becomes completely unrecognizable when the intensity of ambient light is extremely low in a conventional reflection type liquid crystal display device. Thus, an optimal display can be realized as a reflection mode display, a transmission mode display, or both a reflection mode display and a transmission mode display, regardless of the amount of ambient light.

The reflection/transmission type liquid crystal display device according to the present invention is especially effective when it is applied to an apparatus in which the display screen is not swingable or which cannot be moved to a better environment for the convenience of the operator.

The liquid crystal display device according to the present invention was actually used as a view finder (monitor screen) in a battery-driven digital camera and a video camera. As a result, it has been found that the power consumption was kept at a low level while the brightness suitable for observation was maintained by adjusting the brightness of the backlight regardless of the brightness of the ambient light.

When the conventional transmission type liquid crystal display device is used outdoors under bright sunlight, the display become less recognizable even if the brightness of the backlight is increased. Under such occasions, the liquid crystal display device of the present invention can be used as a reflection type device by turning off the backlight, or it can be used as the transmission/reflection type device by lowering the brightness of the backlight. As a result, good display quality and reduced power consumption can be realized.

When the liquid crystal display device according to the present invention is used indoors with bright sunlight coming thereinto, the reflection mode display and the transmission mode display may be switched therebetween or both may be used depending on the directional position of the object, to obtain a more recognizable display. When the monitor screen receives direct sunlight, the manner described in the case of an outdoors use under bright sunlight may be adopted. When the object is to be imaged in a dark corner of a room, the backlight is turned on in order to use the device as a reflection/transmission mode display.

When the liquid crystal display device according to the present invention is used as a monitor screen in a car apparatus such as a car navigator, also, an invariably recognizable display is realized regardless of the brightness of ambient light.

In a car navigator using the conventional liquid crystal display device, a backlight having a higher brightness than that used in a personal computer and the like is used, so as to be usable during a fine weather and in an environment receiving direct sunlight. However, despite such a high brightness, the display is still less recognizable under the environment described above. On the other hand, a backlight with such a high brightness is so bright that the user is dazzled and adversely influenced. In a car navigator using the liquid crystal display device according to the present invention, a reflection mode display can always be used together with a transmission mode display. This allows for a good display under a bright environment without increasing the brightness of the backlight. Conversely, under a pitch-dark environment, a recognizable display is realized by obtaining only a low brightness (about 50 to 100 cd/m$^2$) of the backlight.

As described above, according to the liquid crystal display device of the present invention, a reflection electrode and a transmission electrode are electrically connected in an interface area between a reflection region and a transmission region. With this arrangement, the electrical connection between these electrodes can be surely made without enlarging an unavailable display region in a display pixel region, and the occurrence of an insufficient contact can be reduced relative to the conventional device.

Furthermore, according to the present invention, by providing an electrical contact between the reflection electrode and the transmission electrode in overlapped regions of an electrode material constituting a transmission display region, an electrode material constituting a reflection display region, and an interlayer insulating film, the necessity of providing an unavailable display region which cannot be used as a transmission display region and a reflection display region, i.e., the necessity of providing a contact hole can be avoided. Thus, the decrease of the numerical aperture of a display device can be prevented.

In the liquid crystal display device having a contact hole, an interlayer insulating film in an interface area between the reflection region and the transmission region should be formed so as to be considerably larger than an edge portion of the reflection electrode with deliberate consideration for a displacement of a pattern for the reflection electrode. In such a structure, in some portions of the transmission region, a voltage is applied through the interlayer insulating film to the liquid crystal material. Accordingly, the transmissivity or the contrast of the conventional display deteriorates in the transmission region. However, according to the present invention, such problems do not occur because it is not necessary to provide a contact hole.

Furthermore, in a transmission/reflection dual mode liquid crystal display device according to the present invention, when the device operates in a reflection display mode, a reflection electrode area sufficient for a satisfactory reflection display can be easily obtained because a contact hole does not need to be within the reflection region. Accordingly, the utilization efficiency of ambient light improves.

In general, when a polarization mode is used, it is required that the length of optical paths of the reflection region and the transmission region be adjusted by changing the thickness of the interlayer insulating film, thereby matching the electrooptic characteristics between the reflection region and the transmission region. In typical cases, the thickness of the liquid crystal layer in the transmission region needs to be about twice as thick as that of the liquid crystal layer in the reflection region. For example, since the thickness of the liquid crystal layer in the transmission region is typically about 5 to 6 $\mu$m, it is required that the interlayer insulating film with such a thickness of about 3 $\mu$m is formed so that the liquid crystal layer in the reflection region has a thickness of about 2.5 to 3 $\mu$m. Furthermore, since it is not necessary to form a contact hole according to the present invention, various problems regarding the contact hole, e.g., an insufficient contact in the contact hole, the decrease of the utilization efficiency of the reflection electrode due to a large contact hole area, etc., do not occur.

Furthermore, according to the present invention, the reflection electrode and the transmission electrode can be electrically connected without forming a contact hole, which is provided in a reflection electrode region with in a display electrode region. With such a structure, the numerical aperture in the reflection electrode region improves, and the utilization efficiency of ambient light improves accordingly.

Furthermore, according to the present invention, it is unnecessary to form an interlayer film, which would have been provided between the reflection electrode and the transmission electrode of the liquid crystal display device.

Therefore, a voltage is not applied through the interlayer film to a liquid crystal material. Thus, it is also possible to improve the display performance in the transmission electrode region.

In the liquid crystal display device of the present invention, a TFT is covered with the reflection electrode, thereby preventing light from reaching the TFT. Therefore, it is unnecessary to provide a black mask over the TFT, and the display region is enlarged accordingly. In addition, a larger region can be utilized for introducing ambient light. As a result, the display quality of the liquid crystal display device improves.

When the liquid crystal display device of the present invention used as a transmission type liquid crystal display device, the reflection electrode, the gate signal line, and the source signal line function as black masks. Thus, the liquid crystal display device with no light leakage can be realized without forming an additional black mask. Furthermore, when the liquid crystal display device of the present invention used as a reflection type liquid crystal display device, a larger region can be utilized for introducing ambient light. As a result, the display quality of the liquid crystal display device further improves. In addition, a step of forming a black mask can be omitted, whereby an active matrix type liquid crystal display device can be fabricated at a low cost.

In the liquid crystal display device according to the present invention, a parasitic capacitance between the reflection electrode and the gate signal line or the source signal line can be reduced by the interlayer insulating film, whereby a crosstalk, etc., can be suppressed. Thus, the deterioration of the display quality can be prevented.

When the liquid crystal display device operates in a reflection display mode, ambient light passing between the adjoining reflection electrodes is blocked by the gate signal line and/or the source signal line, thereby preventing light leakage. As a result, the display contrast improves when the liquid crystal display device operates in the reflection display mode.

According to the liquid crystal display device of the present invention, the reflection efficiency of the reflection electrode improves, and the display quality of the device further improves accordingly.

According to a method for fabricating the liquid crystal display device of the present invention, five photolithography steps are sufficient for forming an active matrix substrate having a TFT, a transmission electrode, and a reflection electrode. Thus, a production process is not complicated even when a switching element is a TFT, and the increase of the cost can be suppressed accordingly.

According to the present invention, the interlayer insulating film may be formed from a patterned photosensitive film by a photo-process instead of being formed by the fourth photolithography. Furthermore, a control signal input portion can be exposed by etching with using a pattern of the interlayer insulating film. Thus, the production process can be further simplified, and the production cost can be reduced accordingly.

Furthermore, concave and convex portions are formed in the surface of the photosensitive film by the photo-process, whereby the reflection electrode formed on the photosensitive film has concave and convex portions. These concave and convex portions improve the reflection efficiency. Accordingly, the display quality of the liquid crystal display device improves.

According to the present invention, a portion of the interlayer insulating film over the transmission region in the transmission region is removed. With such a structure, a contact between the reflection electrode and the transmission electrode is easily and surely formed. Accordingly, defects of the pixel decrease, and the display quality of the device therefore improves. In addition, the production yield of the liquid crystal display device improves, whereby the production cost can be suppressed.

According to the present invention, a first metal film is a two-layer film formed by a first lower metal film made of titanium and a first upper metal film made of aluminum or an aluminum alloy. With such a structure, the lower metal film and the upper metal film can be simultaneously etched in a first photolithography step. Furthermore, in a later step in which aluminum and molybdenum are wet-etched with a mixed acid mainly composed of a phosphoric acid and a nitric acid, the titanium is not etched away because the titanium is not dissolved by the mixed acid, forming the control signal input portion. Therefore, the production process can be simplified. In addition, a gate signal line having low resistivity can be obtained, whereby the time constant of the gate signal line becomes small. Thus, the quality of the liquid crystal display device improves while reducing the production cost.

According to the present invention, a second metal film is a two-layer film formed by a second lower metal film made of molybdenum and a second upper metal film made of aluminum or an aluminum alloy. With such a structure, a source signal line having low resistivity can be obtained, whereby the time constant of the source signal line becomes small. In addition, an electrolytic corrosion between an ITO film used as a transparent conductive film and a third metal film of aluminum can be prevented, whereby the duration of the liquid crystal display device can be prolonged. Thus, the reliability of the liquid crystal display device can be improved while improving the quality of the device.

According to the present invention, a third metal film is made of aluminum, whereby the reflection efficiency of the reflection electrode can be improved. Accordingly, the display quality of the liquid crystal display device improves in the case where ambient light is utilized for the display. In addition, it is possible to prevent a larger portion of ambient light from reaching the switching element relative to the conventional device, whereby a malfunction of the switching element can be prevented. Thus, a liquid crystal display device having a high display quality and a high reliability can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising a first substrate, a second substrate, and a liquid crystal layer interposed between the first and second substrates, a plurality of pixel regions being defined by respective pairs of electrodes for applying a voltage to the liquid crystal layer, wherein each of the plurality of pixel regions includes a reflection region and a transmission region, and the first substrate includes, a transmission electrode through which light from a light source passes within the transmission region, and a reflection electrode by which ambient light is reflected within the reflection region, wherein the transmission electrode and the reflection electrode are electrically connected to each other in an interface area between the transmission region and the reflection region.

2. A liquid crystal display device according to claim 1, further comprising an interlayer insulating film.

3. A liquid crystal display device according to claim 2, wherein the interlayer insulating film is located under both the transmission electrode and the reflection electrode.

4. A liquid crystal display device according to claim 3, wherein the reflection electrode is not flat.

5. A liquid crystal display device according to claim 3, wherein the interlayer insulating film is not flat.

6. A liquid crystal display device according to claim 2, wherein the reflection electrode is formed on tilted or concave and convex portions of the interlayer insulating film.

7. A liquid crystal display device according to claim 2, wherein the interlayer insulating film is provided to at least a portion between the transmission electrode and the reflection electrode.

8. A liquid crystal display device according to claim 7, wherein the interlayer insulating film is not present over a portion of the transmission region.

9. A liquid crystal display device according to claim 7, wherein the reflection electrode is formed in a position between the interlayer insulating film and an area through which the ambient light comes into the liquid crystal display device.

10. A liquid crystal display device according to claim 9, wherein the thickness of the liquid crystal layer in the reflection region is smaller than that of the liquid crystal layer in the transmission region.

11. A liquid crystal display device according to claim 10, wherein the thickness of the liquid crystal layer in the reflection region is about a ½ of that of the liquid crystal layer in the transmission region.

12. A liquid crystal display device according to claim 9, wherein the reflection electrode has concave and convex portions in a surface thereof.

13. A liquid crystal display device according to claim 9, wherein the interlayer insulating film has concave and convex portions in a surface thereof.

14. A liquid crystal display device according to claim 7, wherein the transmission electrode and the reflection electrode are electrically connected to each other in a region in which the interlayer insulating film is not formed.

15. A liquid crystal display device according to claim 14, further comprising a contact hole in which the transmission electrode and the reflection electrode are electrically connected to each other in addition to the electrical connection of the transmission electrode and the reflection electrode in the interface area between the transmission region and the reflection region.

16. A liquid crystal display device according to claim 14, wherein the transmission electrode and the reflection electrode are electrically connected to each other only in the interface area between the transmission region and the reflection region.

17. A liquid crystal display device according to claim 2, wherein the interlayer insulating film is made of a photosensitive resin.

18. A liquid crystal display device according to claim 2, wherein the interlayer insulating film is made of an organic resin film containing a light-shielding substance.

19. A liquid crystal display device according to claim 18, wherein the light-shielding substance contains a graphite.

20. A liquid crystal display device according to claim 2, wherein the interlayer insulating film is made of an organic resin film.

21. A liquid crystal display device according to claim 2, wherein the interlayer insulating film contains silicon nitride.

22. A liquid crystal display device according to claim 1, wherein the liquid crystal display device is an active matrix including a switching element.

23. A liquid crystal display device according to claim 22, wherein a thin film transistor is used as the switching element.

24. A liquid crystal display device according to claim 23, wherein a portion of a drain electrode of the thin film transistor and the transmission electrode are made of a same material.

25. A liquid crystal display device according to claim 24, wherein the same material is ITO.

26. A liquid crystal display device according to claim 23, further comprising a interlayer insulating film, wherein
the interlayer insulating film is located over at least a portion of a gate signal line of the thin film transistor, a source signal line of the thin film transistor, the thin film transistor, and a drain electrode of the thin film transistor.

27. A liquid crystal display device according to claim 26, wherein the reflection electrode is formed such that the reflection electrode entirely covers the thin film transistor through the interlayer insulating film interposed therebetween.

28. A liquid crystal display device according to claim 27, wherein
the pixel region is enclosed by a gate signal line and the source signal line of the thin film transistor, and
a peripheral portion of the reflection electrode overlaps the gate signal line and the source signal line enclosing the pixel region.

29. A liquid crystal display device according to claim 28, wherein the gate signal line and the source signal line have a light-shielding property.

30. A liquid crystal display device according to claim 1, wherein the transmission electrode is made of Indium Tin Oxide (ITO).

31. A liquid crystal display device according to claim 1, wherein the reflection electrode contains aluminum.

32. A liquid crystal display device according to claim 1, wherein a metallic layered film of aluminum and molybdenum is used as the reflection electrode.

* * * * *